United States Patent
Sekine et al.

[11] Patent Number: 5,862,257
[45] Date of Patent: Jan. 19, 1999

[54] IMAGE PROCESSING APPARATUS AND IMAGE FORMING APPARATUS

[75] Inventors: Hiroshi Sekine; Akira Ishii; Hideki Moriya; Kenji Ogi; Kazuyasu Sasuga, all of Ebina, Japan

[73] Assignee: Fuji Xerox Co., Ltd., Tokyo, Japan

[21] Appl. No.: 636,881

[22] Filed: Apr. 23, 1996

[30] Foreign Application Priority Data

Apr. 25, 1995 [JP] Japan .................................... 7-101355
Oct. 18, 1995 [JP] Japan .................................... 7-270318

[51] Int. Cl.$^6$ ........................................................ G06T 1/00
[52] U.S. Cl. ........................ 382/199; 382/305; 358/455; 358/462
[58] Field of Search .................................... 382/199, 173, 382/266, 270, 242, 197, 305, 245; 395/109, 102, 115; 358/448, 455, 462, 261.1, 456

[56] References Cited

U.S. PATENT DOCUMENTS

| | | | |
|---|---|---|---|
| 4,975,785 | 12/1990 | Kantor | 358/447 |
| 5,257,116 | 10/1993 | Suzuki | 358/465 |
| 5,644,366 | 7/1997 | Ushida et al. | 343/625 |
| 5,659,402 | 8/1997 | Fujita et al. | 358/467 |
| 5,701,363 | 12/1997 | Hanyuh | 382/174 |

FOREIGN PATENT DOCUMENTS

| | | |
|---|---|---|
| 4-148949 | 5/1992 | Japan . |
| 4-195268 | 7/1992 | Japan . |
| 5-328108 | 12/1993 | Japan . |

*Primary Examiner*—Jon Chang
*Attorney, Agent, or Firm*—Oliff & Berridge, PLC

[57] ABSTRACT

Multi-value character (line image) data, characteristic information and half-tone data are stored while the memory is effectively used. Half-tone data is outputted from the attribute separating section 20. Vector pixels or the density data of 5 bits and the characteristic flag of 3 bits are outputted from the resolution converting section 12 and the edge detecting section 13. After a discriminating flag (1 bit) has been added to them by the data mixing section 21, they are formatted in a predetermined manner and stored in the memory M. In this case, both halftone data and vector pixels are stored as raster data of 9 bits. Further, the characteristic flag is stored as a portion of the vector pixels. Accordingly, the memory M is not wasted, and it is not necessary to separately provide a memory exclusively used for the characteristic flag.

18 Claims, 42 Drawing Sheets

FIG. 5A
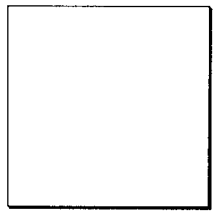
FIG. 5B
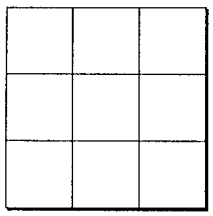
FIG. 5C
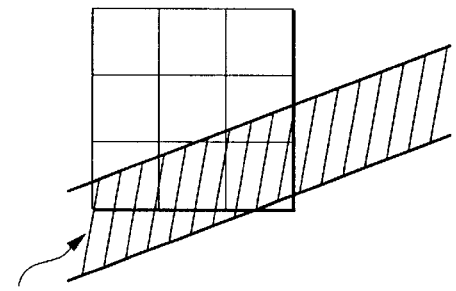
IMAGE DATA EXPRESSED BY VECTOR DATA
FIG. 5D
| 0 | 0 | 0 |
|---|---|---|
| 0 | 0 | 1 |
| 1 | 1 | 1 |
FIG. 5E
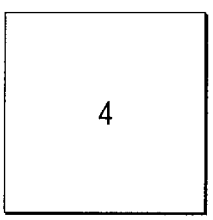
4
FIG. 6
| HIGH DENSITY BIT MAP PATTERN | EDGE DIRECTION | HIGH DENSITY BIT MAP PATTERN | EDGE DIRECTION |
|---|---|---|---|
| P1 — 0 ▨ 1 / 0 ▨ 1 / 0 ▨ 1 | RIGHT | P4 — 1 1 1 / ▨ ▨ 1 / 0 ▨ 1 | RIGHT |
| P2 — 1 ▨ 0 / 1 ▨ 0 / 1 ▨ 0 | LEFT | P5 — 1 ▨ 0 / 1 ▨ ▨ / 1 1 1 | LEFT |
| P3 — 1 1 1 / 1 ▨ ▨ / 1 ▨ 0 | LEFT | P6 — 0 ▨ 1 / ▨ ▨ 1 / 1 1 1 | RIGHT |
| ▨ → "1" OR "0" | | | |

| INPUT SIGNAL (213) 3 BIT | OUTPUT SIGNAL (207) 2 BIT |
|---|---|
| 000 (MIDDLE) | 00 (OTHERS) |
| 001 (UPPER) | 00 (OTHERS) |
| 010 (RIGHT) | 01 (RIGHT) |
| 011 (LOWER) | 00 (OTHERS) |
| 100 (LEFT) | 10 (RIGHT) |

| FLAG VALUE IN THE EDGE DIRECTION (SIGNAL 207) | PIXEL POSITION | |
|---|---|---|
| | ODD NUMBER PIXEL | EVEN NUMBER PIXEL |
| 01 (RIGHT) | TRIANGULAR WAVE A | TRIANGULAR WAVE B |
| 10 (LEFT) | TRIANGULAR WAVE B | TRIANGULAR WAVE A |
| 00 (OTHERS) | TRIANGULAR WAVE C | TRIANGULAR WAVE C |

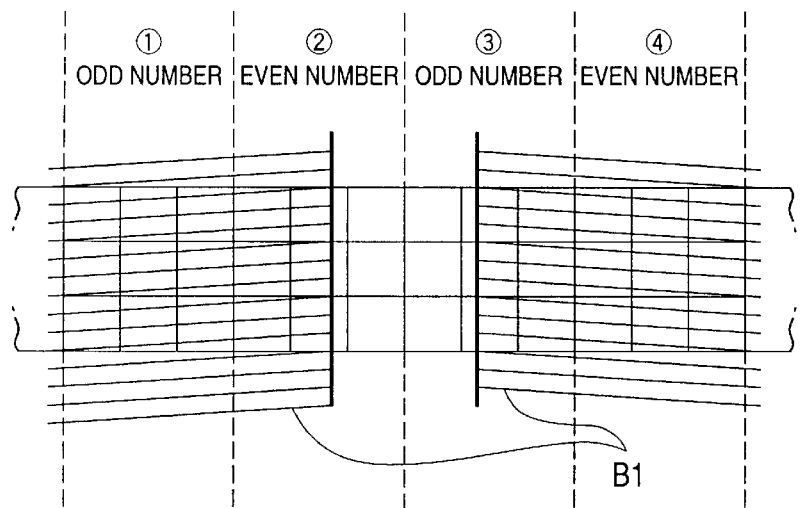
FIG. 10 (a)
FIG. 10 (b)
FIG. 10 (c)
FIG. 10 (d)
FIG. 10 (e)
FIG. 10 (f)
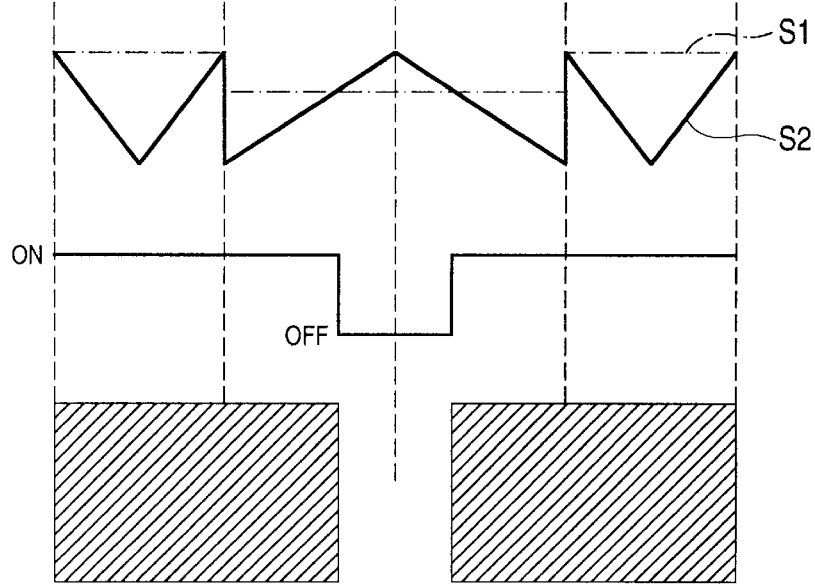

| MSB | | LSB |
|---|---|---|
| 0/ OUTLINE | CHARACTERISTIC INFORMATION (3 BIT) | GRAY DATA (5 BIT) |
| 1/ HALF TONE | HALF TONE DATA (8 BIT) | |

FL1

OUTLINE INFORMATION DEVELOPING DATA
→ GRAY VALUE + CHARACTERISTIC INFORMATION

- EXAMPLE OF THE GRAY VALUE COMPUTATION
  DENSITY VALUE x (12/36) x 31
- CHARACTERISTIC INFORMATION LEFT EDGE

96dpm BITMAP

LINE INFORMATION DEVELOPING DATA → 16dpm

DENSITY VALUE (0 TO 255) OF EACH PIXEL IS INPUTTED. OUTPUT DATA IS CLASSIFIED TO THE HALF TONE.

| | | | | | | | | | |
|---|---|---|---|---|---|---|---|---|---|
| a | 1 | 0 | 0 | 0 | 0 | 0 | 0 | 0 | HALF TONE 0/255 |
| b | 1 | 0 | 0 | 0 | 0 | 0 | 0 | 0 | ↑ |
| c | 1 | 0 | 0 | 0 | 0 | 0 | 0 | 0 | ↑ |
| d | 0 | 0 | 0 | 0 | 0 | 1 | 1 | 1 | RIGHT EDGE 15/31 |
| e | 1 | 1 | 1 | 1 | 1 | 1 | 1 | 1 | HALF TONE 255/255 |
| f | 1 | 1 | 1 | 1 | 1 | 1 | 1 | 1 | ↑ |
| g | 0 | 0 | 1 | 0 | 1 | 0 | 1 | 0 | LEFT EDGE 20/31 |
| h | 1 | 0 | 0 | 0 | 0 | 0 | 0 | 0 | HALF TONE 0/255 |

A → A'

| | | | | | | | | | |
|---|---|---|---|---|---|---|---|---|---|
| a | 0 | 0 | 1 | 1 | 1 | 0 | 0 | 0 | UPPER EDGE 16/31 |
| b | 0 | 0 | 1 | 1 | 1 | 0 | 0 | 0 | ↑ |
| c | 0 | 0 | 1 | 1 | 1 | 0 | 0 | 0 | ↑ |
| d | 0 | 0 | 1 | 1 | 1 | 0 | 0 | 0 | ↑ |
| e | 0 | 0 | 1 | 1 | 1 | 0 | 1 | 1 | ↑ |
| f | 0 | 0 | 1 | 1 | 1 | 1 | 0 | 0 | UPPER EDGE 28/31 |
| g | 0 | 0 | 1 | 0 | 0 | 1 | 0 | 0 | LEFT EDGE 8/31 |
| h | 1 | 0 | 0 | 0 | 0 | 0 | 0 | 0 | HALF TONE 0/255 |

B → B'

32dpm x 16dpm GRAY DATA

16dpm GRAY DATA

A ↓ A'

| 1 | 0 | 0 | 0 | 0 | 0 | 0 | 0 | 0 | HALF TONE 0/255 |
| 1 | 0 | 0 | 0 | 0 | 0 | 0 | 0 | 0 | ↑ |
| 1 | 0 | 0 | 0 | 0 | 0 | 0 | 0 | 0 | ↑ |
| 0 | × | × | × | × | 0 | 1 | 0 | 1 | 32dpm BIT MAP |
| 1 | 1 | 1 | 1 | 1 | 1 | 1 | 1 | 1 | HALF TONE 255/255 |
| 1 | 1 | 1 | 1 | 1 | 1 | 1 | 1 | 1 | ↑ |
| 0 | × | × | × | × | 1 | 0 | 1 | 1 | 32dpm BIT MAP |
| 1 | 0 | 0 | 0 | 0 | 0 | 0 | 0 | 0 | HALF TONE 0/255 |

B ↓ B'

| 0 | × | × | × | × | 1 | 1 | 0 | 0 | 32dpm BIT MAP |
| 0 | × | × | × | × | 1 | 1 | 0 | 0 | ↑ |
| 0 | × | × | × | × | 1 | 1 | 0 | 0 | ↑ |
| 0 | × | × | × | × | 1 | 1 | 0 | 0 | ↑ |
| 0 | × | × | × | × | 1 | 1 | 0 | 0 | ↑ |
| 0 | × | × | × | × | 1 | 1 | 0 | 1 | ↑ |
| 0 | × | × | × | × | 1 | 0 | 0 | 0 | ↑ |
| 1 | 0 | 0 | 0 | 0 | 0 | 0 | 0 | 0 | HALF TONE 0/255 |

TWO FINE LINES ARE PROVIDED

32dpm BITMAP

32dpm MULTI-VALUE IMAGE DATA

DENSITY INFORMATION

CHARACTERISTIC INFORMATION

EXAMPLE 1:
    PROCESSING FOR PREVENTING
    A FINE LINE RUPTURE

EXAMPLE 2:
    LINE WIDTH MODULATION OF
    SUBSIDIARY SCANNING

EXAMPLE 3:
    RESTORATION OF BLOCK

FIG. 38A
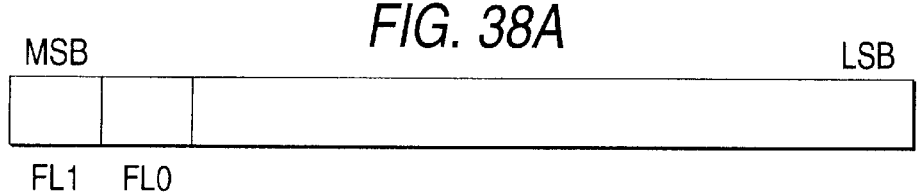
FIG. 38B
| FL1 | FL0 | MEANING |
|---|---|---|
| 1 | 1 | HALF TONE DATA, HIGH FREQUENCY SCREEN |
| 1 | 0 | HALF TONE DATA, LOW FREQUENCY SCREEN |
| 0 | 1 | OUTLINE DATA, GRAY SCALE + DIRECTION INFORMATION |
| 0 | 0 | OUTLINE DATA, BIT MAP |
FIG. 39
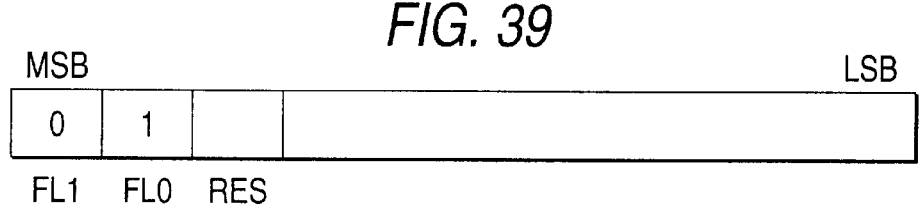
| RES | MEANING |
|---|---|
| 1 | STANDARD BIT MAP |
| 0 | HIGH RESOLUTION BIT MAP |
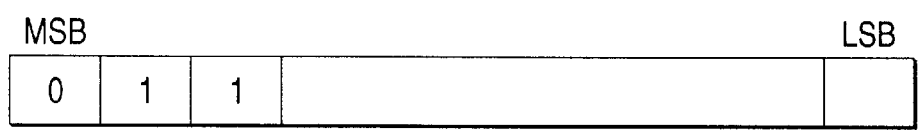
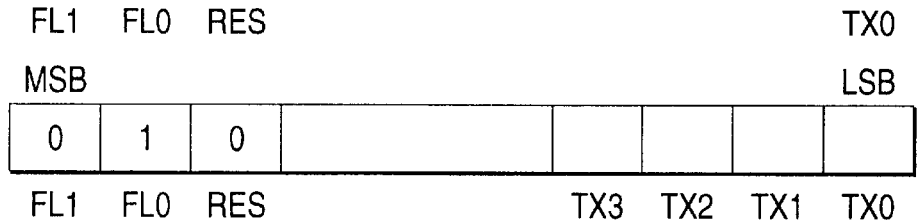
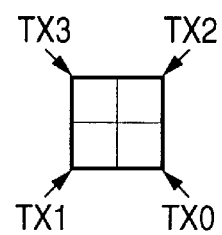

FIG. 48

```
MSB                                              LSB
| 0 | 0 | 1 |   |   |   |   |   |   |   |
 FL1 FL0 RES CH2 CH0 FNT                     TX0
```

```
MSB                                              LSB
| 0 | 0 | 0 |   |   |   |   |   |   |   |
 FL1 FL0 RES CH1 CH0 FNT TX3 TX2 TX1 TX0
```

| CH1 | CH0 | MEANING |
|---|---|---|
| 0 | 0 | CHINESE CHARACTER NOT LESS THAN 10 POINTS |
| 0 | 1 | CHINESE CHARACTER SMALLER THAN 10 POINTS |
| 1 | 0 | CHARACTER EXCEPT FOR CHINESE CHARACTER NOT LESS THAN 10 POINTS |
| 1 | 1 | CHARACTER EXCEPT FOR CHINESE CHARACTER SMALLER THAN 10 POINTS |

| FNT | MEANING |
|---|---|
| 0 | MINCHOTAI CHARACTER |
| 1 | OTHERS |

FIG. 50A
FIG. 50B
FIG. 50C
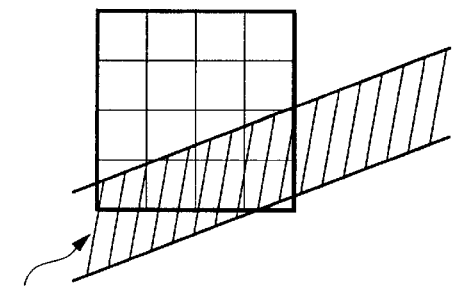
IMAGE DATA EXPRESSED BY VECTOR DATA
FIG. 50D
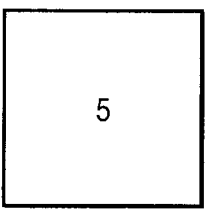
FIG. 50E
FIG. 51
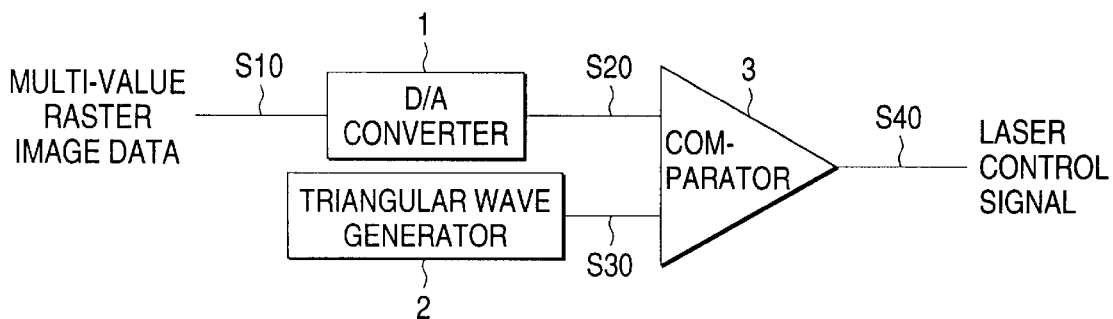

IMAGE PROCESSING APPARATUS AND IMAGE FORMING APPARATUS

BACKGROUND OF THE INVENTION

1. Field of the Invention

The present invention relates to an image processing apparatus and image forming apparatus for processing both image data to express a character line image and half-tone density data.

2. Description of the Related Art

Anti-alias processing is well known which is a method for apparently smoothing zigzag edges when vector data to express a character line image is converted into raster data. Referring to FIGS. 50A to 50E, an example of the anti-alias processing is explained below.

First, in FIG. 50A represents a pixel which is an object to be processed. The size shown in the drawing is the same as the size of one pixel. This pixel is divided into a plurality of sub-pixels (16 sub-pixels in this drawing) as shown in FIG. 50B, and then vector data is put on the sub-pixels as shown in FIG. 50C. A value of the sub-pixel, upon the half portion and more of which the vector data is put, is defined as "1 (black)", and a value of the sub-pixel except for that is defined as "0 (white)" as shown in FIG. 50D. When a total of the values of 16 sub-pixels is defined as a pixel value of the pixel concerned, multi-value raster data can be generated in which the half-tone data is arranged in the edge portion. In this example, as shown in FIG. 50E, the pixel value is "5". Since the pixel is divided into 16 sub-pixels in the example shown in FIG. 50, gradation of the multi-value raster data is composed of 17 steps from "0" to "16". In this case, when the pixel is divided into more sub-pixels, it is possible to obtain multi-value raster data, the number of gradation steps of which is larger. Anti-alias processing described above has been improved in various ways, for example, the following are proposed to provide a higher printing quality.

Japanese Unexamined Patent Publication No. 4-195268 discloses the following technique. According to an inclination of vector data, a shape of the sub-pixel is changed, and a ratio of the area of the vector data in the pixel concerned is reflected in the multi-value raster data as accurately as possible, and this data is printed out by a multi-value laser printer. In this connection, FIG. 51 is a view showing a laser beam lighting signal control section of a laser printer capable of outputting multi-value raster data. As shown in FIG. 51, multi-value raster data S10 is converted into an analog signal S20 by a D/A converter, and the thus converted analog signal is compared with a reference triangular wave signal S30. The result of this comparison is used as a laser control signal. By this laser control signal, a laser beam is subjected to the pulse width modulation (PWM), so that a half-tone image can be outputted.

FIG. 52 is a view showing models of the signals S20, S30 and S40 of FIG. 51 when the above technology is applied to xerography (electrophotography) of the image writing system in which the laser is turned on in a period of time in which toner is made to adhere onto a sheet of paper. As shown in this drawing, the image signal S20, which has been converted into an analog value, is compared with the reference triangular wave S30, and the laser is turned on, that is, the laser is controlled to be lit when the image signal is higher than the reference triangular wave.

Japanese Unexamined Patent Publication No. 5-328108 discloses the following technique. An edge portion of a multi-value image data is detected, and the reference wave form is changed over in accordance with the result of the edge detection. In this way, the edge portion is smoothly outputted. For example, in the circuit shown in FIG. 53, a direction of the edge of the multi-value raster image is detected, and three types of triangular waves (shown in FIG. 54) are appropriately changed over in accordance with the result of the detection. In this way, it becomes possible to obtain a laser lighting signal shown in FIG. 55. When the laser lighting signal shown in FIG. 52 is compared with that shown in FIG. 55, the edge portion shown in FIG. 52 is separate from the center, however, the center of the edge portion is continuous in FIG. 55. That is, printing is conducted in a good condition in FIG. 55.

Japanese Unexamined Patent Publication No. 4-148949 discloses a vector image printer in which the operation is conducted as follows. While the anti-alias processing is being conducted, a vector image is developed in the image data and a predetermined image processing is conducted, and then the data is printed by the multi-value printer. This printer includes: an image data accommodating means for accommodating image data which has been subjected to the anti-alias processing; and a characteristic value accommodating means for accommodating characteristic information of the image data. Image data and characteristic information are simultaneously read out from these means while the characteristic information is referred to, and the corresponding image data is printed in the most appropriate condition.

In this connection, the following problems may be encountered in the anti-alias processing disclosed in Japanese Unexamined Patent Publication No. 4-195268. When the multi-value raster data is generated from the vector data, the sub-pixel shape is changed by an inclination of the vector data in the anti-alias processing, so that an area ratio of the vector data occupied in the pixel concerned can be reflected in the multi-value raster data as accurately as possible. However, the multi-value raster data, which has been generated, is provided with only the density information. Accordingly, when an image of small characters or an image containing lines is processed, a problem of "block" is caused.

The following problems may be encountered in the anti-alias processing disclosed in Japanese Unexamined Patent Publication No. 5-328108. Edge detection is conducted on the multi-value raster data. Accordingly, this anti-alias processing is effective when relatively large characters are processed. However, when small characters are processed, there is a possibility that the edge detection is not successfully conducted.

The following problems may be encountered in the anti-alias processing disclosed in Japanese Unexamined Patent Publication No. 4-148949. Although the above defects are not caused in this case since the control is conducted in accordance with the characteristic information of image data, it is necessary to provide a characteristic information accommodating means for all pixels in addition to the image data accommodating means. Accordingly, it becomes necessary to increase the memory capacity.

SUMMARY OF THE INVENTION

The present invention has been accomplished in view of the above circumstances. An object of the present invention is to provide an image processing apparatus in which the occurrence of "block" can be prevented without increasing the memory capacity, and further edge detection can be effectively conducted even on small characters.

Another object of present invention is to reduce zigzag edges caused in the contours when character line images are reproduced.

Still another object of present invention is to prevent the deterioration of image quality such as "rupture of fine lines".

Still another object of present invention is to provide an image forming apparatus by which the contour of a character line image can be more sharply reproduced in the formation of an image on which the character line image and the half-tone image are mixed with each other.

In order to solve the above problems, the present invention is to provide an image processing apparatus for processing both image data expressing a character line image and half-tone density data, comprising: a multi-value means for converting image data expressing a character line image into multi-value image data; a characteristic information generating means for generating characteristic information indicating a direction of the edge of image data expressing the character line image; a storing means for storing a set of information containing the multi-value image data outputted from the multi-value means and the characteristic information outputted from the characteristic information generating means, the storing means also storing half-tone density data and sending the stored contents to an image output means; and a flag adding means for adding a flag to the half-tone density data stored in the storing means and also for adding a flag to the multi-value image data outputted from the multi-value means, so that the data can be discriminated, wherein the bit number of the multi-value image data expressing the character line image is made to be smaller than the bit number of the half-tone density data, and the bit number of the characteristic information is set at a value smaller than the difference between them.

In the image processing apparatus, a sum of the output bit number of the multi-value means and the output bit number of the characteristic information generating means is smaller than the bit number of the half-tone density data. Accordingly, it is not necessary to provide an individual storage section of characteristic information, and both are stored in the storage means described before. Especially when the sum of the output bit number of the multi-value means and the output bit number of the characteristic information generating means is made to be the same as the bit number of half-tone density data, a storage area in the storage means is not wasted, so that data can be effectively stored.

Further, according to the invention, in the above-described image processing apparatus, the inequality L≧K is satisfied. Where L is a bit number of multi-value image data expressing a character line image (L>1), M×N is an output resolution per one inch of the image output means (M, N>1), and K is a value computed by the following expression.

$$K=[log_2\{(2400\times2400/(M\times N)\}]$$

In the above expression, [A] represents an integer portion of A.

In the image processing apparatus, even when an image output unit (printer) of low resolving power, the resolution of which is not more than 2400 dpi, is used, it is possible to obtain the same printing quality as that of an image output unit, the resolution of which is 2400 dpi. Accordingly, when printed images are seen with the naked eye, zigzag edges generated in the process of digitization are seldom recognized by a viewer.

Further, according to the present invention, it is provided an image processing apparatus into which image data to be formed into an image is inputted and the image data is converted into multi-value image data and then the multi-value image data is outputted, the image processing apparatus, comprising: an extracting means for extracting the contour information of a character line image from the inputted image data; a generating means for generating characteristic information to indicate a direction of the edge of the contour information extracted by the extracting means and also generating multi-value image data in which the contour information is made into multi-values; a storing means for storing a set of characteristic information of the contour information generated by the generating means and multi-value image data, the storing means storing multi-value image data except for the contour information, the storing means sending the stored contents to an image output means; and a flag adding means for adding a flag to the multi-value image data of the contour information stored in the storing means and also for adding a flag to the multi-value image data except for the contour information so that the data can be discriminated, wherein the bit number of the multi-value image data of the contour information is made to be smaller than the bit number of the multi-value image data except for the contour information, so that the bit number of the characteristic information is set at a value smaller than a difference between them.

In the image processing apparatus, the sum of the output bit numbers of the generating means is smaller than the bit number of the multi-value image data except for the contour information. Accordingly, it is not necessary to provide an exclusive storage means of the characteristic information, and both are stored in the aforementioned storage means. Especially when the sum of the output bit number of the generating means is made to be the same as the bit number of the multi-value image data except for the contour information, a storage area of the storage means is not wasted, and data can be effectively stored.

Further, according to the present invention, in the image processing apparatus, the generating means generates bit map data of high resolution in the contour portion of the character line image in accordance with the contour information, and the resolution is converted at a position shifted by 1/n (n is a natural number) of one pixel of the bit map data of high resolution so as to generate the multi-value image data.

When the resolution of image data is converted in accordance with the resolution of the image forming apparatus provided in the next stage, projection is conducted while the intervals of pixels are shifted. Therefore, it is possible to reproduce a 2-bit line on an image without causing a fine line rupture.

According to the invention, in the processing apparatus, the generating means corrects the generated characteristic information or the multi-value image data in accordance with the characteristic information of a peripheral pixel or the multi-value image data.

The characteristic information of a target pixel and the multi-value image data are corrected in accordance with the characteristic information of a peripheral pixel and the multi-value image data. Therefore, the occurrence of a fine line rupture and block of characters can be prevented.

Further, according to the invention, it is provided an image processing apparatus into which image data to be formed into an image is inputted and the image data is converted into multi-value image data and outputted, the image processing apparatus comprising: an extracting means for extracting the contour information of a character line image from the inputted image data; a developing means for enhancing a resolution of the contour information extracted by the extracting means to be high and also for developing the contour information as the data of high resolution; a storing means for storing the high resolution data of the contour information developed by the developing means and the multi-value image data except for the contour information and also for sending the stored contents to an image output means; and a flag adding means for adding a flag to the high resolution data of the contour information stored in the storing means and also for adding a flag to the multi-value image data except for the contour information so as to discriminate the data, wherein the bit number of the high resolution data of the contour information is set at a value smaller than the bit number of the multi-value image data except for the contour information.

The bit number of high resolution data to be developed is smaller than the bit number of the multi-value image data except for the contour information. Therefore, it is not necessary to provide an exclusive storage means for high resolution data, and both are stored in the aforementioned storage means. Especially when the bit number of high resolution data is made to be the same as the bit number of the multi-value image data except for the contour information, a storage area of the storage means is not wasted and data can be effectively stored. Since the contour information of a character line image is held in the form of high resolution data, the contour of the character line image can be smoothed and sharpened.

Furthermore, according to the invention, in the image processing apparatus, a predetermined bit is referred with respect to the image data recognized to be contour information according to the flag value, and it is discriminated whether the contour information is the high resolution data, the resolution of which has been enhanced by the developing means, or the contour information is the standard resolution data, the resolution of which has not been enhanced by the developing means.

When a predetermined bit (flag) contained in the image data or added to the image data is referred to, it is discriminated whether the image data is high resolution data or standard resolution data. Accordingly, it is possible to process image data in which the high resolution data and the standard resolution data are mixed with each other.

According to the invention, in the image processing apparatus, a predetermined bit is referred to with respect to the image data recognized to be contour information according to the flag value, and the characteristic of the inputted original image data is recognized.

When a predetermined bit (flag) contained in or added to the image data is referred to, the characteristic of an inputted original image data is recognized. Therefore, processing can be changed over so as to select the most appropriate processing suitable for the characteristic of the inputted original image data.

Further, according to the present invention, it is provided an image processing apparatus into which image data to be formed into an image is inputted and the image data is converted into multi-value image data and outputted, the image processing apparatus comprising: a first extracting means for extracting the contour information of a character line image from the inputted image data; a smoothing means for smoothing the image data of the contour information extracted by the first extracting means; a second extracting means for extracting a second contour information from the image data of the contour information on which the smoothing processing has been conducted; a generating means for generating the multi-value image data in which the characteristic information indicating the edge direction of the second contour information extracted by the second extracting means and the second contour information are subjected to a resolution conversion; a storing means for storing a set of the characteristic information of the second contour information generated by the generating means and the multi-value image data and also for storing the multi-value image data except for the second contour information and for sending the stored contents to an image output means; and a flag adding means for adding a flag to the multi-value image data of the second contour information stored in the storing means and also for adding a flag to the multi-value image data except for the contour information so as to discriminate the data, wherein the bit number of the multi-value image data of the second contour information is made to be smaller than the bit number of the multi-value image data except for the second contour information so that the bit number of the characteristic information is set at a value smaller than a difference between them.

Before the resolution conversion is conducted in accordance with the resolution of the image forming apparatus provided in the next stage, smoothing processing is conducted on the contour information. Therefore, it is possible to reduce zigzag edges on a character line image.

Further, the image forming apparatus constitute an electrophotographic printer having a light emitting element capable of forming an image corresponding to image data outputted from the image processing apparatus described in the above, wherein a quantity of light emitted by the light emitting element is determined by the flag value.

An exposure amount in the case of contour information of a character line image can be made different from an exposure amount in the case of multi-value image data except for the contour information. Therefore, the contour of the character line image can be more sharply reproduced.

BRIEF DESCRIPTION OF THE DRAWINGS

FIGS. 5A–5E are a view to explain the high density processing in the first embodiment;

FIG. 6 is a view showing a bit map pattern to detect the edge direction in the first embodiment;

FIG. 10 is a view to explain an example of the processing in the first embodiment;

FIG. 38A–38B are a view showing an example of the data format of flag/image data in the seventh embodiment of the present invention;

FIG. 39 is a view showing an example of the data format in the case where flag/image data is a bit map in the seventh embodiment;

FIG. 48 is a view showing an example of the data format of flag/image data in the eighth embodiment of the present invention;

FIG. 50A–50E are a schematic illustration to explain the common anti-alias processing;

FIG. 51 is a block diagram of an example of the laser control signal generating circuit of the conventional laser printer;

DESCRIPTION OF THE PREFERRED EMBODIMENTS

Referring to the accompanying drawings, embodiments of the present invention will be explained as follows.

First Embodiment

Figure 2:
FIG. 2 is a block diagram showing an outline of the arrangement of the first embodiment.

FIG. 2 is a block diagram showing an outline of the arrangement of the first embodiment of the present invention. This is an embodiment of the present invention in which vector data such as an outline font to be used as a page describing language PDL, a scan-in image which has been read by a scanner or an electronic still camera, and half-tone data generated by the use of various DTP (desk top publishing) soft ware are mixed with each other on an image.

In FIG. 2, reference numeral 201 is a converting section in which the page describing language PDL is converted into raster data having a flag. Raster data having a flag which has been converted by this converting section 201 is printed out by a laser printer 202.

Figure 3:
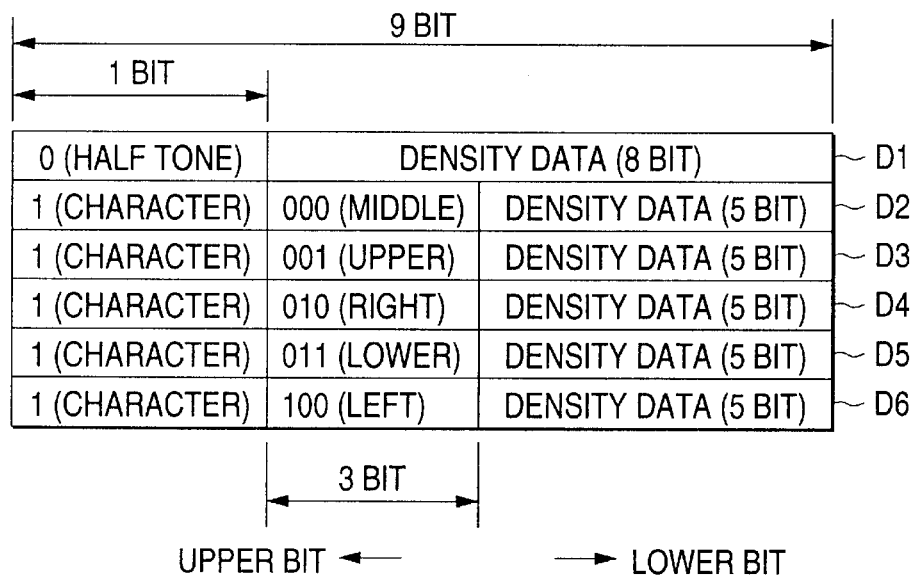
FIG. 3 is a view showing the format of raster data having a flag of the first embodiment.

FIG. 3 shows an example of the raster data having a flag. In FIG. 3, D1 to D6 are raster data having a flag. As shown in the drawing, the raster data is composed of 9 bits. The uppermost bit of each data is a flag to discriminate whether the pixel concerned is half-tone data or vector data. In the case of "0", it shows that the pixel concerned is a scan-in pixel or half-tone data generated by DTP. In the case of "1", it shows that the pixel concerned is vector data (characters and lines) such as an outline font in the page describing language. Accordingly, in the example shown in the drawing, raster data D1 corresponds to half-tone data, and raster data D2 to D6 correspond to vector data (characters/lines).

Figure 4:
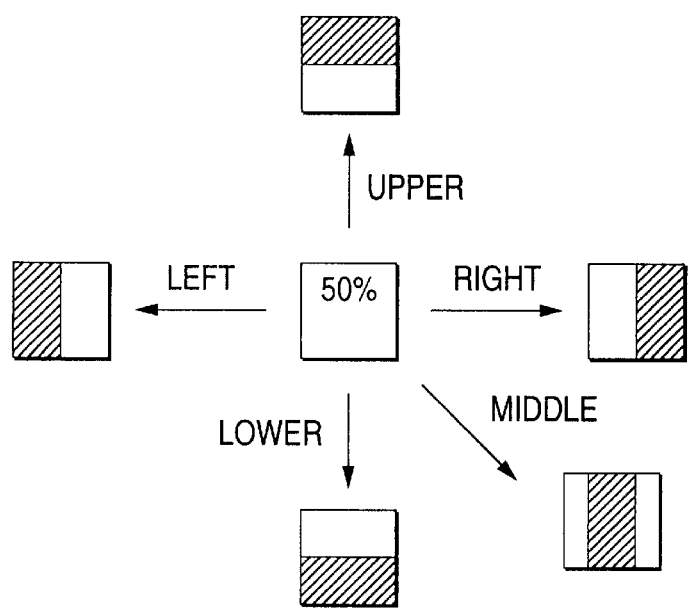
FIG. 4 is a view showing a relation between the characteristic flag and the edge direction in the first embodiment.

Concerning the raster data D1 representing the raster image, the lower 8 bits are density data. Concerning the raster data D2 to D6 representing the vector data, the lower 5 bits are density data, and the lower 6 to 8 bits are characteristic flags. There are provided 5 types of characteristic flags of "000", "001", "010", "011" and "100". In this case, the characteristic flags are made in the following manner. As shown in FIG. 4, at the pixel, the density of which is 50%, the edge positions are detected. In accordance with the positions of middle, upper, right, lower and left, the characteristic flags "000", "001", "010", "011" and "100" are allotted. In this connection, the generation of this characteristic flag will be described later.

Figure 1:
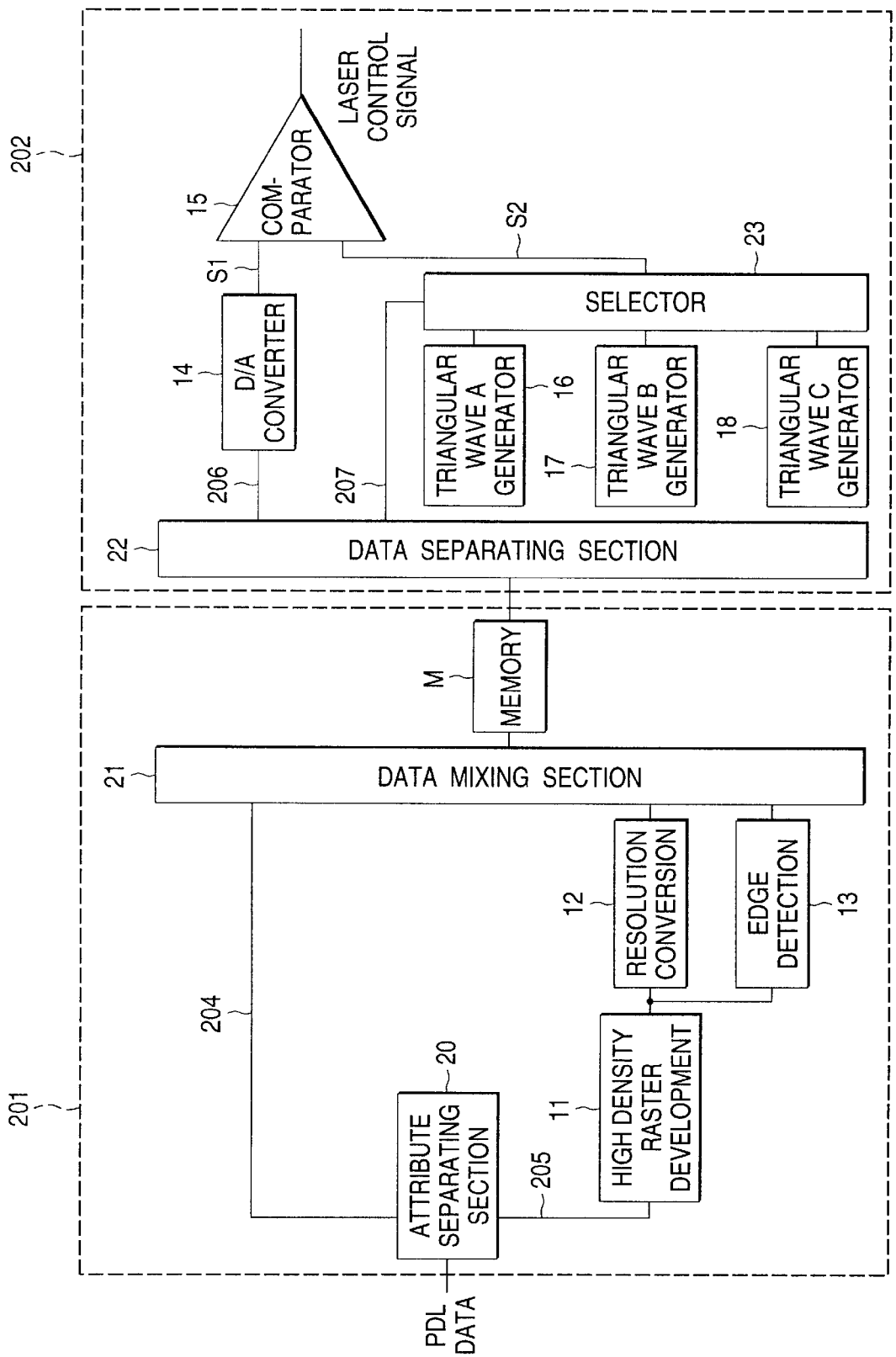
FIG. 1 is a block diagram showing an overall arrangement of the first embodiment of the present invention.

Next, FIG. 1 is a block diagram showing an arrangement of the embodiment in detail. In the drawing, reference numeral 20 is an attribute separating section, which separates PDL data to vector data and half-tone data. Concerning PDL data, for example, Interpress (Registered Trademark of Xerox Co.) and Postscript (Registered Trademark of Adobe Co.) are well known, however, an arbitrary language may be used in this case. The attribute separating section 20 recognizes the type of data prescribed by PDL language and separates data in accordance with the result of the recognition.

Next, the high density raster developing section 11 develops the vector data supplied from the attribute separating section 20 into raster data, the density of which is higher than the resolution of a printer. The thus obtained raster data is sent to the resolution converting section 12 and the edge detecting section 13. In the high density raster developing section 11, processing is conducted in the same manner as that shown in FIG. 50. However, in this embodiment, one pixel is divided into 9 (3×3) sub-pixels. Accordingly, processing is conducted as shown in FIGS. 5A to 5D. In the figures, the processing shown in FIGS. 5A to 5D corresponds to the processing shown in FIGS. 50A to 50D.

Next, the resolution converting section 12 converts the high density digital raster data, which has been developed by the high density image developing section 11, into the digital raster data, the resolution of which is the same as the resolution of a printer. That is, in the case shown in FIG. 5, when the value "1" of the sub-pixel in FIG. 5D is totalized, the data is converted into the digital raster data, the density (pixel value) of which is "5". In this connection, as described in FIG. 3, the density data in this embodiment is composed of 5 bits. Therefore, the number of sub-pixels may be increased and the number of gradation may be also increased in the allowed range.

Next, the processing conducted in the edge detecting section 13 will be explained below. This edge detecting section detects an edge of each pixel in accordance with the high density raster data (shown in FIG. 5D) outputted from the high density raster developing section 11. In this case, FIG. 6 is a view in which the processing conducted by the edge detecting section 13 is shown. In FIG. 6, P1 to P6 are bit map patterns to detect the edge directions. The direction of each edge is detected when a target pixel coincides with one of the patterns. In the bit map patterns P1 to P6, "1" represents that the sub-pixel concerned is black, the value of which is "1", and "0" represents that the sub-pixel concerned is white, the value of which is "0". In this case, other sub-pixels may be either white or black.

In the case where the target pixel coincides with one of the bit map patterns P1, P4 and P6, the edge direction is right. In the case where the target pixel coincides with one of the bit map patterns P2, P3 and P5, the edge direction is left. In this connection, in order to simplify the explanation, only the bit map patterns to detect the right and left edges are shown in FIG. 6, however, the bit map patterns to detect the upper and lower edges and the bit map patterns to detect the central edge are actually prepared. These bit map patterns are previously stored in the storage means such as ROM and RAM. They are appropriately read out and referred to in the process of edge detection. In the manner described above, the characteristic flag of 3 bits shown in FIG. 3 is generated.

The half-tone data outputted from the attribute separating section, the density data of 5 bits outputted from the resolution converting section 12, and the characteristic flag of 3 bits outputted from the edge detecting section 13 are mixed in the data mixing section 21, so that the data of the format shown in FIG. 3 can be generated.

Next, reference character M represents a memory, which stores the data generated by the data mixing section. In this case, as shown in FIG. 3, both the half-tone data and the vector data are stored as the data of 9 bits. Further, the characteristic flag is stored as a portion of the raster data based on the vector data. Therefore, a storage region of the memory M is effectively used, and further it is not necessary to separately provide a memory used for the characteristic flag.

Figures 7, 8, 9:
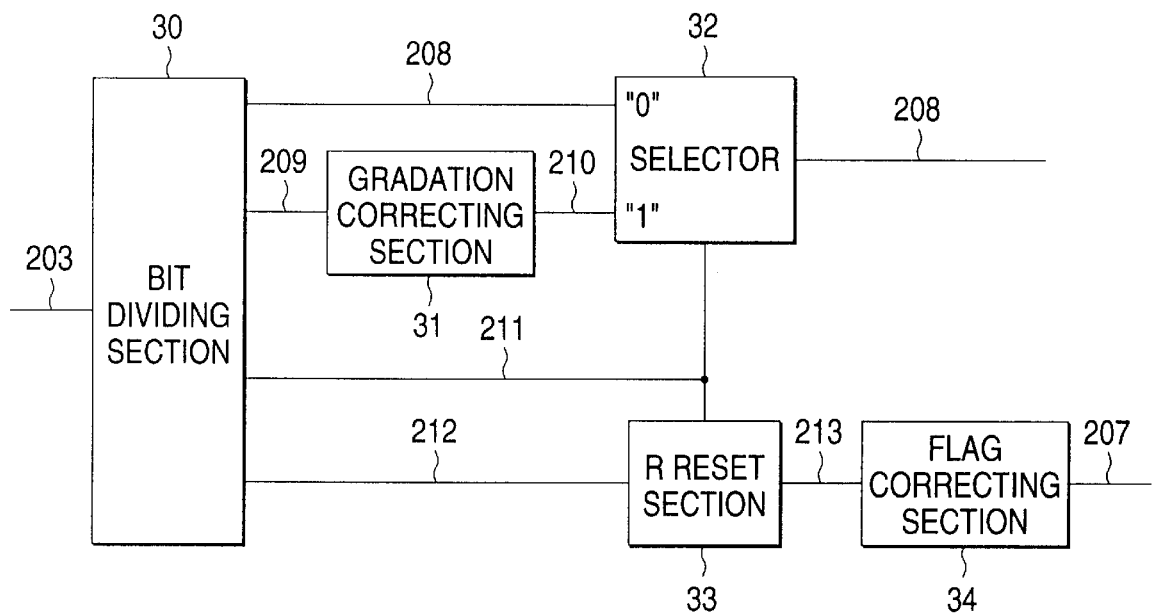
FIG. 7 is a block diagram showing an arrangement of the data separating section in the first embodiment.
FIG. 8 is a view showing a content of processing conducted in the flag correcting section 34 shown in FIG. 7.
FIG. 9 is a view to explain the wave-form selecting processing conducted by the selector 23 in the first embodiment.

Reference numeral 22 shown in FIG. 1 is a data separating section, which separates the raster data that has been read out from the memory M. In this case, FIG. 7 is a block diagram showing an arrangement of the data separating section 22. In the drawing, reference numeral 30 is a bit separating section. The bit separating section 30 extracts signals as follows. The uppermost bit of the raster data that has been read out from the memory M is extracted as a signal 211. The lower 8 bits are extracted as a signal 208. The lower 5 bits are extracted as a signal 209. The upper 4 bits except for the uppermost bit are extracted as a signal 212. Reference numeral 32 is a selector that selects the input terminal "0" when the signal 211 is "1" and also selects the input terminal "1" when the signal 211 is "0".

When the signal 211 (the uppermost bit) is "1", the selector 32 selects the input terminal "0". Since the pixel concerned is half-tone data at this time (shown in FIG. 3), the signal 208 (the lower 8 bits) becomes its density data, which is outputted as a signal 206 through the selector 32.

On the other hand, when the signal 211 is "0", the selector 32 selects the input terminal "1". Since the pixel concerned is vector data at this time, the signal 209 (the lower 5 bits) becomes its density data, which is outputted as a signal 206 through the gradation correcting section 31 and the selector 32. The gradation correcting section 31 converts the density data of 5 bits into 8 bits and includes an adder and a look-up table. Therefore, the gradation correcting section 31 conducts a converting operation from 5 bits to 8 bits according to a predetermined regulation. Accordingly, after the density data of the vector data has been converted into 8 bits, it is outputted as a signal 206.

As described above, the signal 206 becomes a signal representing the density of the half-tone data or the vector data.

Next, the reset section 33 makes the output signal 213 of 3 bits to be "000" when the signal 211 supplied to the reset terminal R is "0". Also, the reset section 33 makes the signal 212 to be outputted as the signal 213 when the signal 211 is "1". When the signal 211 is "1", the pixels concerned is vector data. Therefore, the signal 212 becomes a characteristic flag shown in FIG. 3, wherein the signal 212 is a signal in which the uppermost bit is removed from the upper 4 bits. Accordingly, the signal 213 outputted from the reset section 33 becomes a characteristic flag when the pixel concerned is vector data. Also the signal 213 outputted from the reset section 33 becomes a reset value "000" when the pixel concerned is half-tone data.

The flag correcting section 34 conducts a conversion shown in FIG. 8 on the characteristic flag of 3 bits supplied from the reset section 33, so that the signal 207 of 2 bits is outputted from the flag correcting section 34. As can be seen in FIG. 8, except when the characteristic flag shows right or left, the value "00" is outputted at all times. In this case, "00" means that there are no edges. The reason why the correction is conducted in the above manner is that only the correction of right and left is conducted in this embodiment as described later.

Figure 54:
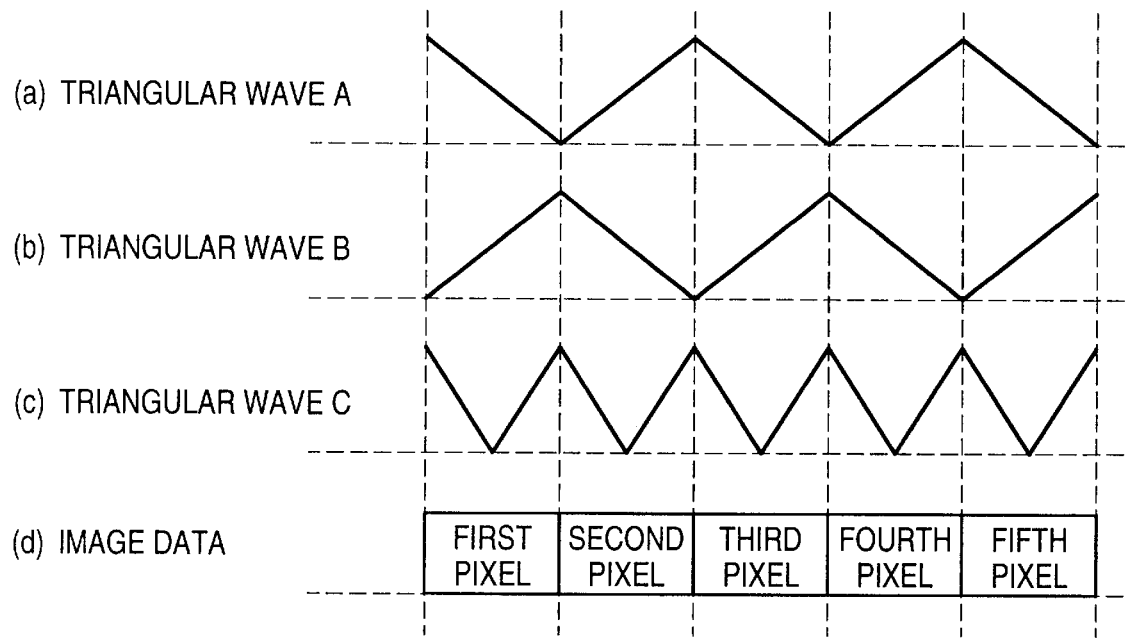
FIG. 54 is a wave-form diagram showing triangular waves used in the circuit shown in FIG. 53.
Figure 55:
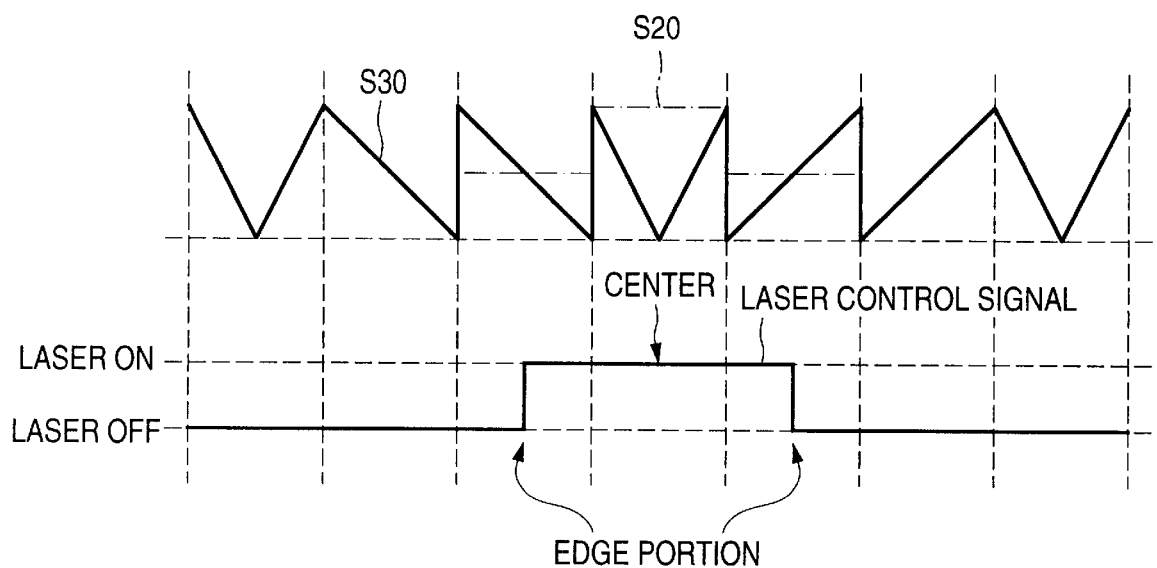
FIG. 55 is a wave-form diagram showing a wave-form of the primary portion of the circuit shown in FIG. 53.

In FIG. 1, reference numeral 14 is a D/A converter for converting the signal 206 into an analog signal. Reference numerals 16, 17 and 18 are triangular wave generators which respectively generate different triangular waves. In this embodiment, the triangular wave generators 16, 17 and 18 respectively generate triangular waves A, B and C shown in (a), (b) and (c) of FIG. 54. Reference numeral 23 is a selector for selecting one of the triangular wave generators 16, 17, 18 in accordance with the signal 207. FIG. 9 is a view showing a selection processing of the selector 23. As shown in FIG. 9, the triangular wave is selected in accordance with the signal 207 representing an edge direction and also in accordance with an odd/even number of the pixel. Reference numeral 15 is a comparator in which an output signal of the D/A converter 14 is compared with one of the output signals of the triangular wave generators 16 to 18 selected by the selector 23, and the result of comparison is outputted as a laser control signal. The laser control signal outputted from the comparator 15 is supplied to a laser output section (not shown) of the laser printer 202 so that the light emitting time of the laser is controlled.

Next, operation of the embodiment arranged as described above will be explained below.

First, PDL data is separated by the attribute separating section 20. In the case where its pixel is vector data, PDL data is developed into raster data of high density by the high density raster developing section 11. In this case, data is divided into sub-pixels, the pixel numbers of which are (1) to (4) as shown in (a) of FIG. 10. As shown in FIG. 10, vector data B1 is put on the sub-pixels (1) to (4). In this case, the output signal of the high density raster developing section 11 is shown in (b) of FIG. 10. As a result, density data outputted from the resolution converting section 12 becomes "9", "6", "6" and "9" with respect to the pixel numbers (1), (2), (3) and (4).

The characteristic flag is made by the edge detecting section 13 and mixed with the density data by the data mixing section 21. Half-tone data separated by the attribute separating section 20 is also inputted into the data mixing section 21, and the format data shown in FIG. 3 is made. This data is temporarily stored in the memory M and transferred to the data separating section 22, and the signals 206 and 207 are made in a accordance with the content of the raster data. In the example shown in FIG. 10, the value of the signal 207 indicating the edge direction is shown in (c) of FIG. 10. As a result, the triangular waves C, A, A, and C are selected by the selector 23 with respect to the pixel numbers (1), (2), (3) and (4).

On the other hand, the signal 206 corresponding to density is converted into an analog signal by the A/D converter 14. Therefore, the signal 206 is converted into signal S1 shown in (d) of FIG. 10. In this case, the comparator 15 compares the triangular wave selected for each pixel with the signal S1 (shown in (d) of FIG. 10). Therefore, the laser control signal shown in (e) of FIG. 10 is provided as a result of the comparison. Accordingly, the actual printing is conducted for each pixel as shown in (f) of FIG. 10, and images are clearly printed while the right edge end is not connected with the left edge end.

In the case of a printer in which the positional control can be conducted in a direction perpendicular to the laser scanning direction, the characteristic flags of "upper" and "lower" can be effectively used, for example, the laser scanning density in the auxiliary scanning direction of the laser printer is made double, and lighting of the laser is controlled with respect to the two divided scanning operations. Further, when the triangular wave C is selected in accordance with the characteristic flag of "middle", all the five characteristic flags can be effectively used. Accordingly, the flag correcting section 34 shown in FIG. 7 is not required in this case.

In the above embodiment, in order to simplify the explanation, gray data is expressed by 10 steps of gradation. However, in general, even in the case of binary printing of white and black, zigzag edges of characters, which are caused in the process of sampling for digitization, can not be recognized by human's eyes as long as the resolution is maintained at 2400 dpi (2400 pixels×2400 pixels per one inch square). Accordingly, when a printer capable of expressing the gray scale is used, even if the resolution is low (lower than 2400 dpi), the same printing quality can be obtained when the bit number of multi-value image data expressed by a character/line image is set at a value corresponding to a ratio of the resolution per one inch square.

For example, when the information indicating the edge direction is composed of 3 bits, the bit number of a multi-value image may be determined as follows.

When the bit number of a multi-value image is L (L>1), and the resolution of a printer is MN pixels (M, N>1) per one inch square, the following expression is established.

$$K=[log_2\{(2400\times2400)/(M\times N)\}] \tag{1}$$

In the above expression, [A] expresses an integer section of numeral A. Then it is sufficient that the inequality L≧K is satisfied.

For example, in the case of a printer, the resolution of which is 400 dpi, since the following expressions are satisfied, $$(2400\times2400)/(400\times400)=36$$

$$log_2(36)=5.12928$$

when there is provided gray data of 5 bits (32 steps of gradation) and also there is provided information of the edge direction of 3 bits, it becomes substantially the same as 1 bit of 2400 dpi.

In the case of a printer of 600 dpi, since the following expressions are satisfied, (2400×2400)/(600×600)=16

$log_2(16)=4$ when there is provided gray data of 4 bits (16 steps of gradation) and also there is provided information of the edge direction of 3 bits, it becomes substantially the same as 1 bit of 2400 dpi.

In the above embodiment, the image writing type laser beam printer, in which an image is written when the laser is turned on, is used, however, it should be noted that the printer is not limited to the specific type, and it is possible to use an arbitrary type printer.

In the above embodiment, the multi-value data of white and black is processed. However, when the data of a color image is processed, it is common that one piece of pixel data is expressed by a plurality of components such as "red (R), blue (B), green (G)", "magenta (M), cyan (C), yellow (Y)", "lightness (L*), hue (H*), saturation (C*)" or "L*a*b*". In this case, the aforementioned embodiment may be applied to each component.

Second Embodiment

Figure 11:
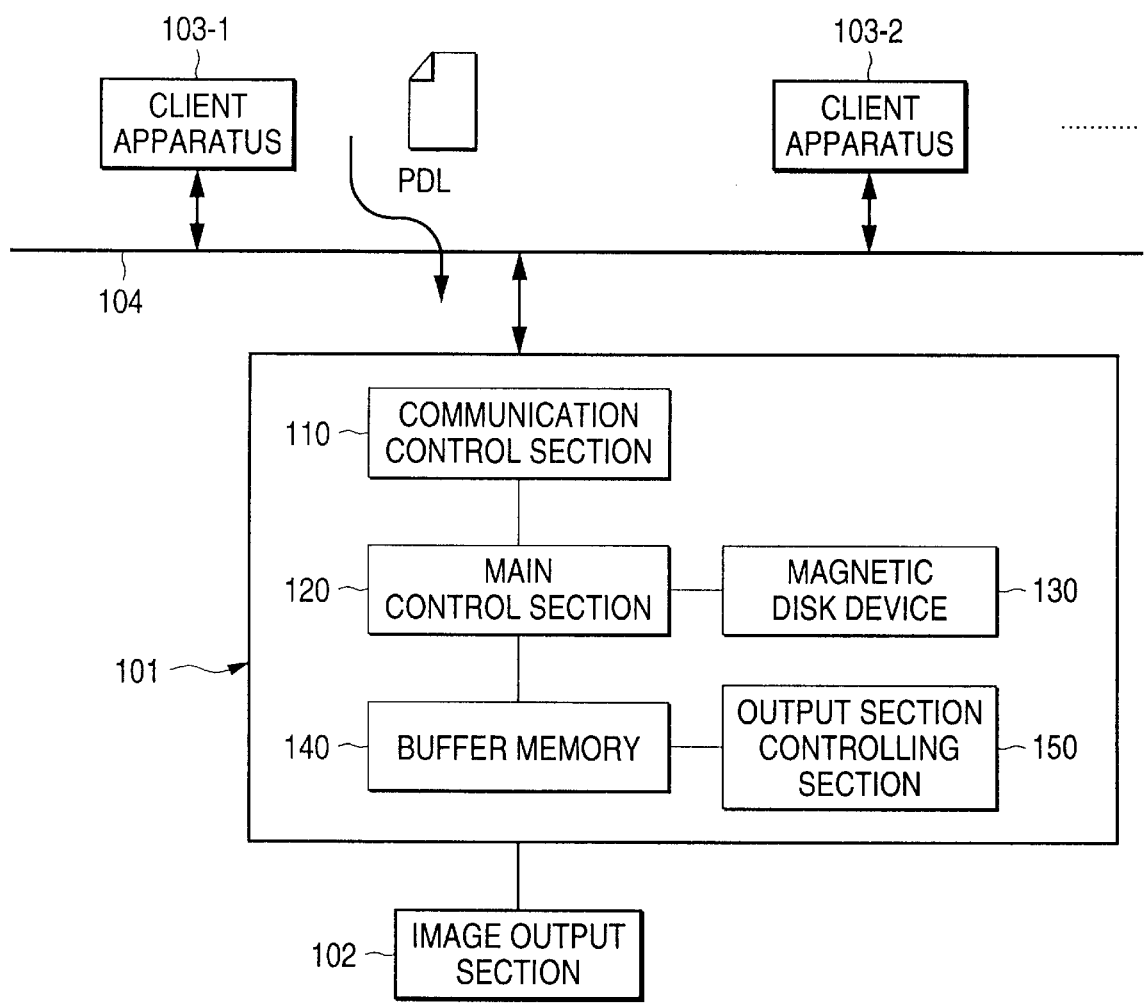
FIG. 11 is a block diagram showing an overall arrangement of the second embodiment of the present invention.

Next, the second embodiment of the invention will be explained below. FIG. 11 is a block diagram showing an overall arrangement of the second embodiment of the present invention. In FIG. 11, the image processing apparatus 101 is connected to a plurality of client apparatus 103-1, 103-2, . . . , and also connected to a server not shown in the drawing via a network 104. The image processing apparatus 101 includes: a communication control section 110, primary control section 120, magnetic disk unit 130, buffer memory 140, output control section 150, and image output section 102. In this embodiment, only the image output section 102 is separately arranged, however, the image output section 102 may be arranged integrally with the image processing apparatus 101.

For example, the network 104 is composed of Eathernet (Trade Mark of Xerox Co.) and supports a plurality of protocols in accordance with the application programs carried out by the client apparatus 103-1, 103-2, . . . , and the server.

For example, the communication control section 110 conducts a communication control of CSMA/CD (Carrier Sense Multiple Access/Collision Detect) of Ethernet. By this communication control section 110, data received from other apparatus in the network 104 is transferred to the primary control section 120, and the analysis of communication protocol and interpretation/execution of PDL are conducted, and data to be outputted from the image output section 102 is successively written in the buffer memory 140.

In the magnetic disk unit 130, there are accommodated an operation system for controlling each section of the image processing apparatus 101, a device driver, and an application program. The above software is loaded in the primary storage unit (not shown) in the primary control section 120 at any time and carried out. In the magnetic disk unit 130, there is accommodated a data base corresponding to, for example, OPI (Open Prepress Interface: Trade Mark of Aldus Co.) system, and necessary information is read out from the data base in accordance with an OPI command designated by the primary control section 120. When the storage capacity of the primary storage unit (not shown) or the buffer memory 140 is insufficient, the magnetic disk unit 130 functions as a temporary storage to store the data.

The buffer memory 140 temporarily stores image data having a flag (referred to as flag/image data hereinafter in this specification) which has been processed by the primary control section 120. Flag/image data temporarily stored in the buffer memory 140 is sent to the image output section 102 and outputted as an image when the communication is controlled in such a manner that the image output section 102 is synchronized with the output section controlling section 150.

Figure 12:
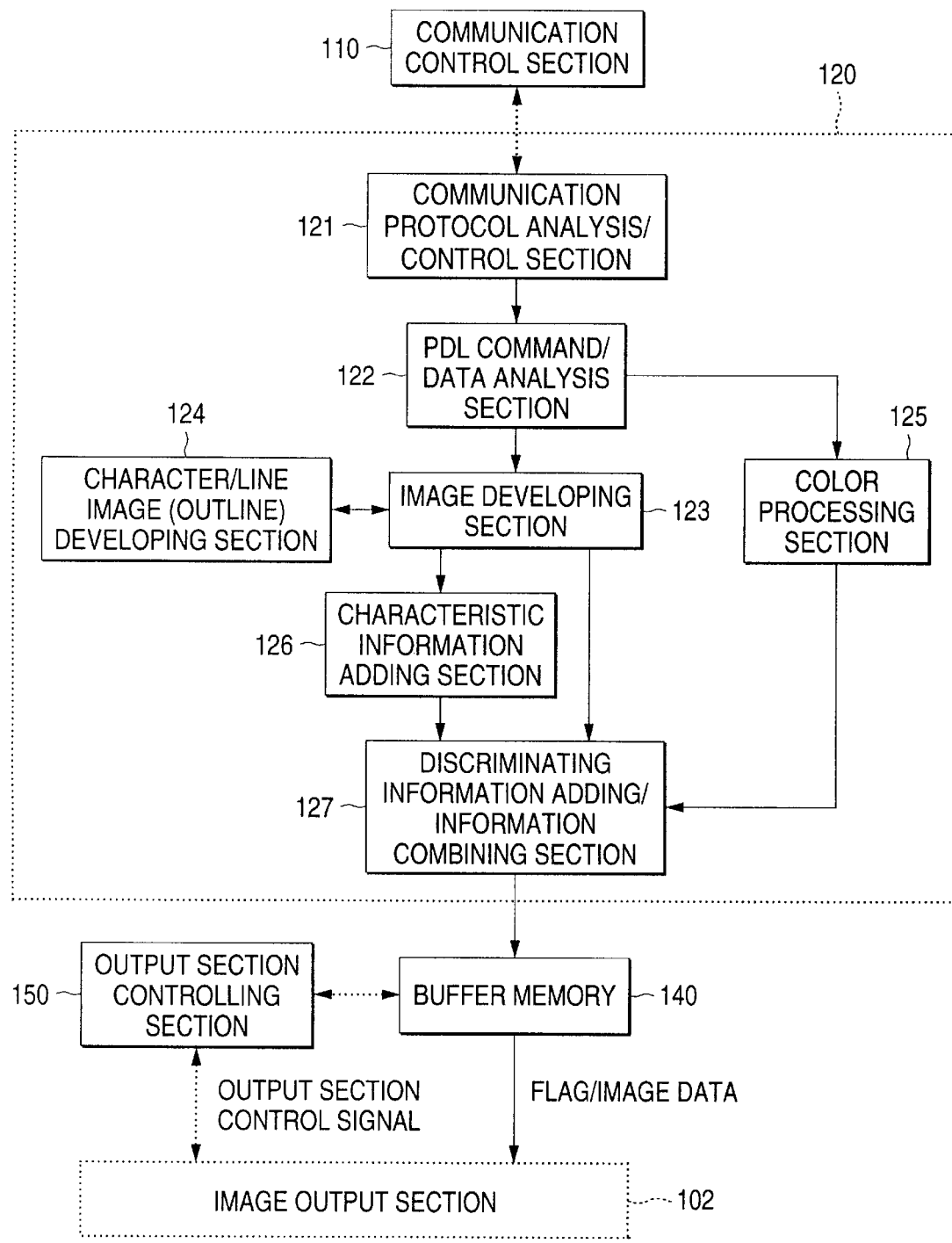
FIG. 12 is a view showing an arrangement of the main control section 120 in the second embodiment.

FIG. 12 is a block diagram showing an arrangement of the primary control section 120 for controlling each section of the image processing apparatus 101. As shown in FIG. 12, the primary control section 120 includes: a communication protocol analysis/control section 121, PDL command/data analysis section 122 for analyzing the page describing language (PDL), image developing section 123, character/line developing section 124, color processing section 125, characteristic information adding section 126, and discrimination information adding/information combining section 127.

The communication protocol analysis/control section 121 is connected to the communication control section 110. The discriminating information adding/information combining section 127 is connected to the buffer memory 140. Therefore, the communication protocol analysis/control section 121 and the discriminating information adding/information combining section 127 compose a printing system together with the output control section 150 and the image output section 102.

Data is received from other apparatus provided in the network 104 by the communication control section 110. Then the data is inputted into the communication protocol analysis/control section 121 of the primary control section 120. This data contains printing information in which the scanning image information described in PDL and the code information are mixed with each other. In some cases, the printing information described in PDL contains an OPI command corresponding to the OPI system.

The communication protocol analysis/control section 121 analyzes a protocol of information received by the communication control section 110. In the received information, the printing information described in PDL is transferred to the PDL command/data analysis section 122. It is possible for the communication protocol analysis/control section 121 to process a plurality of protocols. For example, it supports TCP/P, Apple Talk (Trade Mark of Apple Co.), and SPX/IPX (Trade Mark of Novel Co.).

On the contrary, when a request for investigation of the condition of the image output section 102 is returned to other apparatus in the network 104, a communication protocol is controlled in accordance with the apparatus that has made a request, and information is outputted to the communication control section 110.

In the information received through the communication control section 110 and the communication protocol analysis/control section 121, the printing information described in PDL is analyzed by the PDL command/data analysis section 122.

The PDL command/data analyzing section 122 analyzes a plurality of PDL such as Postscript (Trade Mark of Adobe Co.) and Interpress (Trade Mark of Xerox Co.) and converts them into intermediate code data. The resolution of the image output section 102 analyzed by the PDL command/data analyzing section 122, and the shape information such as a contour and position of an image are transferred to the image developing section 123.

The image developing section 123 develops the resolution, which has been analyzed by the PDL command/data analyzing section 122, and also develops the shape information such as a contour, position and rotational angle into image data so that they can be outputted as an image by the image output section 102. In this case, image processing is conducted if necessary. When the code data analyzed by the PDL command/data analyzing section 122 contains character/line image information, the image developing section 123 takes in outline information, which is a contour portion of the character/line image, from the character/line developing section 124. Before this outline information is written in the buffer memory 140, the characteristic information (described later) is added to this outline information by the characteristic information adding section 126, and then the outline information is sent to the discriminating information adding/information combining section 127. The image developing section 123 conducts the processing of expansion, reduction, compression, elongation, rotation and mirror-image in accordance with the code data analyzed by the PDL command/data analyzing section 122.

The characteristic information adding section 126 judges a vector direction of the outline information, and adds information to control a position of gray data to be outputted from the image output section 102 as characteristic information. This characteristic information will be described later.

The discriminating information adding/information combining section 127 operates as follows. To the data supplied from the image developing section 123 or the characteristic information adding section 126, the discriminating information corresponding to a type of the image is added, and further the data is made to correspond to the color information and written in the buffer memory 140. For example, when the outline information is supplied to which the characteristic information is added by the characteristic information adding section 126, the discriminating information adding/information combining section 127 operates as follows. Discriminating information showing that it is outline information is added to the information; the information is combined with the color information supplied from the color processing section 125; the processing such as a resolution conversion and filtering, which is dependent on the image output section 102, is appropriately conducted on the information; and the information is written in each region of the buffer memory 140 for each color which agrees with the image output section 102, for example, yellow, magenta, cyan and black (referred to as YMCK hereinafter in this specification). When the scan image information developed by the image developing section 123, the half-tone code information, or the information except for the outline portion of a character/line image is supplied, the discriminating information adding/information combining section 127 adds discriminating information different from the outline information. In the same manner as that of the outline information, the information is combined with the color information supplied from the color processing section 125. Then the information is subjected to the processing of a resolution conversion and filtering and then written in the buffer memory 140.

The color processing section 125 generates color information of a color space independent from the image output section 102, for example, the color space of L*, a*, b*, in accordance with the color information of the command data analyzed by the PDL command/data analyzing section 122. Then the color information is transferred to the discriminating information adding/information combining section 127. After the color information has been transferred to the discriminating information adding/information combining section 127, it is converted into a color space (for example, Y M C K) dependent upon the image output section 102. Further, the information is combined with the flag/image data to which the discriminating information is added, and written in the buffer memory 140. The flag/image data written in the buffer memory 140 is synchronized with an output section control signal sent through the output section controlling section 150 and outputted to the image output section 102.

Figures 13, 14:
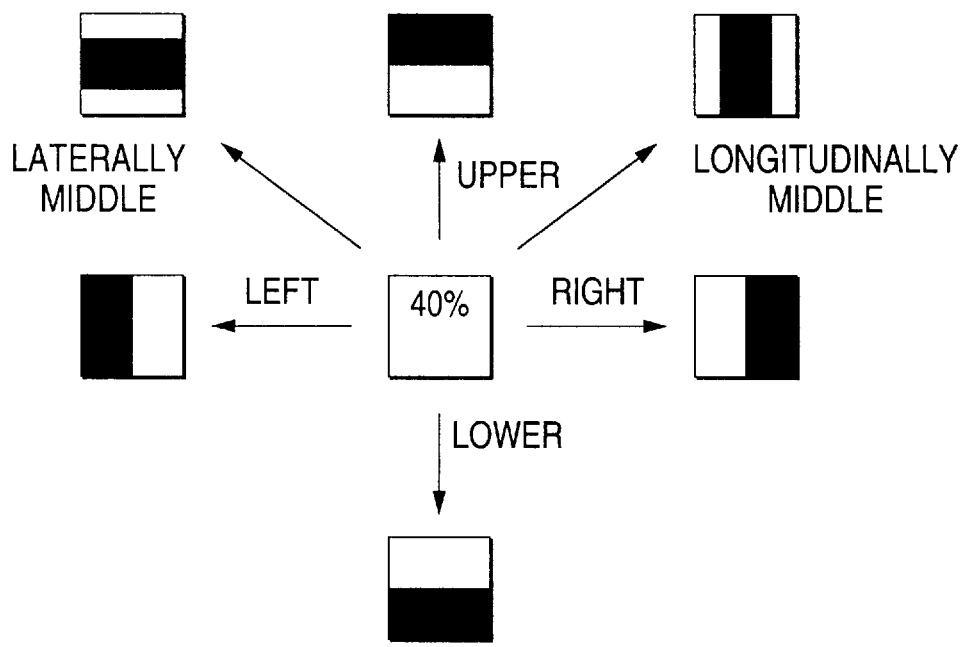
FIG. 13 is a view showing an example of the data format of flag/image data in the second embodiment.
FIG. 14 is a view showing a relation between the characteristic information and the edge direction in the second embodiment.

Next, referring to FIGS. 13 and 14, the data structure employed in this embodiment will be explained below. FIG. 13 is a view showing a data format of the flag/image data. As shown in the drawing, the flag/image data is composed of 9 bits in which MSB is used as a discriminating information flag FL1. This discriminating information flag FL1 is made to be "0" when the successive 8 bits are outline information, and the discriminating information flag FL1 is made to be "1" when the successive 8 bits are other half-tone data. In the case of the outline information, the characteristic information is expressed by the lower 3 bits of MSB, and further the gray data is expressed by the lower 5 bits. On the other hand, in the case of other half-tone image data, the gray data is expressed by the lower 8 bits. Due to the above data structure, in the same manner as the first embodiment shown in FIG. 3, it is possible to avoid a waste in the memory region, and it is not necessary to provide an exclusive memory for the characteristic information.

As shown in FIG. 14, the characteristic information is composed as follows. For example, in the case of a pixel, the density of which is 40%, the edge positions of "right", "lower", "left", "upper", "longitudinally middle" and "laterally middle" respectively correspond to the 6 types of bit patterns of "000", "001", "010", "011", "100" and "101". That is, this characteristic flag is different from the characteristic flag of the first embodiment shown in FIG. 4 in such a manner that "middle" in the first embodiment is divided into "longitudinally middle" and "laterally middle" in this embodiment. These "longitudinally middle" and "laterally middle" are important when fine lines and two adjacent lines are reproduced, that is, these "longitudinally middle" and "laterally middle" are important to prevent the deterioration of image quality.

Next, referring to FIGS. 15 to 17, the operation of the image processing apparatus 101 will be explained, wherein explanations are made for a case in which an end portion of the Chinese numeral "one", which is a character image, is subjected to image processing.

Figure 15:
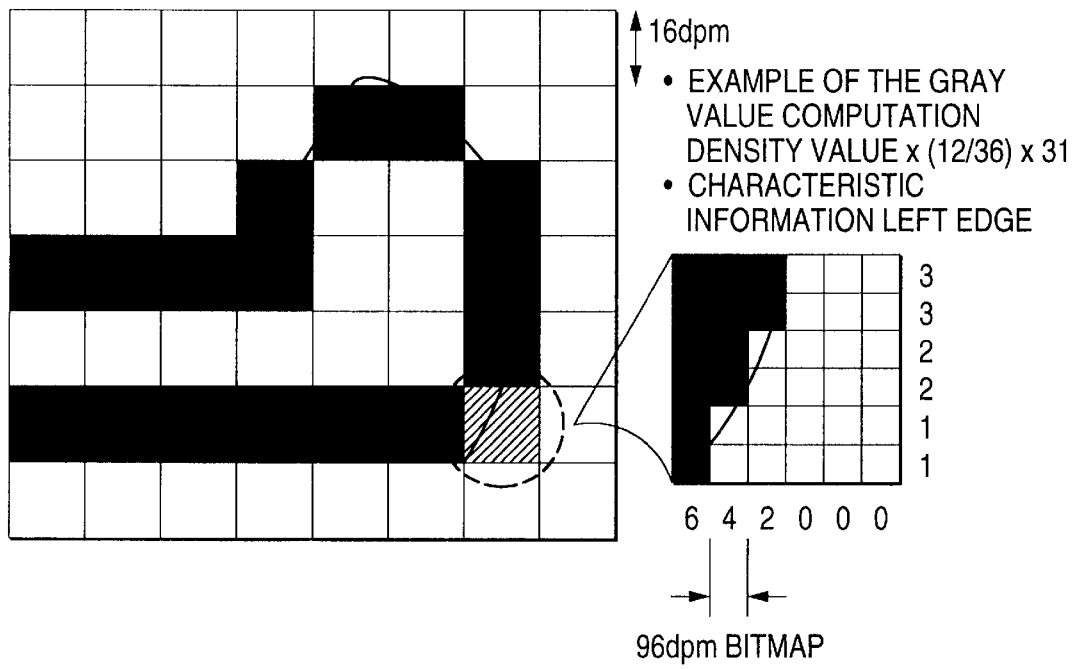
FIG. 15 is a view showing a model of the processing conducted by the image developing section 123 in the second embodiment.
Figure 15:
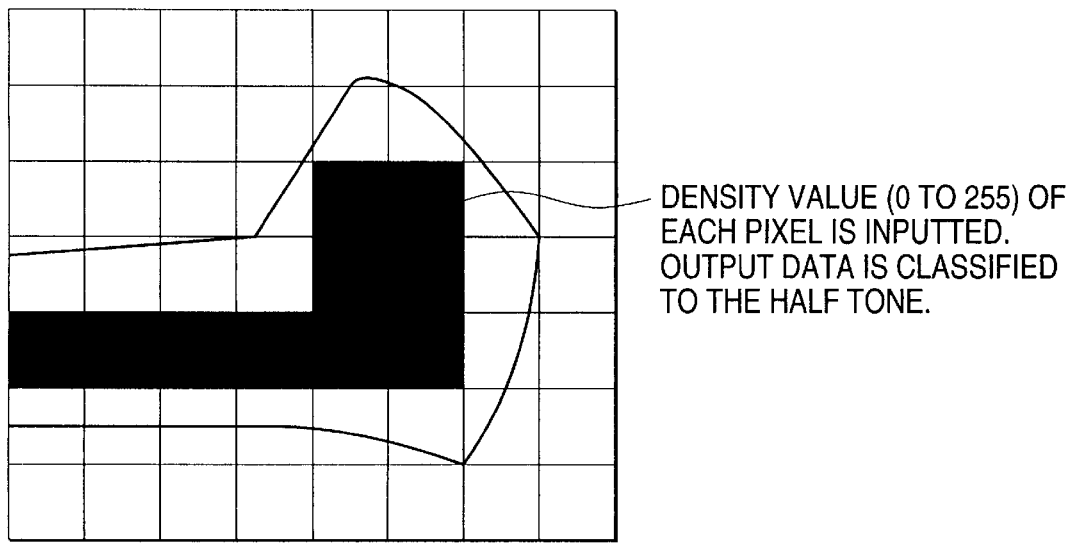

FIG. 15 is a model showing the image processing conducted in the image developing section 123. In FIG. 15, one square represents a bit map of the basic resolution 16 dpm of the image output section 102. The gray value is determined as follows in accordance with a ratio of the letter face of the Chinese numeral to the bit map of the basic resolution 16 dpm of the image output section 102.

That is, the outline portion of the letter face is provided with bit map information, the resolution of which is 96 dpm that is higher than the basic resolution 16 dpm of the image output section 102. The bit map is counted, the letter face of which is not less than 50% with respect to the bit map information, the resolution of which is 96 dpm. In this example, 12 pixels out of 36 pixels (12/32 pixels) are counted. Further, when the gradation number "31" capable of being expressed by 5 bits is multiplied, the gray value is determined. The thus determined value is transferred to the characteristic information adding section 126.

In order to add the characteristic information, in the characteristic information adding section 126, the number of pixels of each line of the bit map information of the resolution 96 dpm is counted, and the number of pixels of each row is also counted, so that a portion occupied by 12/36 pixels is detected by the template matching method that is well known. In the example shown in this drawing, the characteristic information value represents the left edge, that is, according to the definition of the characteristic information shown in FIG. 14, the characteristic information value represents "010". This characteristic information is transferred to the discriminating information adding/information combining section 127.

On the other hand, in portions except for the outline of characters, the gray value is not computed and the characteristic information is not added, and the bit map information, the basic resolution of which is 16 dpm, of the image output section 102 is transferred to the discriminating information adding/information combining section 127, that is, the information is transferred as data, the value of which is "1".

Figure 16:
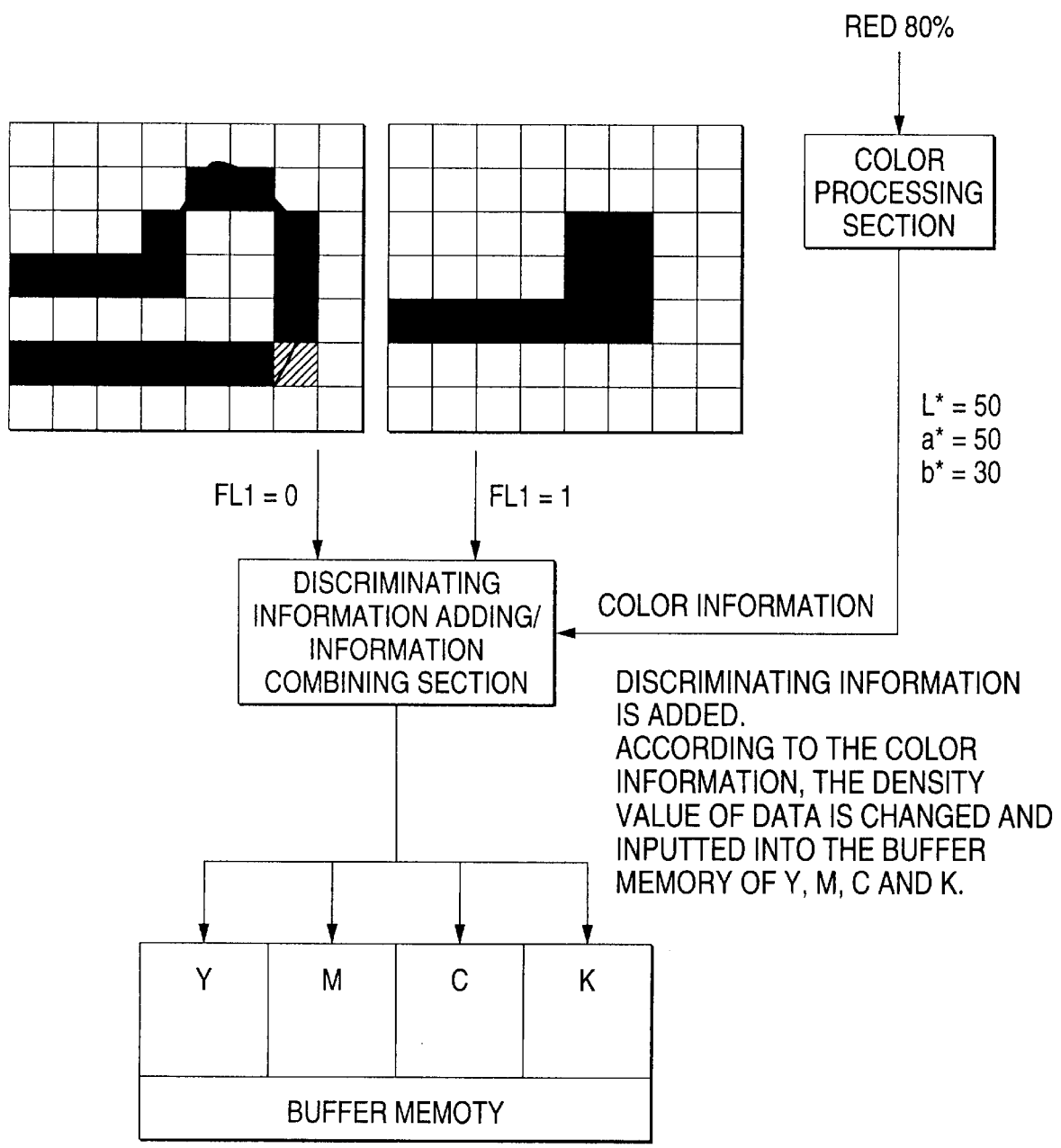
FIG. 16 is a view showing a model of the processing conducted by the discriminating information addition/information connection section 127 in the second embodiment.

FIG. 16 is a view showing a model of the processing conducted in the discriminating information adding/information combining section 127. Concerning the data transferred to the discriminating information adding/information combining section 127, as shown in FIG. 13, "0" is set at the discriminating information flag FL1 with respect to the outline portion of characters, and "1" is set at the discriminating information flag FL1 with respect to portions except for the outline portion of characters. Data to which the discriminating information is added is combined with color information supplied from the color processing section 125 and converted into a density value of YMCK outputted from the image output section 102. Further, data is subjected to the integer processing and successively written in a corresponding region of YMCK in the buffer memory 140.

Figures 17A, 17B, 17C:
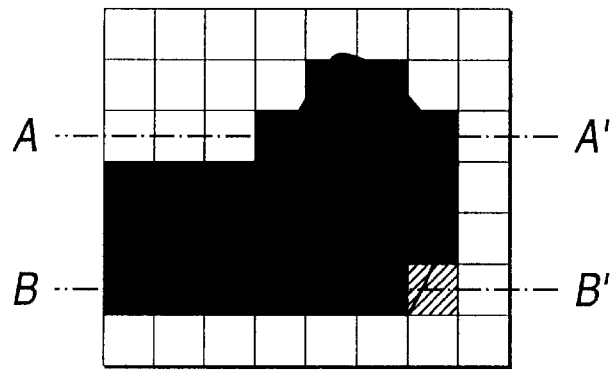
FIG. 17A–17C are a view showing a model of an example of flag/image data finally generated in the second embodiment.

FIG. 17 is a view showing a model of the flag/image data finally generated with respect to an end portion of the Chinese character "one". In this view, a character, the density of which is 100% black, is taken for an example. In FIG. 17, the flag/pixel data of the end portion of the Chinese character "one" located on the line A-A' shown in (a) of FIG. 17 is shown in (b) of FIG. 17. Also, the flag/pixel data of the end portion of the Chinese character "one" located on the line B-B' is shown in (c) of FIG. 17.

That is, on the line A-A' (shown in (b) of FIG. 17), the flag/image data appears in the following order: the half-tone pixels "a" to "c" of the pixel value 0/255; the right edge "d" of the pixel value 15/31; the half-tone pixel "e" and "f" of the pixel value 255/255; the right edge "g" of the pixel value 20/31; and the half-tone pixel "h" of the pixel value 0/255. On the line B-B' (shown in (c) in FIG. 17), the flag/image data appears in the following order: the upper edges "a" to "e" of the pixel value 16/31; the upper edge "f" of the pixel value 28/31; the left edge "g" of the pixel value 8/31; and the half-tone pixel "h" of the pixel value 0/255.

In the image output section 102 controlled by the output control section 150, an image is formed as follows. The flag/image data sent from the buffer memory 140 is received by the image output section 102. In accordance with the flag/image data, a laser beam is subjected to a pulse width modulation, and a photoreceptor (not shown) is exposed to light, and the thus formed latent image is developed into a visual image by a developing unit (not shown).

Next, referring to FIGS. 18 to 22, operation of the image output section 102 will be explained as follows.

Figure 18:
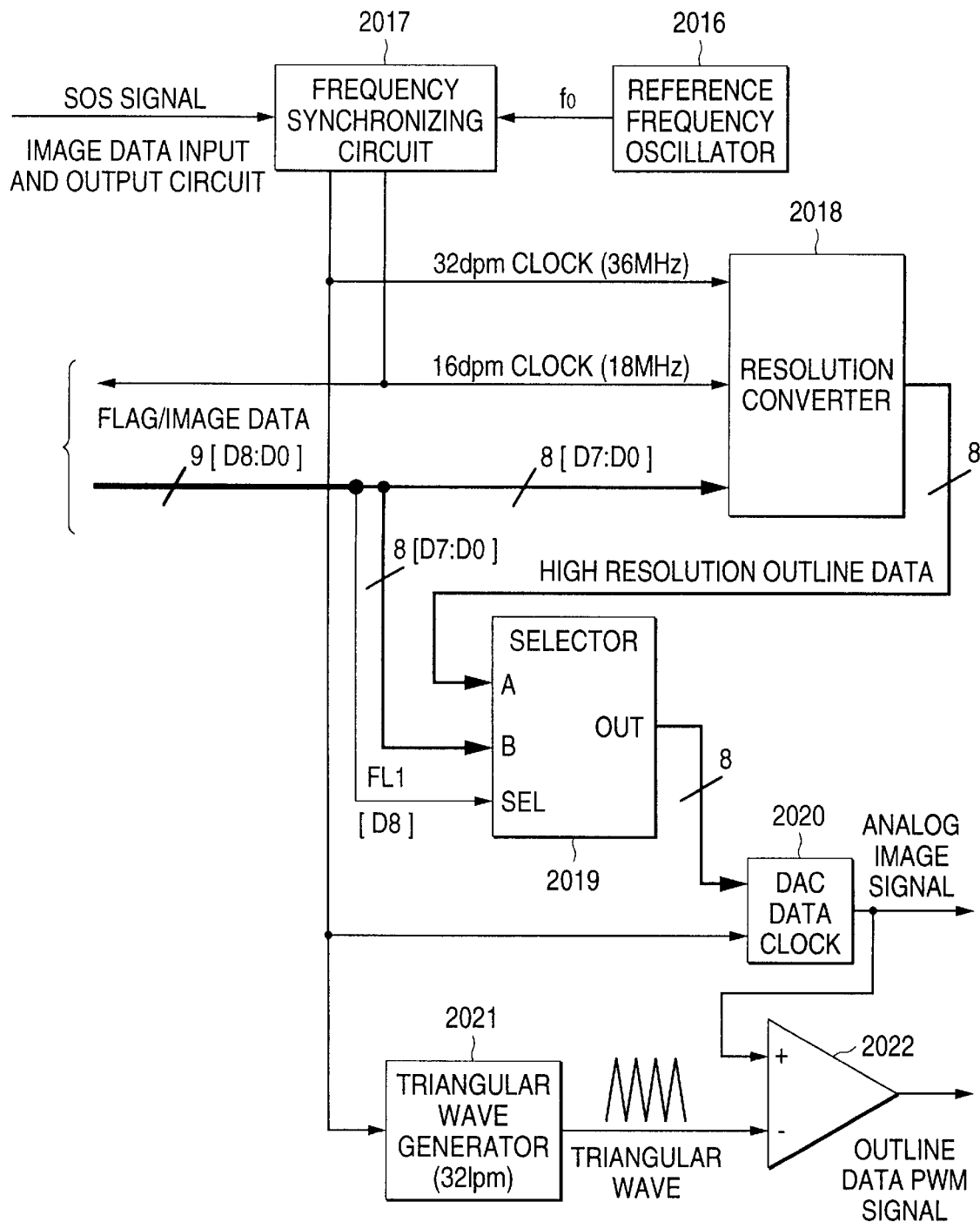
FIG. 18 is a block diagram showing an arrangement of a portion of the image data interface of the image output section 102 in the second embodiment.
Figure 19:
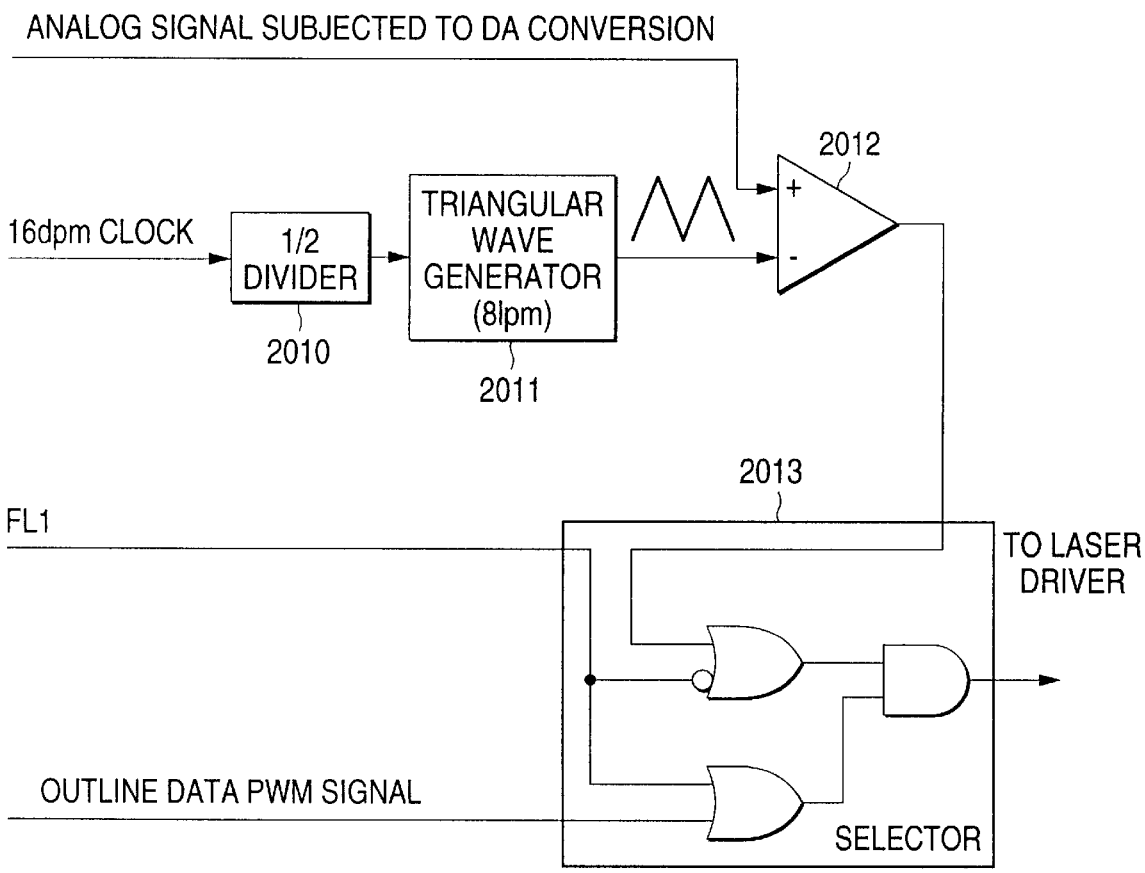
FIG. 19 is a block diagram showing an arrangement of another portion of the image data interface in the second embodiment.

The image data interface of the image output section 102 is arranged as shown in FIGS. 18 and 19. In FIG. 18, in the frequency synchronizing circuit 2017, the clock $f_0$ of the reference frequency oscillator 2016 is horizontally synchronized with SOS signal (the primary scanning synchronization signal), and the 32 dpm clock (36 MHz) and 16 dpm clock (18 MHz) are outputted. The flag/image data D0 to D8 is sent from the buffer memory 140 through an image data input and output circuit (not shown) being synchronized with the 16 dpm clock.

When MSB (discriminating information flag FL1) of the flag/image data is "1", that is, when MSB is half-tone data except for the outline information, an output of the selector 2019 becomes image data having no flag of 8 bits of D0 to D7, so that data defined as half-tone data is inputted into DAC (digital analog converter) 2020. In this case, DAC2020 is driven by a clock of 32 dpm, however, since the half-tone data is supplied while the resolution is maintained at 16 dpm, an analog image signal, the resolution of which is practically 16 dpm, is outputted.

In FIG. 19, the above analog image signal is inputted into a positive input terminal of the comparator 2012. Into a negative input terminal of the comparator 2012, a triangular wave signal of 8 lpm (line/mm) is inputted which is generated from the clock of 16 dpm through the ½ divider 2010 and the triangular wave generator 2011. Due to the foregoing, both signals are compared with each other by the comparator 2012, and a pulse width modulation signal of 8 pm is generated. When MSB of the flag/image data is "1", an output of the comparator 2012 is selected by the selector 2013 and sent to a laser driver (not shown).

An output of the comparator 2022 shown in FIG. 18 is a PWM signal corresponding to the outline information, which is generated by the following processing. When MSB of the flag/image data is "0", that is, in the case of outline information, an output of the selector 2019 becomes outline data of high resolution that has been processed by the resolution converter 2018. Since DAC2020 is driven by a clock of 32 dpm, the high resolution outline data generated at the resolution of 32 dpm in the primary scanning direction is faithfully converted into an analog signal. This analog signal of the resolution 32 dpm is compared with a triangular wave signal generated by the triangular wave generator 2021 operated in accordance with the 32 dpm clock (36 MHz), by the comparator 2022. Due to the foregoing, a pulse width modulation signal of 32 lpm is generated. The thus generated pulse width modulation signal of high resolution outline data is selected by the selector 2013 shown in FIG. 19 and sent to a laser driver (not shown).

Figure 20:
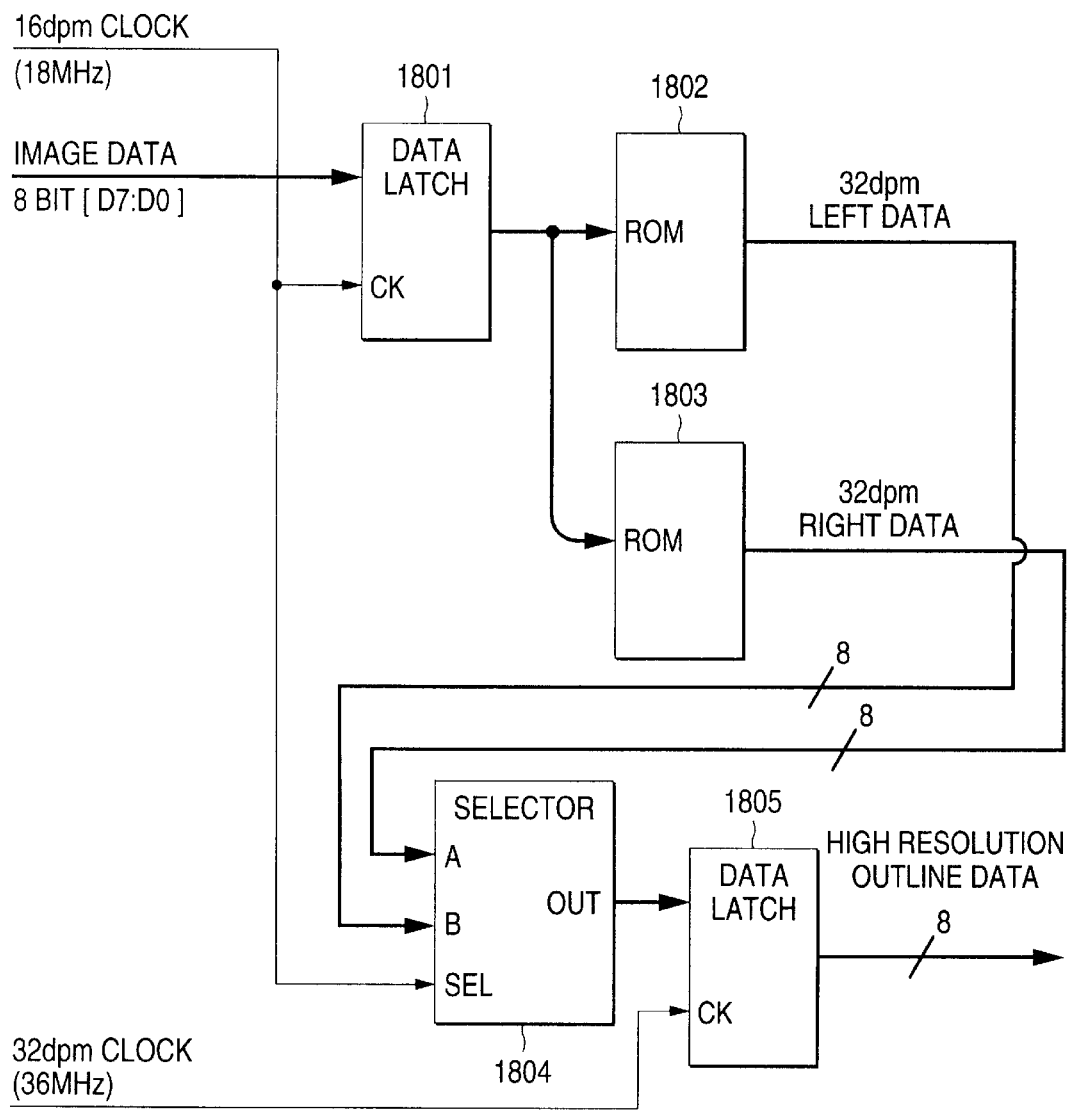
FIG. 20 is a block diagram showing an arrangement of the resolution converter 2018 in the second embodiment.

Referring to a block diagram shown in FIG. 20, the processing conducted on the outline image data by the resolution converter 2018 will be explained below. In FIG. 20, the outline image data is temporarily latched by the latch circuit 1801 and then written in the two systems of storage elements (ROM) 1802, 1803. In ROM 1802 which is one of the storage elements, a pattern of the left pixel data obtained when 16 dpm is developed into 32 dpm is previously stored, and in ROM 1803 which is the other storage element, a pattern of the right pixel data is previously stored.

Gray data to which the characteristic information synchronized with the 16 dpm clock is added is inputted into the address lines of ROM 1802 and 1803. Each ROM is synchronized with the 16 dpm clock, and the data of the right pixel and the data of the left pixel corresponding to the resolution of 32 dpm are outputted in parallel with each other. The data is selected by the selector 1804 at a high level or a low level of 16 dpm clock. Then the data is latched again by the latch circuit 1805 operated by the clock of 32 dpm. After that, the data is outputted in the form of continuous high resolution outline data of 32 dpm.

Figure 21:
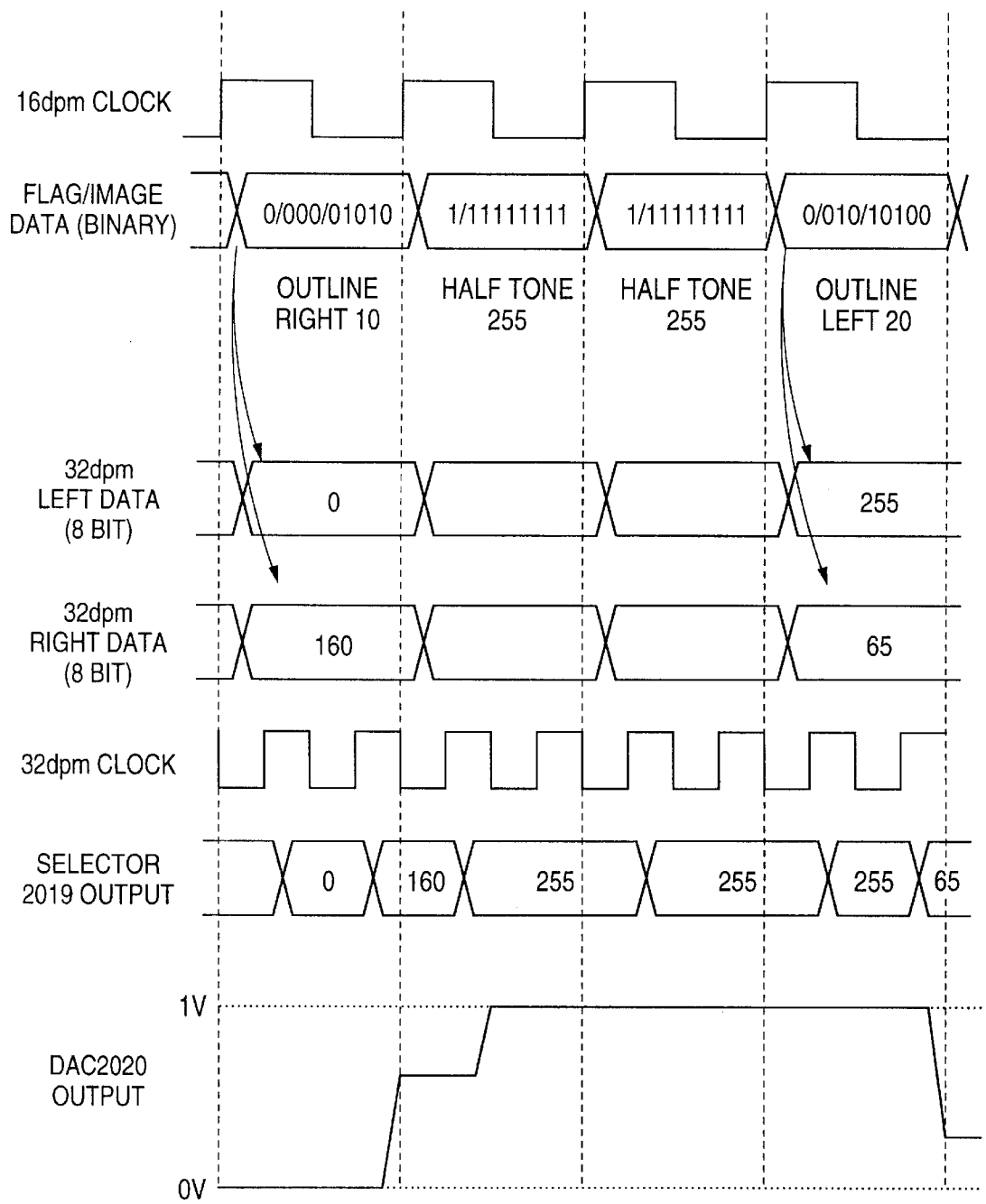
FIG. 21 is a time chart for explaining the outline data processing in the second embodiment.

FIG. 21 is a time chart showing the processing of outline data. In FIG. 21, the flag/image data is supplied in the following order: the outline pixel, the characteristic information of which is "right", and the pixel value of which is 10/31; the half-tone pixel, the density of which is 255/255; the half-tone pixel, the density of which is 255/255; and the outline pixel, the characteristic information of which is "left", and the pixel value of which is 20/31.

The left data of 32 dpm is an output of ROM 1802, and the right data of 32 dpm is an output of ROM 1803. Output values of ROM 1802 and ROM 1803 are set so that the gray data (0 to 31) of 5 bits to be inputted can be extended to the size of 8 bits (0 to 255), so that the left data can be reduced and the right data can be extended with respect to the pixel, the characteristic information of which is "right". On the contrary, output values of ROM 1802 and ROM 1803 are set so that the left data can be extended and the right data can be reduced with respect to the pixel, the characteristic information of which is "left".

The right and the left data are alternately inputted into the input terminal A of the selector 2019. On the other hand, the image data D0 to D7 is inputted into the input terminal B of the selector 2019. In accordance with the value of the discriminating information flag FL1 (D8) inputted as a selection signal, an output signal of the selector 2019 can be obtained as shown in the drawing. This output signal is converted into an analog signal by DAC 2020.

Figure 22:
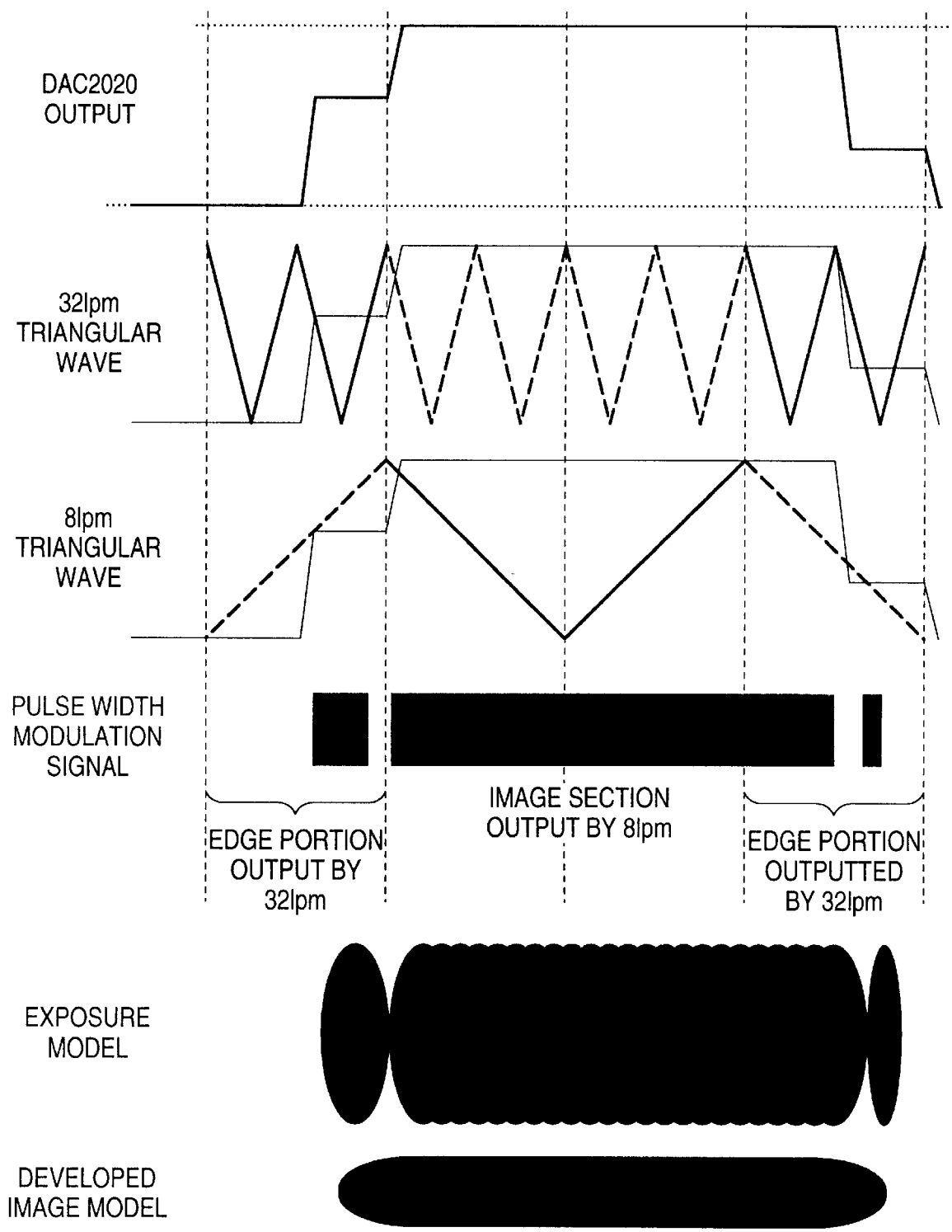
FIG. 22 is a view showing a model to explain a process of conversion in which an output signal of DAC2020 is converted into a development image in the second embodiment.

FIG. 22 is a view showing a model of the process in which the output signal of DAC 2020 is converted into a developed image. In the drawing, in the edge portion, an output which is subjected to the pulse width modulation by the triangular wave signal of 32 lpm is selected, and inside the image, an output which is subjected to the pulse width modulation by the triangular wave signal of 8 lpm is selected. When the data of resolution 32 dpm is subjected to the pulse width modulation by the triangular wave signal of 32 lpm as described above, delicate edges are grown at the right and the left edge of the exposed image. In this way, the line width of the developed image can be freely adjusted. Due to the foregoing, quality of character/line images can be enhanced.

Third Embodiment

Next, the third embodiment of the invention will be explained below. Unlike the above second embodiment, in the third embodiment, the outline data is not provided as the characteristic information and gray information, but the outline data is provided as the high resolution bit map. The following are explanations of an example in which the resolution of the image output section 102 (shown in FIG. 11) is 16 dpm and the high resolution bit map is 32 dpm.

Figure 23:
FIG. 23 is a view showing an example of the data format of flag/image-data in the third embodiment of the present invention.

As shown in FIG. 23, the flag/image data in this embodiment adopts a data system in which a bit map of the resolution 32 dpm is embedded in the flag/image data corresponding to one pixel of the resolution 16 dpm in each of the primary and the subsidiary scanning direction. This high resolution bit map data is developed in the character/line image developing section 124 (shown in FIG. 12) and allotted to the image data in the characteristic information adding section 126. Then the discriminating information flag is added to this bit map data by the discriminating information adding/information integrating section 127. Then the bit map data is accommodated in a predetermined area of the buffer memory 140 and sent to the image output section 102.

Figure 24:
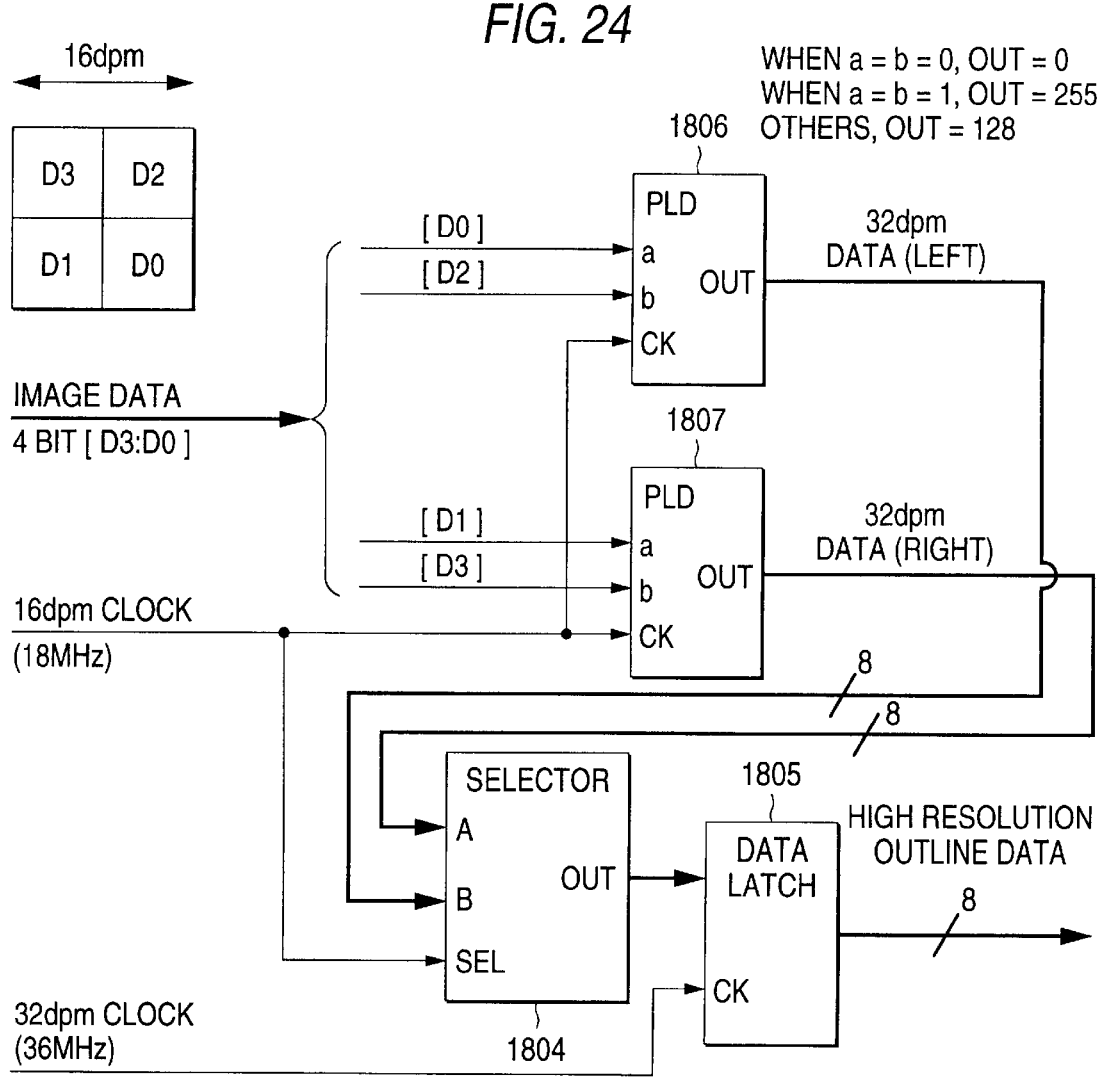
FIG. 24 is a block diagram showing an arrangement of the resolution converter in the third embodiment.

The arrangement of the interface circuit to receive the flag/image data in the image output section 102 is the same as the arrangements shown in FIGS. 18 and 19, however, the internal arrangement of the resolution converter 2018 is different. Therefore, the internal arrangement of the resolution converter 2018 will be explained referring to FIG. 24. In FIG. 24, when input "a" and input "b" of 2 bits are inputted into PLD (Programmable Logic Device) 1806, 1807, the following computation output can be provided.

When a=b=0, output=0

When a=b=1, output=255

In other cases, output=128

The output of PLD 1806 and the output of PLD 1807 are synchronized with the 16 dpm clock and outputted in parallel with each other. Accordingly, in the same manner as that of the above second embodiment, the data is arranged again in the time series of 32 dpm by the selector 1804 and the latch circuit 1805. In the same manner as that of the second embodiment, the data of 32 dpm is subjected to the pulse width modulation of 32 lpm through the circuits shown in FIGS. 18 and 19, and then sent to a laser driver (not shown).

Figure 25:
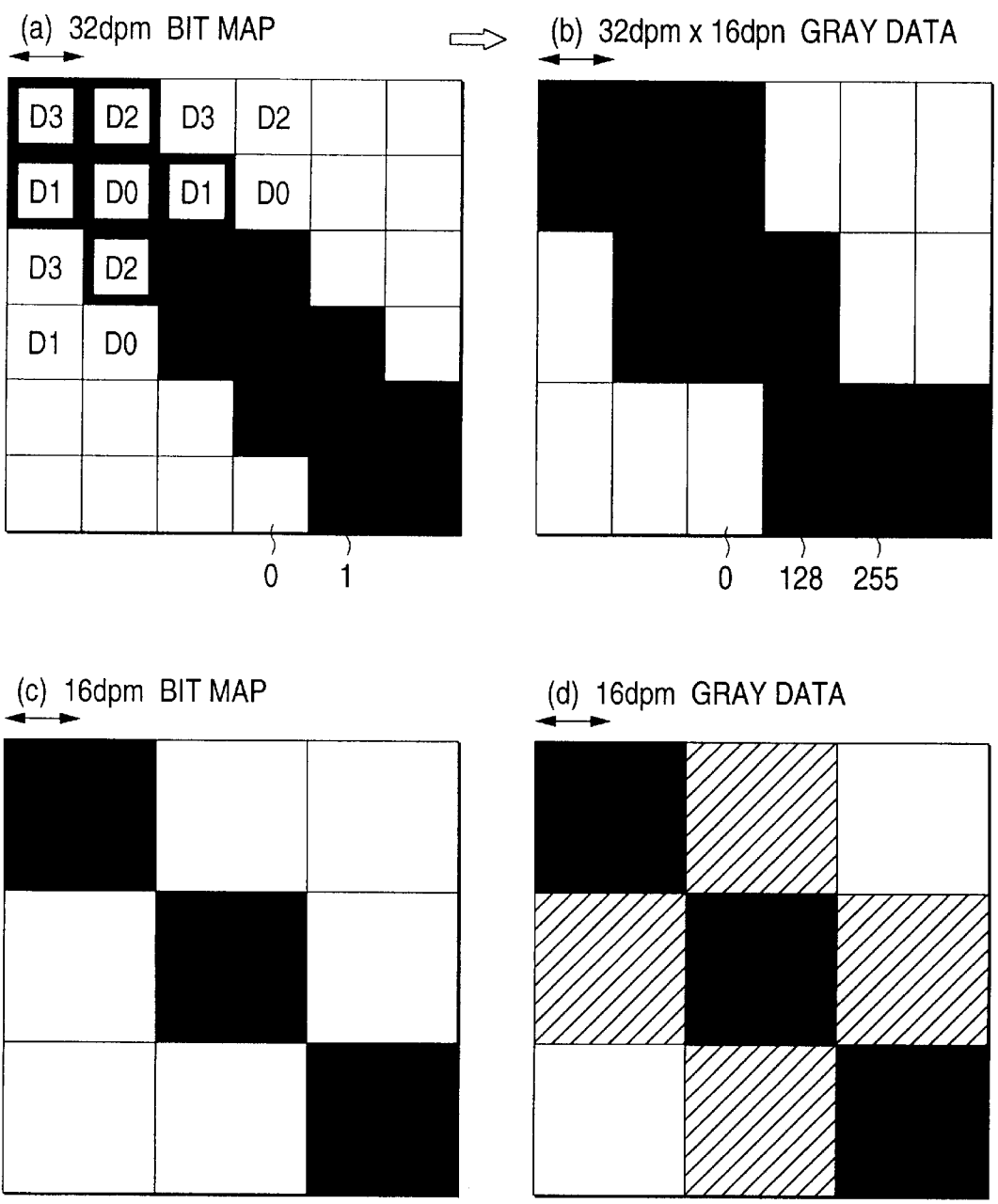
FIG. 25 is a view showing a model of the resolution conversion in the third embodiment.

Referring to FIG. 25, operation and effect of this embodiment will be explained as follows. First, D0 and D2 of bit map data of 32 dpm are inputted into PLD 1806, and D1 and D3 of bit map data of 32 dpm are inputted into PLD 1807 (shown in FIG. 24). Accordingly, when the bit map data shown in FIG. 25(*a*) is inputted, the output of PLD 1806 and the output of PLD 1807 are expressed as shown in (*b*) of FIG. 25. In this case, when the data is processed in the primary scanning direction while the resolution is maintained at 16 dpm, in the case of a binary bit map, the pattern becomes as shown in (*c*) of FIG. 25, and even if the gray data is used, the pattern becomes as shown in (*d*) of FIG. 25. That is, it should be understood that the smoothing property and the sharpening property are not compatible with each other.

Figure 26:
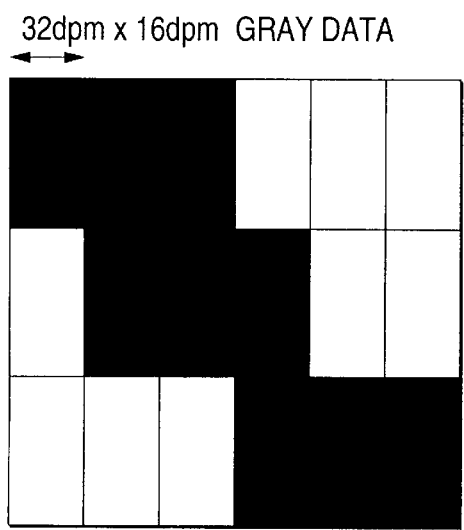
FIG. 26 is a view showing a model of the exposure image provided when a pattern shown in FIG. 25B is exposed by the pulse width modulation of 32 lpm.
Figure 26:
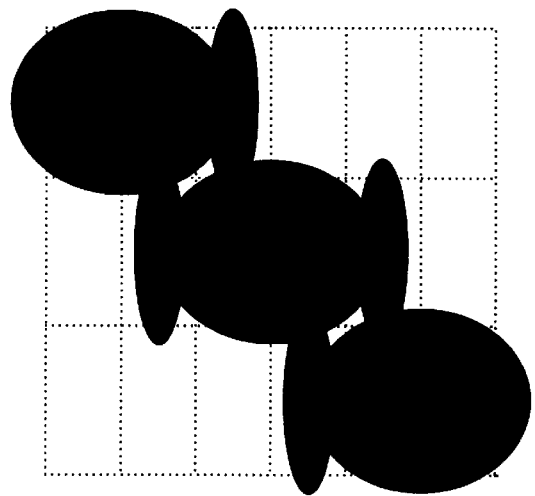
Figure 27:
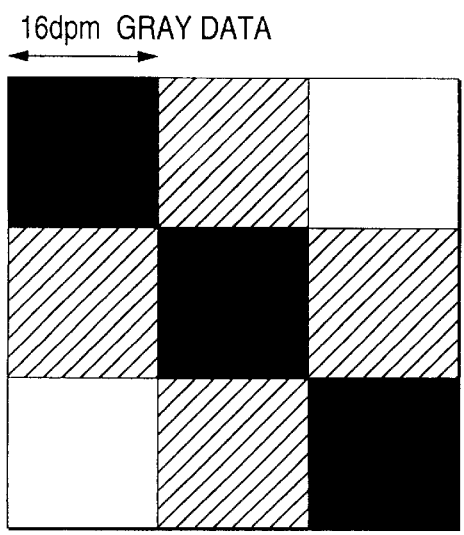
FIG. 27 is a view showing a model of the exposure image provided when a pattern shown in FIG. 25D is exposed by the pulse width modulation of 16 lpm.
Figure 27:
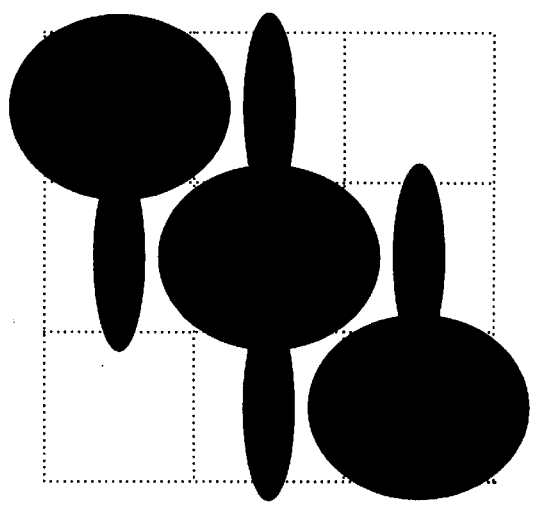

Next, FIG. 26 is a view showing a model of the exposure image obtained when the pattern shown in FIG. 25(*b*) is subjected to the pulse width modulation of 32 lpm. FIG. 27 is a view showing a model of the exposure image obtained when the pattern shown in FIG. 25(*d*) is subjected to the pulse width modulation of 16 pm. When both are compared with each other, the following should be understood. When the resolution in the primary scanning direction is converted into 32 dpm and the pulse width modulation of 32 lpm is conducted, the smoothing property and the sharpening property are more compatible with each other.

Figure 28:
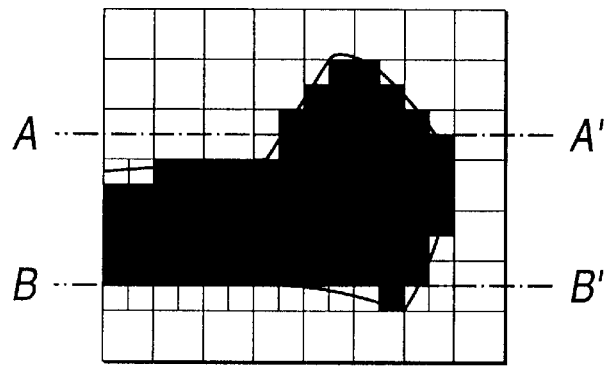
FIG. 28 is a view showing a model of an example of flag/image data finally generated in the third embodiment.

FIG. 28 is a view showing a model of the flag/image data of an end portion of the Chinese character "one" in the case where the half-tone data and the outline data of the high resolution bit map are mixed with each other. In FIG. 28, the flag/pixel data of the end portion of the Chinese character "one" located on the line A-A' shown in (*a*) of FIG. 28 is shown in (*b*) of FIG. 28. Also, the flag/pixel data of the end portion of the Chinese character "one" located on the line B-B' is shown in (*c*) of FIG. 28. In (*b*) and (*c*) of FIG. 28, mark "x" represents a bit, which has not been used yet (shown in FIG. 23), in the flag/pixel data of the outline flag.

As described above, according to the present embodiment, the outline data is held as high resolution bit map data. Accordingly, when the processing of outline data and the processing of other half-tone data are changed over in real time, the smoothing and the sharpening property of the contour of a character/line image can be enhanced.

Fourth Embodiment

Figure 29:
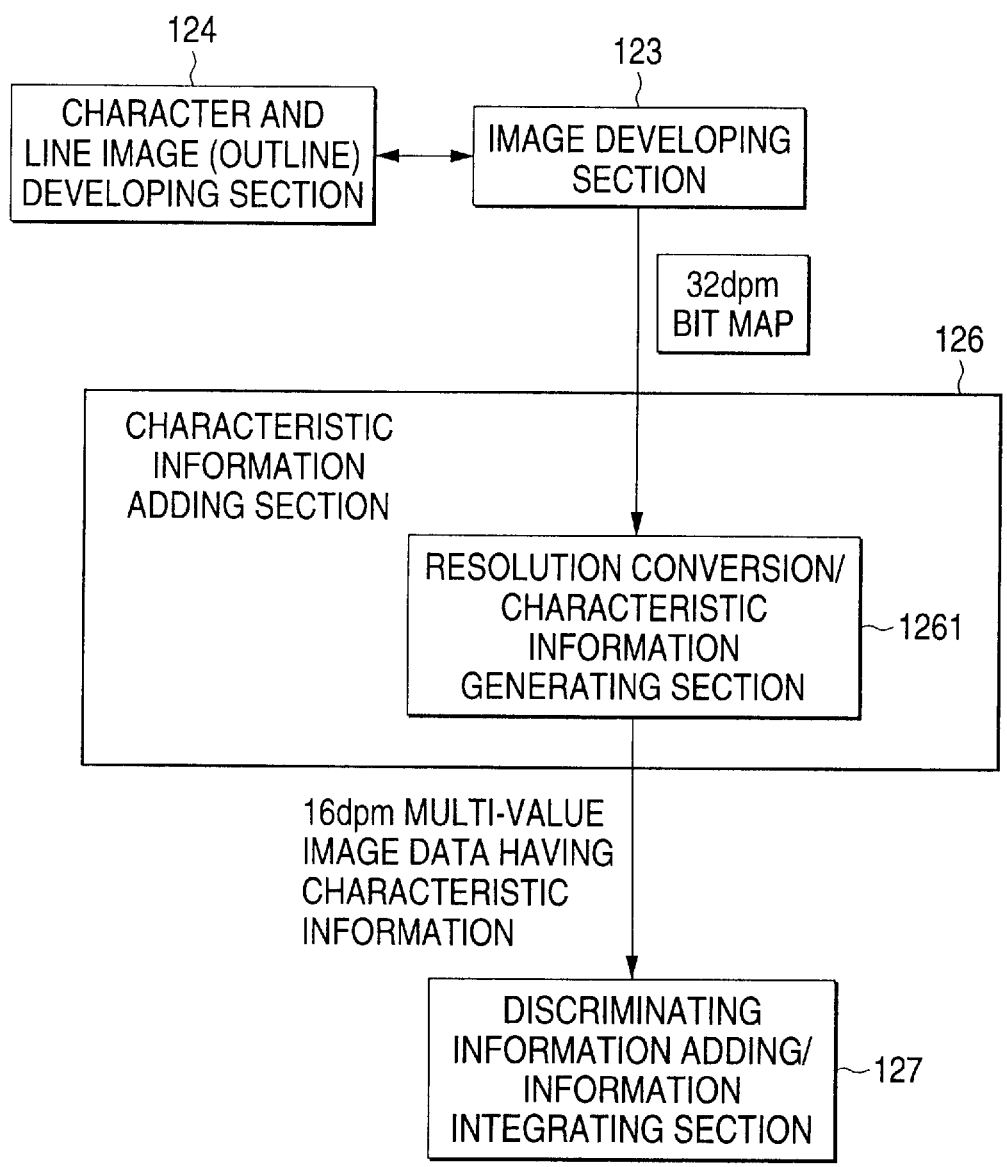
FIG. 29 is a block diagram showing an arrangement of the primary portion of the fourth embodiment of the present invention.

Next, the fourth embodiment of the invention will be explained below. FIG. 29 is a block diagram showing a primary portion of this embodiment. In FIG. 11 showing the second embodiment and in FIG. 29 showing the fourth embodiment, like reference numerals have been used throughout to designate identical portions, and the explanations are omitted here. The fourth embodiment is different from the second embodiment at the following points. In the fourth embodiment, inside the characteristic information adding section 126, there is provided a resolution conversion/characteristic information generating section 1261 which conducts a resolution conversion at a position shifted by 1/n (n is a natural number) of the interval of the high resolution pixels.

Figure 30A:
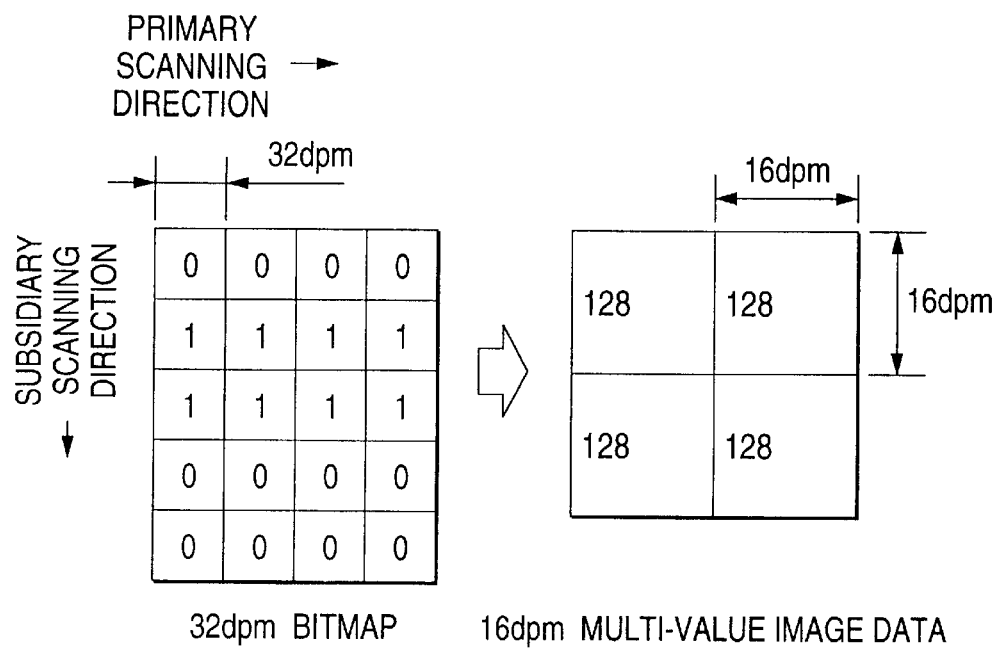
FIG. 30A–30B are a view showing a model of the conventional resolution conversion.
Figure 30B:
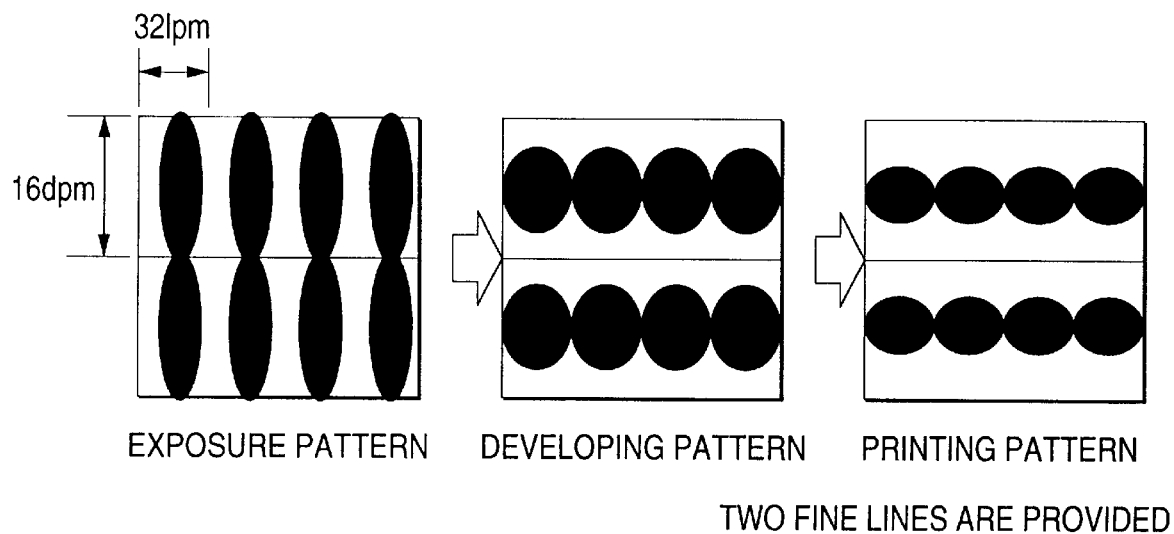

The following are explanations of a case in which the high resolution bit map is 32 dpm and the resolution conversion is conducted so that the resolution can be converted into 16 dpm. A common method by which the resolution is converted from 32 dpm into 16 dpm is the area projecting conversion shown in FIG. 30A. According to this method, four pixels of the 32 dpm bit map are projected to one pixel of 16 dpm, so that multi-value image data can be provided. In this case, when the values of the high resolution 32 dpm bit map are 0 and 1, and when the data size of the 16 dpm bit map is 0 to 255 (8 bits), the value of one pixel of the 16 dpm bit map becomes 128 which is an average of four pixels. FIG. 30B is a view showing a model of the exposure pattern, developing pattern and printing pattern when the multi-value image data is outputted by the image output section 102 while the pulse width modulation of 32 lpm is conducted. As shown in the drawing, the defect of this system is described as follows. When one horizontal line composed of 2 bits of the 32 dpm bit map is projected and converted over two pixels of the 16 dpm bit map, the value of each pixel of the 16 dpm bit map becomes multi-value image data having the value 128. Therefore, the printing pattern is reproduced by two fine lines.

Figure 31A:
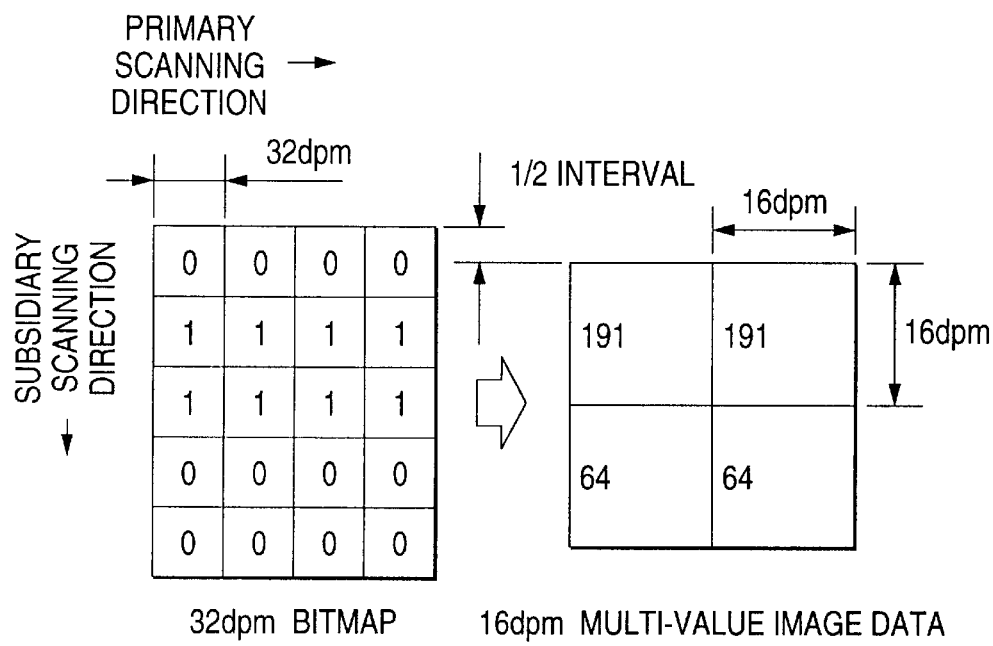
FIG. 31A–31B are a view showing a model of the resolution conversion conducted in the fourth embodiment.
Figure 31B:
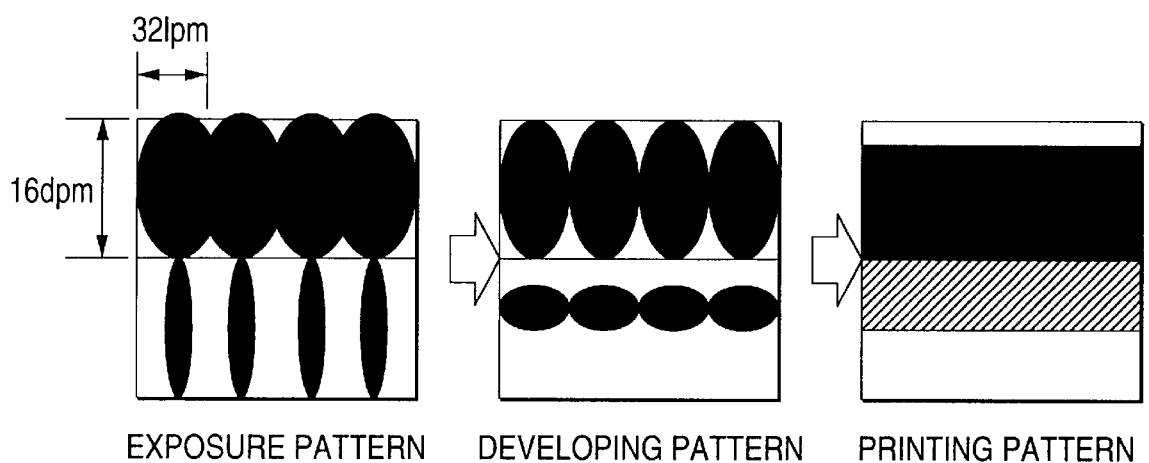

In order to solve the above problems, in the resolution conversion/characteristic information generating section 1261 of this embodiment, as shown in FIG. 31A, projection is conducted being shifted by ½ of the interval of 32 dpm in the subsidiary scanning direction, and the data is converted into the multi-value image data of 16 dpm. Due to the foregoing, the image data becomes multi-value data having the values of 191 and 64 as shown in the drawing. Therefore, as shown in FIG. 31B, in the development process, toner is attracted onto the strongly exposed image side, so that the outputted printing pattern becomes one line on which a thick pattern is adjacent to a thin pattern.

When projection is conducted being shifted by ½ of the interval of 32 dpm, irrespective of the position of resolution conversion, 2 bit line of 32 dpm can be reproduced without causing a rupture of a fine line.

Fifth Embodiment

Figure 32:
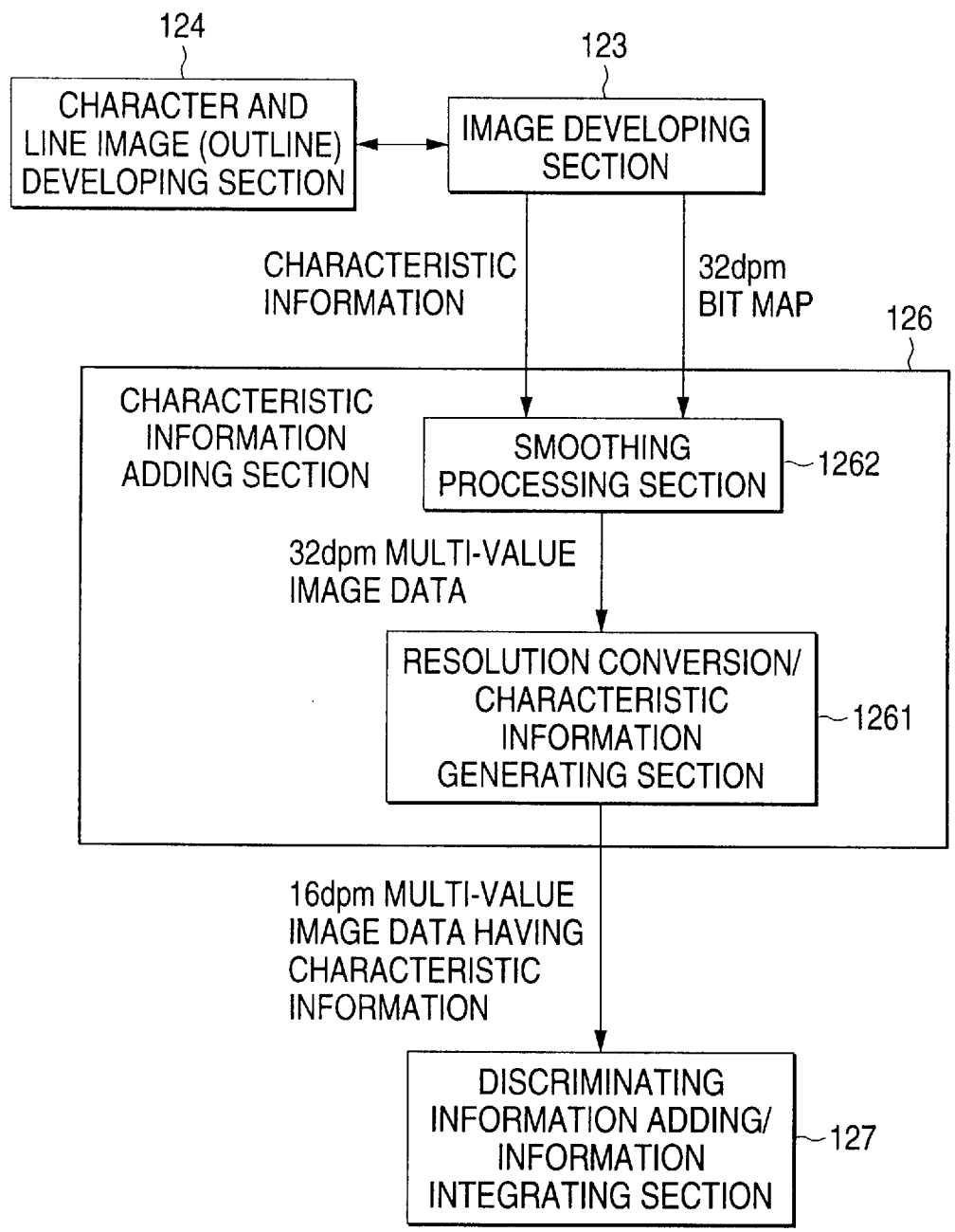
FIG. 32 is a block diagram showing an arrangement of the primary portion of the fifth embodiment of the present invention.

Next, the ninth embodiment of the invention will be explained below. FIG. 32 is a block diagram showing a primary portion of this embodiment. In FIG. 29 showing the fourth embodiment and in FIG. 32 showing the fifth embodiment, like reference numerals have been used throughout to designate identical portions, and the explanations are omitted here. The fifth embodiment is different from the fourth embodiment at the following points. In the fifth embodiment, inside the characteristic information adding section 126, there is provided a smoothing processing section 1262 in the front stage of the resolution conversion/characteristic information generating section 1261.

Figure 33A:
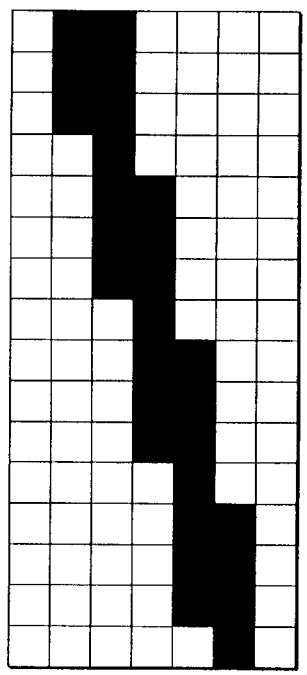
FIG. 33A–33B are a view showing a model of the conversion conducted by the smoothing processing in the fifth embodiment.
Figure 33B:
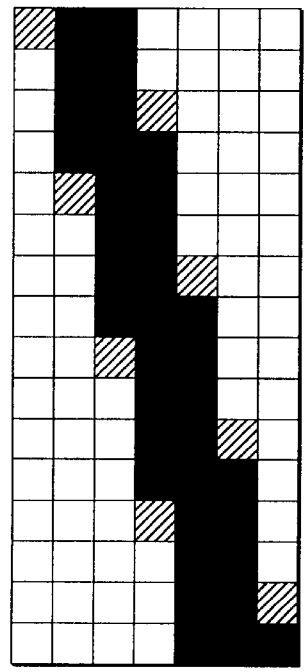

The smoothing processing section 1262 converts an image of the 32 dpm bit map sent from the image developing section 123 into a multi-image data of 32 dpm (for example, 256 gradation values composed of 8 bits) in accordance with characteristic information. By means of two-dimensional pattern matching or filter processing, the bit map image shown in FIG. 33A is converted into the multi-image data shown in FIG. 33B so that zigzag edges can be avoided.

Figure 34:
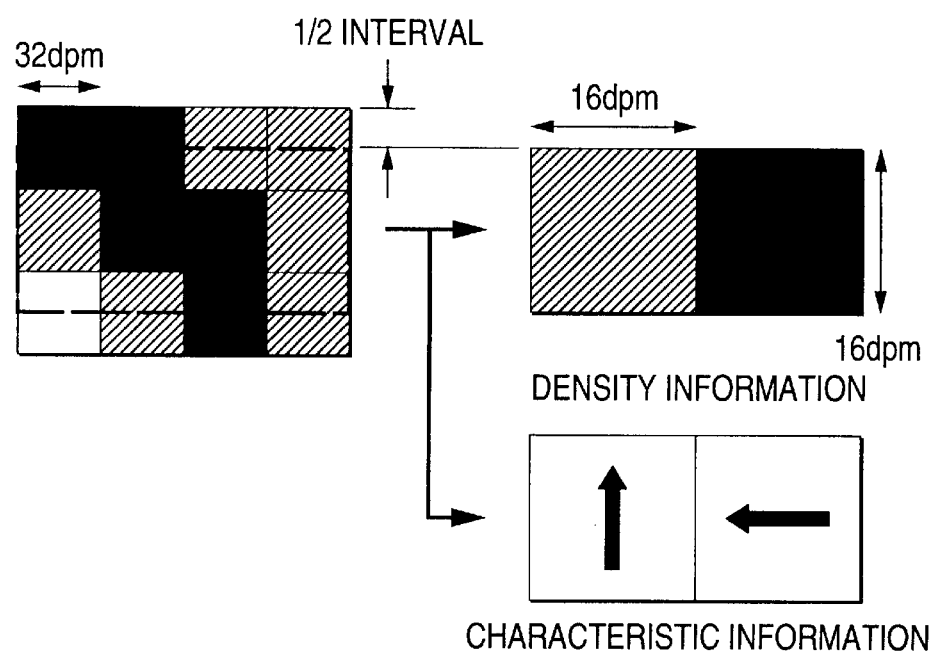
FIG. 34 is a view showing a model of the resolution conversion and the generation of characteristic information in the fifth embodiment.

The resolution conversion/characteristic information generating section 1261 converts the resolution of the multi-value image data of 32 dpm into 16 dpm and further outputs the characteristic information for each pixel. At this time, the conversion from 32 dpm into 16 dpm is conducted in the same manner as that of the fourth embodiment described before. As shown in FIG. 34, the conversion is conducted while the reference position is shifted by ½ of the interval of pixels. The characteristic information is generated as follows. First, in the multi-value image data of 32 dpm, in a range in which one pixel of 16 dpm is projected, an inclination of the density is computed with respect to each of the upward and downward direction and the transverse direction. In accordance with the maximum value, the characteristic information showing either "upper", "lower", "right", "left", "longitudinally middle" or "laterally middle" is generated. Then, the data in which the above characteristic information is added to the multi-value image data of 16 dpm is outputted into the discriminating information adding/information integrating section 127.

As described above, according to the present embodiment, before the resolution conversion is conducted in accordance with the resolution of the image output section 102, smoothing processing is conducted on the outline portion. Therefore, zigzag edges on a character line image can be reduced.

In this connection, this embodiment is a variation of the fourth embodiment of the present invention. However, variations do not necessarily presuppose the fourth embodiment. Even if the resolution conversion/characteristic information generating section 1261 is not provided, it is possible to provide effects of the smoothing processing section 1262.

Sixth Embodiment

Next, the sixth embodiment of the invention will be explained below.

When a small character is developed using multi-value image data, the following problems may be encountered in some cases. Pieces of the multi-value image data are adjacent to each other in the subsidiary scanning direction, so that the recognition as a character is deteriorated. In order to solve the above problems, in this embodiment, the pixel value is corrected in accordance with the multi-value image data of a target pixel and a peripheral pixel and their characteristic information.

Figure 35:
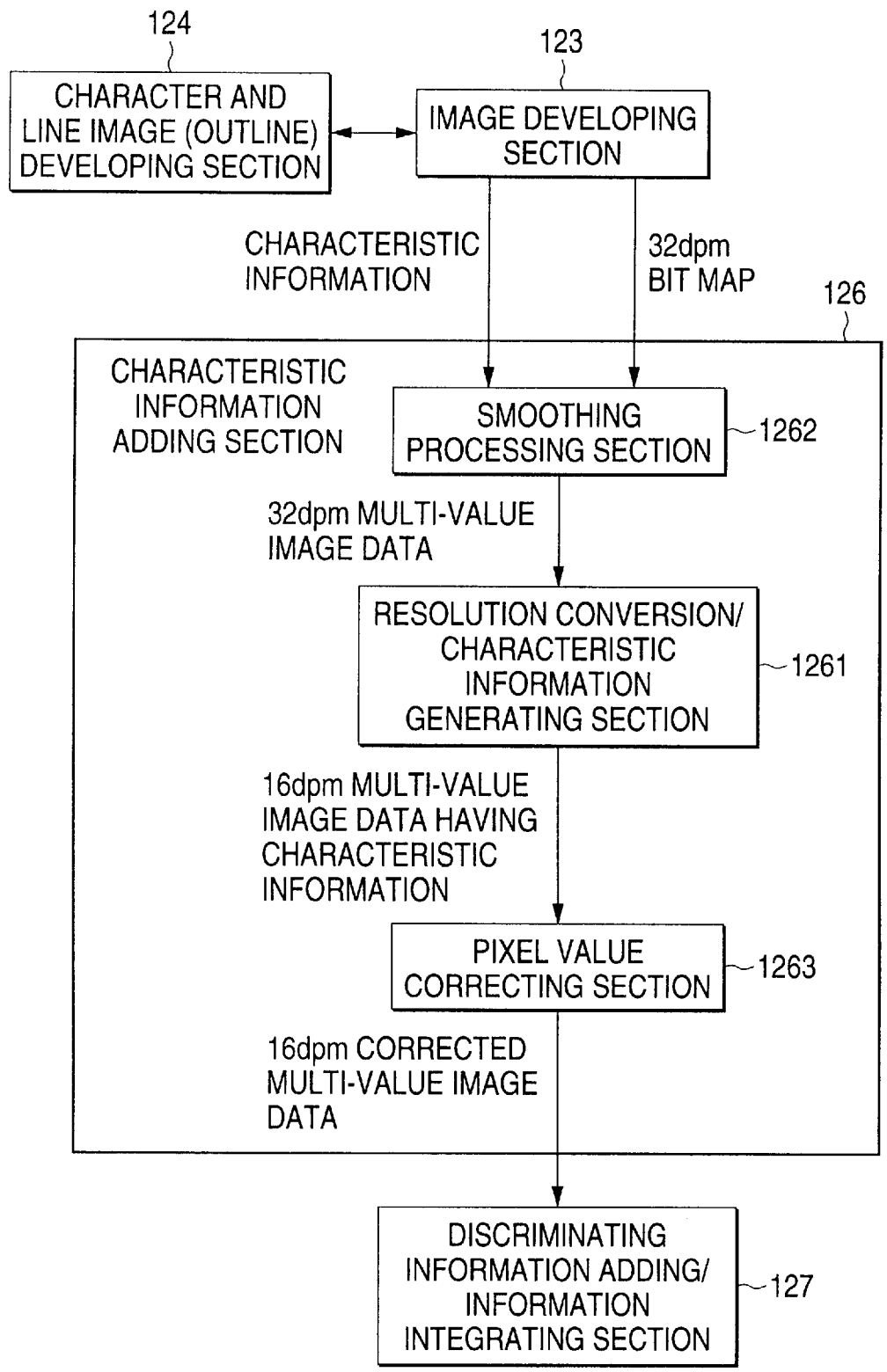
FIG. 35 is a block diagram showing an arrangement of the primary portion of the sixth embodiment of the present invention.

FIG. 35 is a block diagram showing a primary portion of the present embodiment. In FIG. 32 showing the fifth embodiment and in FIG. 35 showing the present embodiment, like reference numerals have been used throughout to designate identical portions, and the explanations are omitted here. The present embodiment is different from the fifth embodiment as follows. In the present embodiment, in the characteristic information adding section 126, there is provided a pixel value correcting section 1263 at the next stage of the resolution conversion/characteristic information generating section 1261.

Figure 36:
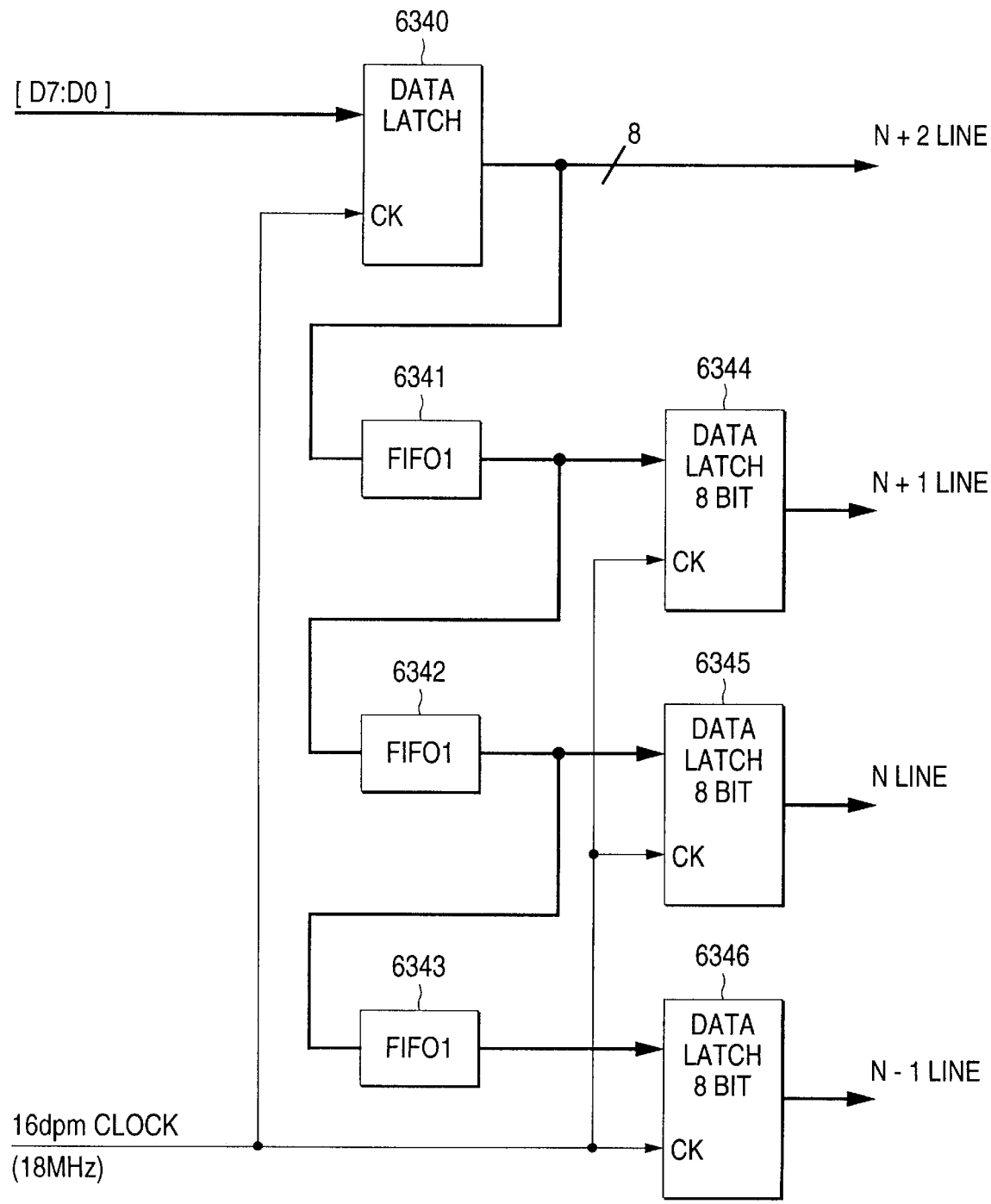
FIG. 36 is a block diagram showing an arrangement of the pixel value correcting section 1263 in the sixth embodiment.

The pixel value correcting section 1263 corrects a pixel value in accordance with the density information and the characteristic information. The arrangement of the pixel value correcting section 1263 is shown in FIG. 36. As shown in the drawing, three steps of FIFO (first in first out) memories 6341 to 6343 are used, so that the raster data for 4 lines is generated. In this case, each FIFO memory 6341 to 6343 has a storage capacity for storing one scanning line of information with respect to the output data D0 to D7 of 8 bit width. In the drawing, line numbers of data generated in FIFO memories 6341 to 6343 are respectively N+1, N, N−1, and N−2.

Figure 37:
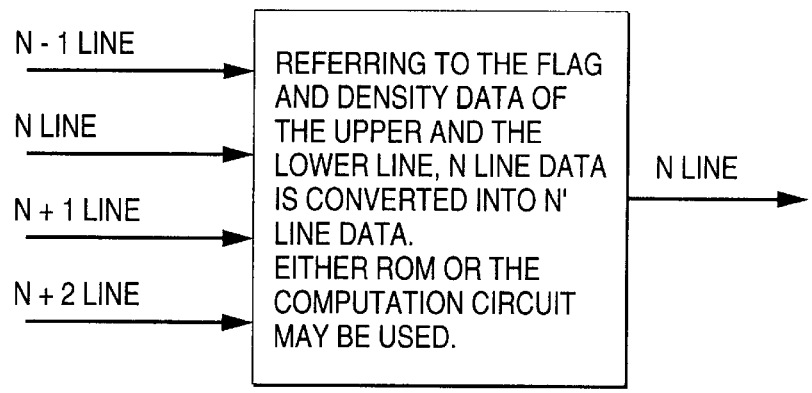
FIG. 37 is a view showing a model of the pixel value correcting processing in the sixth embodiment.
Figure 37:
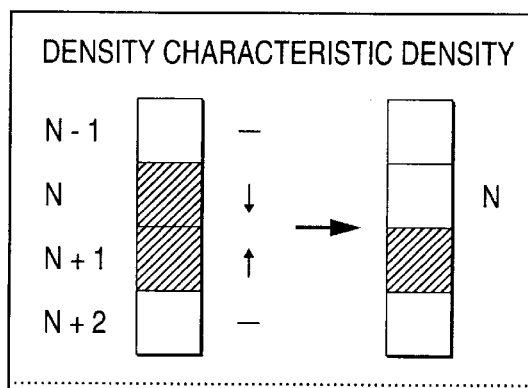
Figure 37:
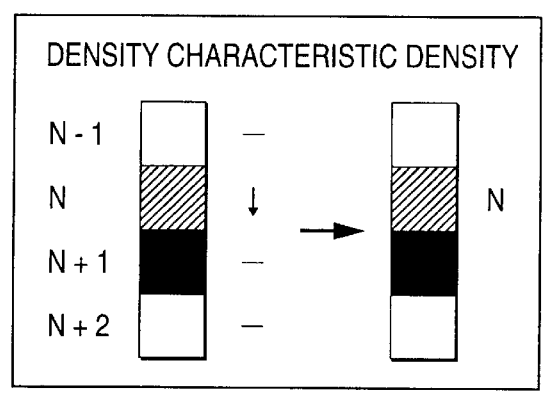
Figure 37:
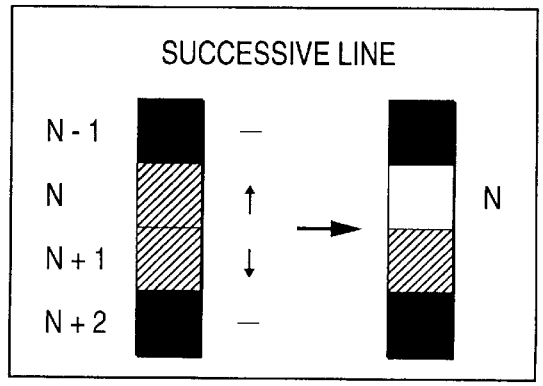

Next, referring to FIG. 37, the processing conducted on the lines N+1, N, N−1, N−2 will be explained as follows. When the same value, the density of which is low, is developed on two horizontal lines, the image output section 102 of the electrophotographic system does not reproduce one fine line, but reproduces two different fine lines. Therefore, the image quality is deteriorated.

Therefore, in Example 1, the pixel value of the line N is replaced with 0 in the following cases: the pixel of the target line N is a value of the half-tone density having the characteristic information "lower"; the pixel of the line N−1 is a value of density 0; the pixel of the line N+1 is a value of the half-tone density at the same level as that of the line N having the characteristic information "upper"; and the pixel of the line N+2 is a value of density 0. On the next scanning line, the pixel value of the line N is increased in the following cases: the pixel of the line N−1 is a value of the half-tone density having the characteristic information "lower"; the pixel of the target line N is a value of the half-tone density at the same level as that of the line N−1 having the characteristic information "upper"; and the pixels of both lines N+1 and N+2 are values of density 0. Due to the foregoing, it is possible to prevent the occurrence of a rupture of a fine line, so that one gray fine line can be reproduced.

As shown in Example 2, in the case of a horizontal line of low density adjacent to a horizontal line of high density, it is possible to modulate the line width in the subsidiary scanning direction in accordance with its density value. Accordingly, the values of data of input and output are maintained as they are. In this case, it is possible to form a judgment since the characteristic information of the target pixel indicates "lower" and the density value of the pixel adjacent in this direction is higher than the density value of the target pixel.

As shown in Example 3, when the target pixel and either the upper or the lower pixel have the characteristic information showing the opposite direction and the half-tone density value is the same as that of the target pixel, block of characters can be avoided by replacing the value of the target pixel with 0.

In this connection, this embodiment is a variation of the fifth embodiment. However, this embodiment does not necessarily presuppose the fifth embodiment. Even when the resolution conversion/characteristic information generating section 1261 or the smoothing processing section 1262 is not provided, the effect of the pixel value correcting section 1263 can be obtained.

Seventh Embodiment

Next, the seventh embodiment of the invention will be explained below. In this embodiment, as shown in FIG. 38A, the flag/image data is composed of 10 bits, and there are provided two flags FL1 and FL0 of 1 bit with respect to the half-tone data of 8 bits. In the same manner as that of the embodiment described before, the flag FL1 of MSB is a discriminating information flag for discriminating between the half-tone data and the outline data. On the other hand, in the case of half-tone data, the flag FL0, which is a lower bit of MSB, discriminates between a high frequency screen and a low frequency screen. In the case of outline data, the flag FL0 is used as a flag to discriminate between a data set of "gray scale+characteristic information" and a bit map.

Due to the foregoing, as shown in FIG. 38B, it is possible to discriminate the following 4 embodiments: half-tone data and a high frequency screen; half-tone data and a low frequency screen; outline data and a set of data of gray scale+characteristic information data; and outline data and a bit map.

In the case of FL1=0 and FL0=1 (outline data and a set of data of gray scale+characteristic information data), the content of the characteristic information is the same as that of the second embodiment shown in FIG. 14.

On the other hand, in the case of FL1=0 and FL0=0 (outline data and a bit map), as shown in FIG. 39, at the lower 1 bit of FL0, a flag RES is defined by which whether it is a bit map of the standard resolution or it is a bit map of the high resolution is discriminated. In the case of the standard resolution (in the case of the flag RES=1), the bit map is expressed by 1 bit TXO of LSB. In the case of high resolution (the resolution is twice as high as the standard resolution with respect to the primary and the subsidiary direction), that is, in the case of the flag RES=0, the bit map is expressed by the lowermost 4 bits TX0 to TX3.

Referring to FIGS. 40 to 47, operation of the image output section 102 in this embodiment will be explained as follows. In this connection, in the same manner as that of the embodiment described before, the resolution of the image output section 102 in this embodiment is 16 dpm.

Figure 40:
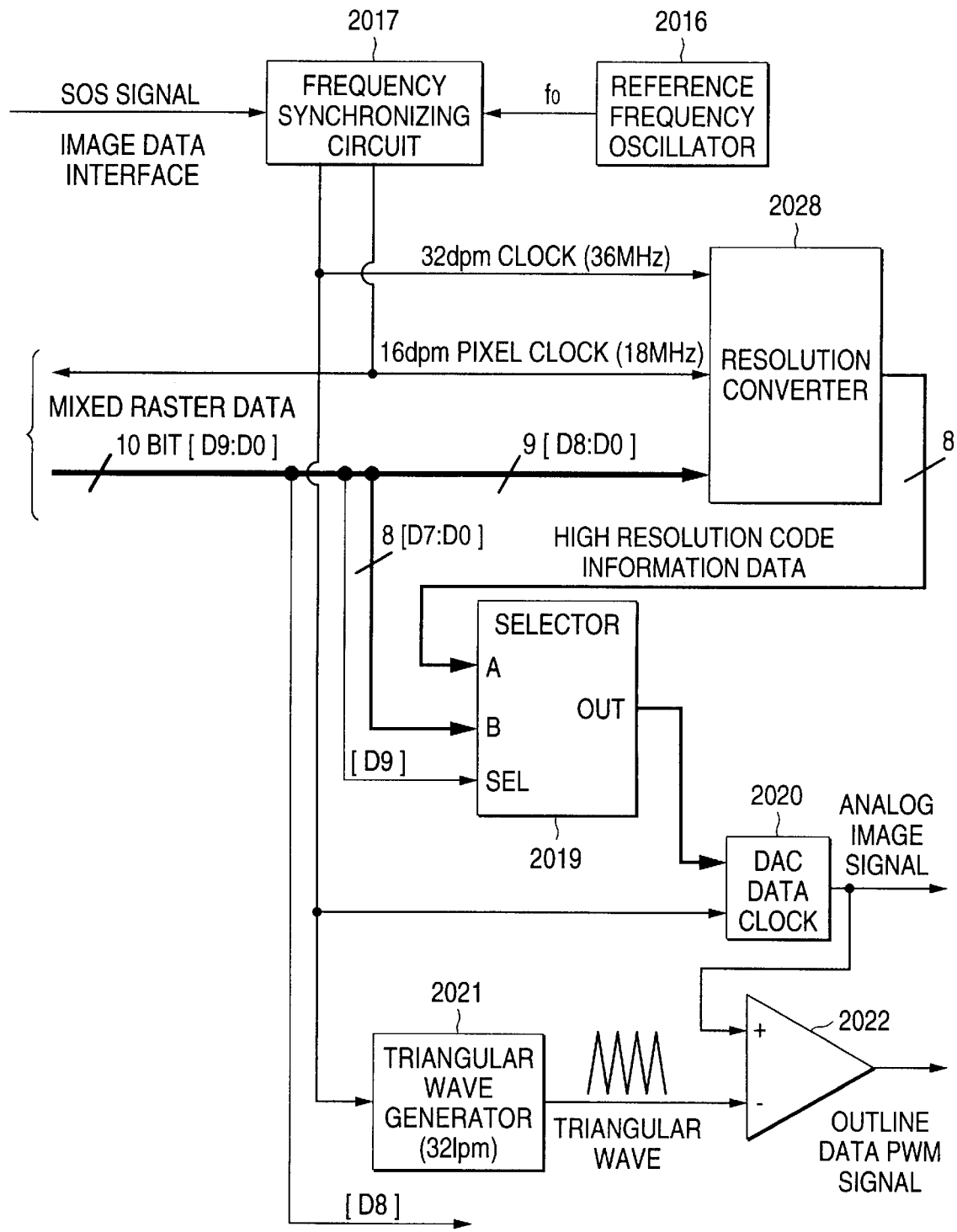
FIG. 40 is a block diagram showing an arrangement of a portion of the image data interface of the image output section 102 in the seventh embodiment.
Figure 41:
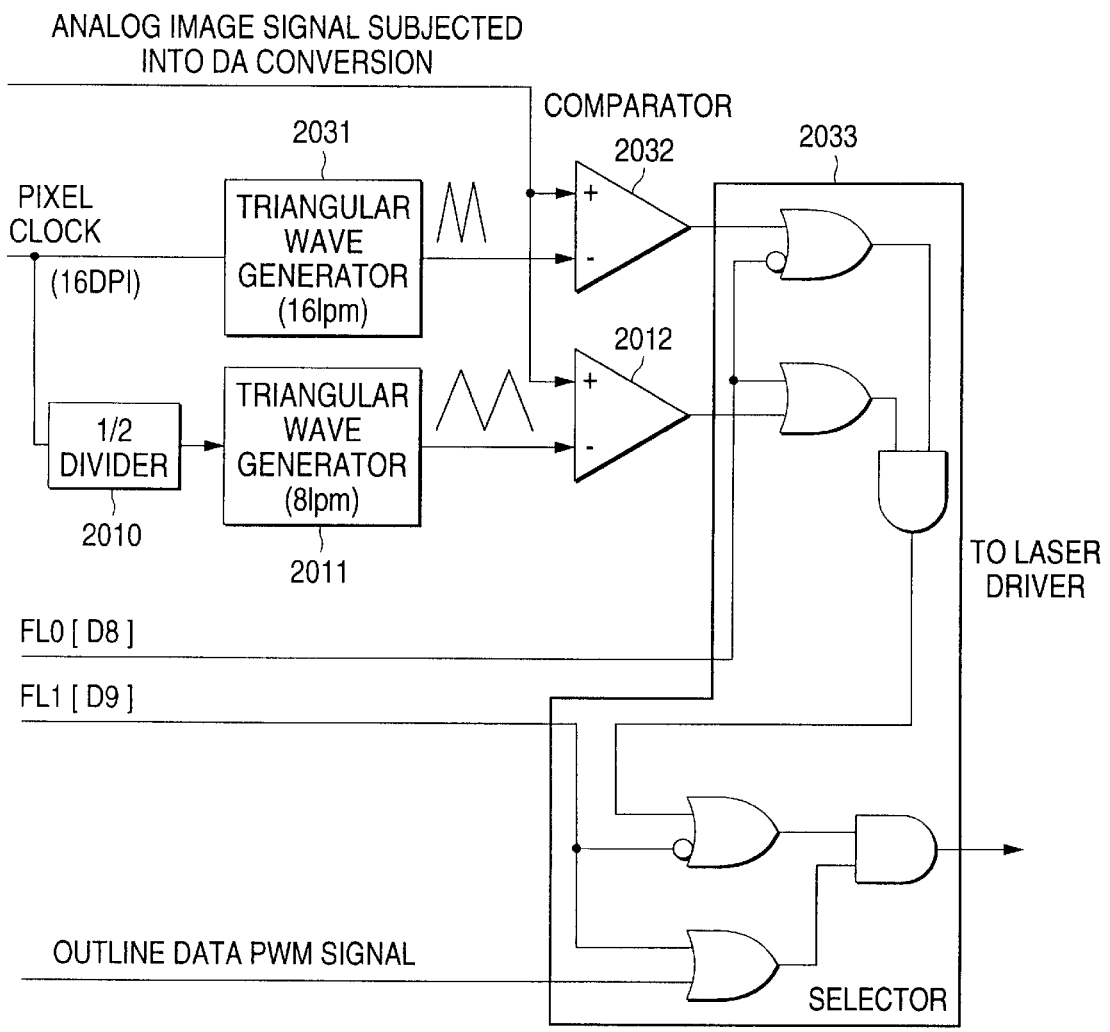
FIG. 41 is a block diagram showing an arrangement of another portion of the image data interface in the seventh embodiment.

FIGS. 40 and 41 are views showing an arrangement of the image interface of the image output section 102 in this embodiment. In FIGS. 40 and 41 showing the present embodiment and in FIGS. 18 and 19 showing the second embodiment, like reference numerals have been used throughout to designate identical portions, and the explanations are omitted here.

In FIG. 40, the bit D9 is MSB of the image data inputted as a selection signal of the selector 2019. The bit D9 is a discriminating information flag FL1 corresponding to the bit D8 of the second embodiment. In this connection, the bit D8 in this embodiment is defined as a flag FL0 (shown in FIG. 38). In this embodiment, instead of the resolution converter 2018 shown in FIG. 18, there is provided a resolution converter 2028. The resolution converter 2028 will be described later. Other arrangements are the same as those of the second embodiment shown in FIG. 18.

In FIG. 41, an analog image signal, which has been subjected to DA conversion, is inputted into not only a positive input terminal of the comparator 2012 but also a positive input terminal of the comparator 2032. Into a negative input terminal of the comparator 2012, a triangular wave signal used for 8 lpm is inputted which is generated by the triangular wave generator 2011 from a clock of 9 MHz obtained when a clock of 16 dpm is subjected to ½ dividing.

Into a negative input terminal of the comparator 2032, a triangular wave signal used for 16 lpm is inputted which is generated by the triangular wave generator 2031 from a clock of 16 dpm. They generate pulse width modulation signals of 8 lpm and 16 dpm respectively. By the selector 2033, an output of the comparator 2012, which is a low frequency screen, is selected when the flag FL0 is 0. On the other hand, an output of the comparator 2032, which is a high frequency screen, is selected when the flag FL0 is 1. Further, when the flag FL1=1, an output of the comparator 2012 or an output of the comparator 2032 is selected and sent to a laser driver not shown in the drawing.

Concerning the resolution converter 2028, in accordance with the form of output data, one of the arrangements shown in FIGS. 42 to 45 is employed. All the arrangements may be mounted in the image output section 102 and changed over in accordance with the combination of the flag FL0 and the value of RES. Alternatively, one or two of the arrangements may be mounted, so that the arrangement can be applied to a limited resolution converter.

Each embodiment of the resolution converter 2028 will be explained below. In the same manner as the resolution converter of the second embodiment shown in FIG. 20, the resolution converter 28 shown in FIG. 42 processes image data. However, unlike the resolution converter shown in FIG. 20, the resolution converter 28 shown in FIG. 42 can process the multi-value image data having characteristic information. That is, when the flag FL0 is 1, the output of ROM 2802 and 2803 is effectively supplied to the selector 2804. When the flag FL0 is 0, the output of ROM 2802 and ROM 2803 is made to be high impedance, so that the connection of signal transmission can be cut off.

Figure 43:
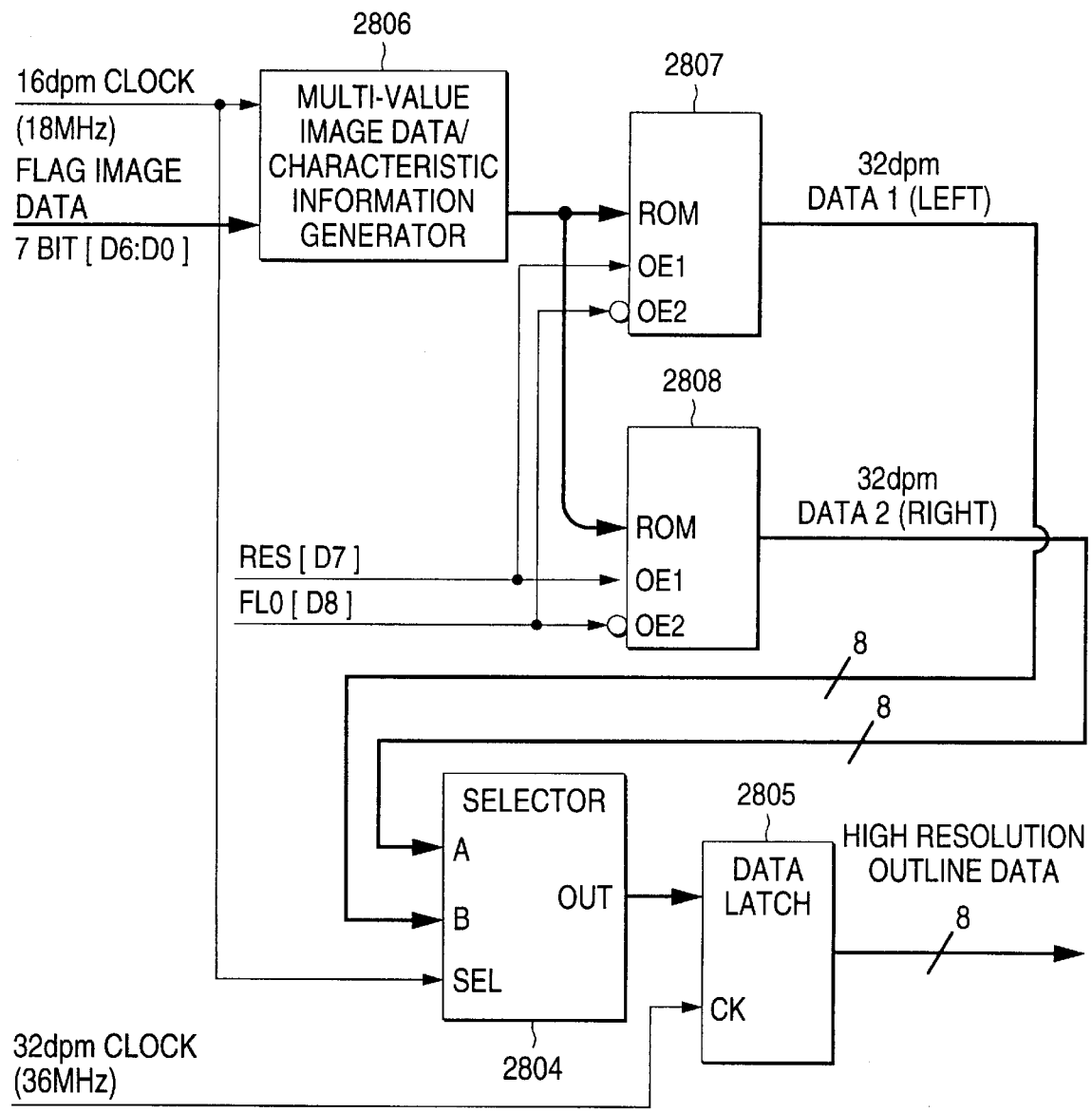
FIG. 43 is a block diagram showing the second example of the arrangement of the resolution converter 2028 in the seventh embodiment.

The resolution converter 2028 shown in FIG. 43 is composed in such a manner that it can process a bit map of 16 dpm which is sent as outline data. In FIG. 43, the multi-value image data/characteristic information generator 2806 has a function by which binary bit map input data is converted into multi-value image data and characteristic information. That is, the multi-value image data/characteristic information generator 2806 is a hardware circuit which operates in real time in accordance with the processing speed of the image output section 102. In the processing of the multi-value image data/characteristic information generator 2806, the method of template matching is used. In the multi-value image data/characteristic information generator 2806, a gray pattern and characteristic information are generated so that zigzag edges can be smoothed with respect to the two-dimensional pattern of an input bit map. Since the above technique is well known and put into practical use, the detailed explanations are omitted here.

An output of this multi-value image data/characteristic information generator 2806 is equivalent to the multi-value image data of 400 dpi having characteristic information. Accordingly, the processing described below is substantially the same as that shown in FIG. 42. However, the output enabling control of ROM 2807 and ROM 2808 is different from the control shown in FIG. 42. Only when FL0=0 and RES=1, the output is made to be effective and supplied to the selector 2804.

Figure 44:
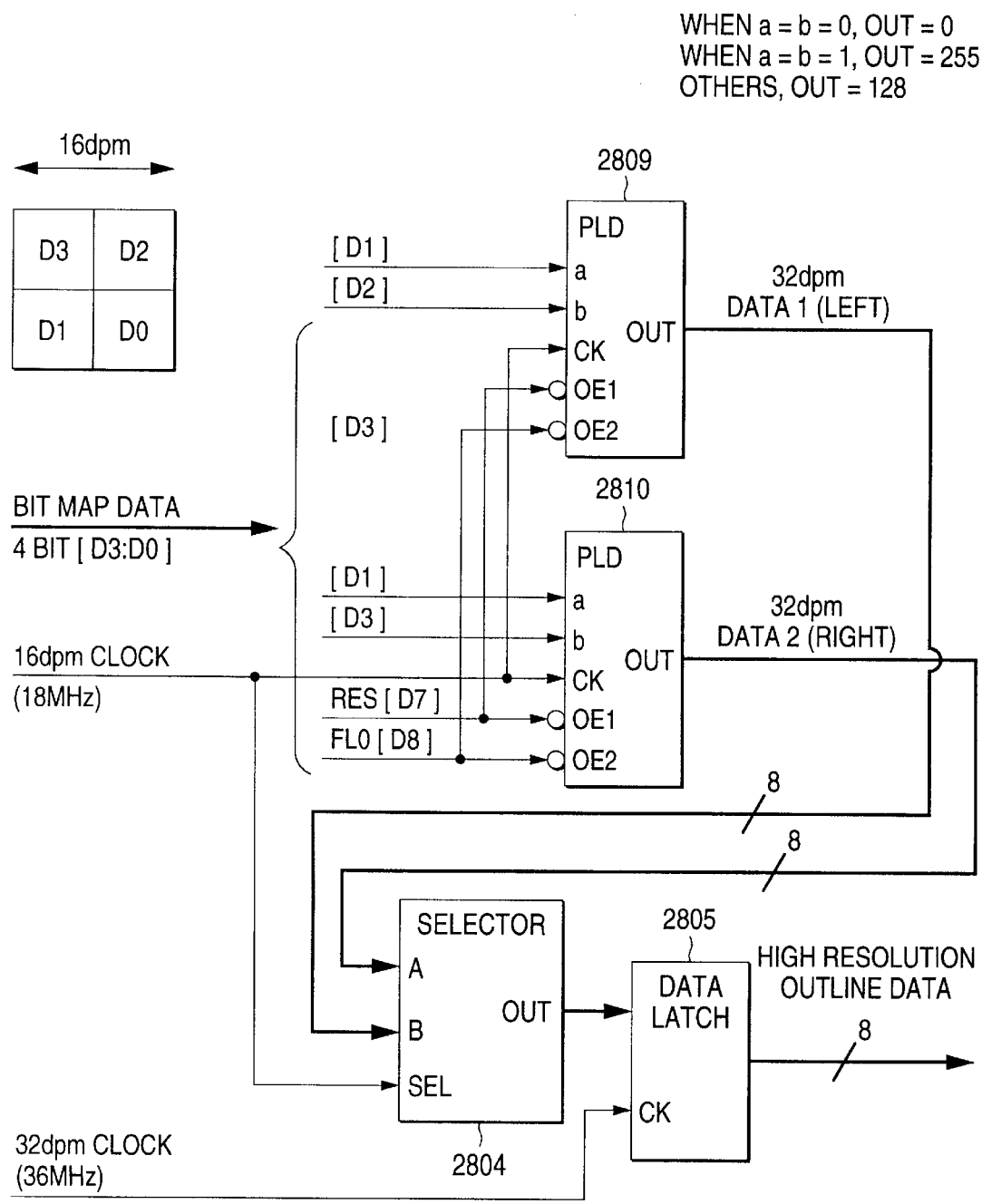
FIG. 44 is a block diagram showing the third example of the resolution converter 2028 in the seventh embodiment.

Next, the resolution converter 2028 shown in FIG. 44 processes a bit map of 32 dpm supplied as outline data in the same manner as the third embodiment shown in FIG. 24. However, the resolution converter 2028 is different from others as follows. In the case of FL=0 and RES=0, the output of PLD 2809 and PLD 2810 is made to be effective and supplied to the selector 2804.

Figure 42:
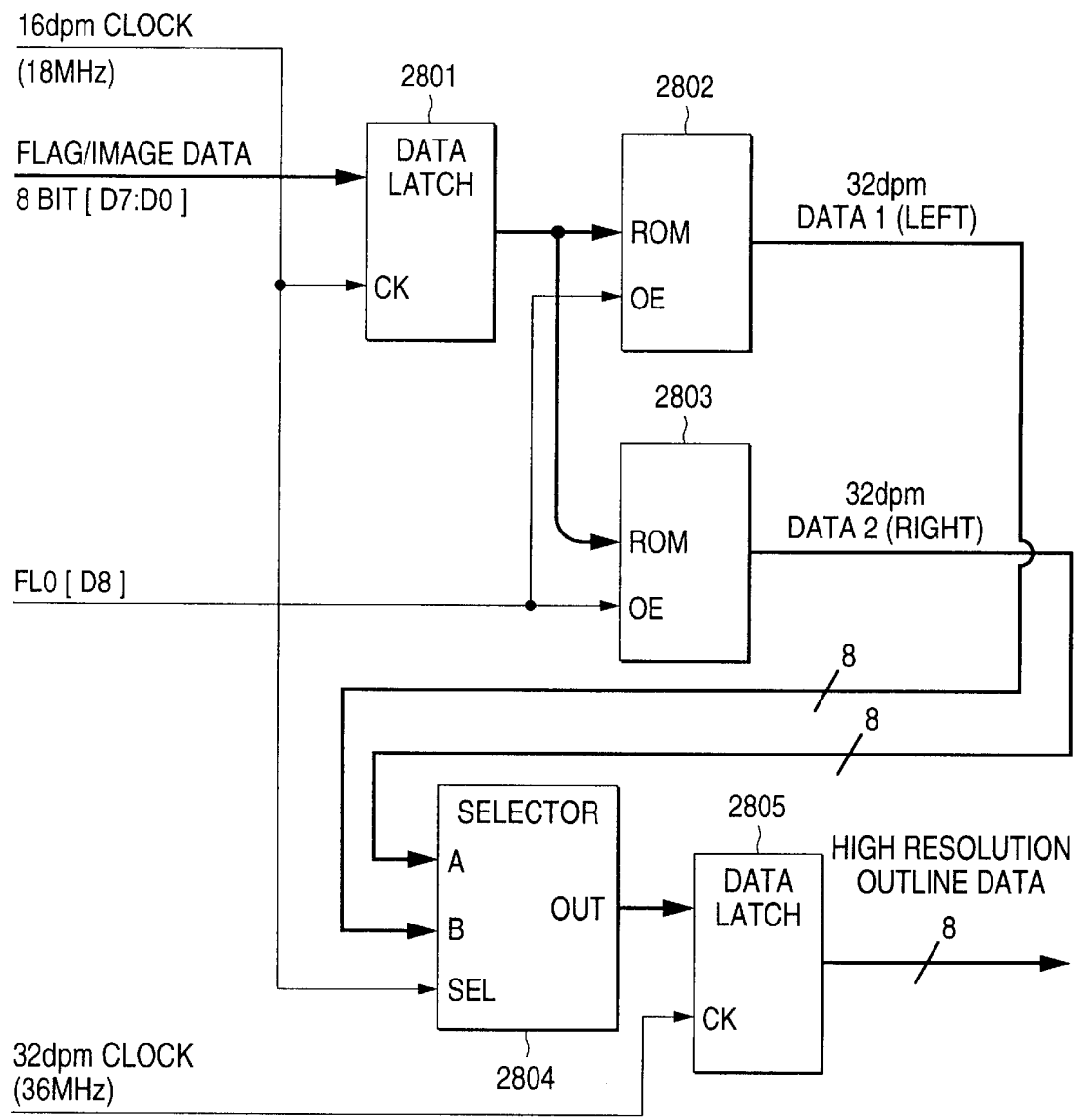
FIG. 42 is a block diagram showing the first example of the arrangement of the resolution converter 2028 in the seventh embodiment.

A set of ROM 2802 and ROM 2803 shown in FIG. 42 output data, and a set of ROM 2807 and ROM 2808 shown in FIG. 43 also output data, and a set of ROM 2809 and 2810 shown in FIG. 44 also output data. In accordance with the combination of values of flag FL0 and RES, only data outputted from one set of ROM becomes effective. Accordingly, outputs of ROM 2802, ROM 2807 and PLD 2809 may be connected with each other by wired OR so that one set of outputs can be provided, and outputs of ROM 2803, ROM 2808 and PLD 2810 may be connected with each other by wired OR so that the other set of outputs can be provided. These sets of outputs of 32 dpm data may be supplied to the input terminals A and B of the selector 2804.

Figure 45:
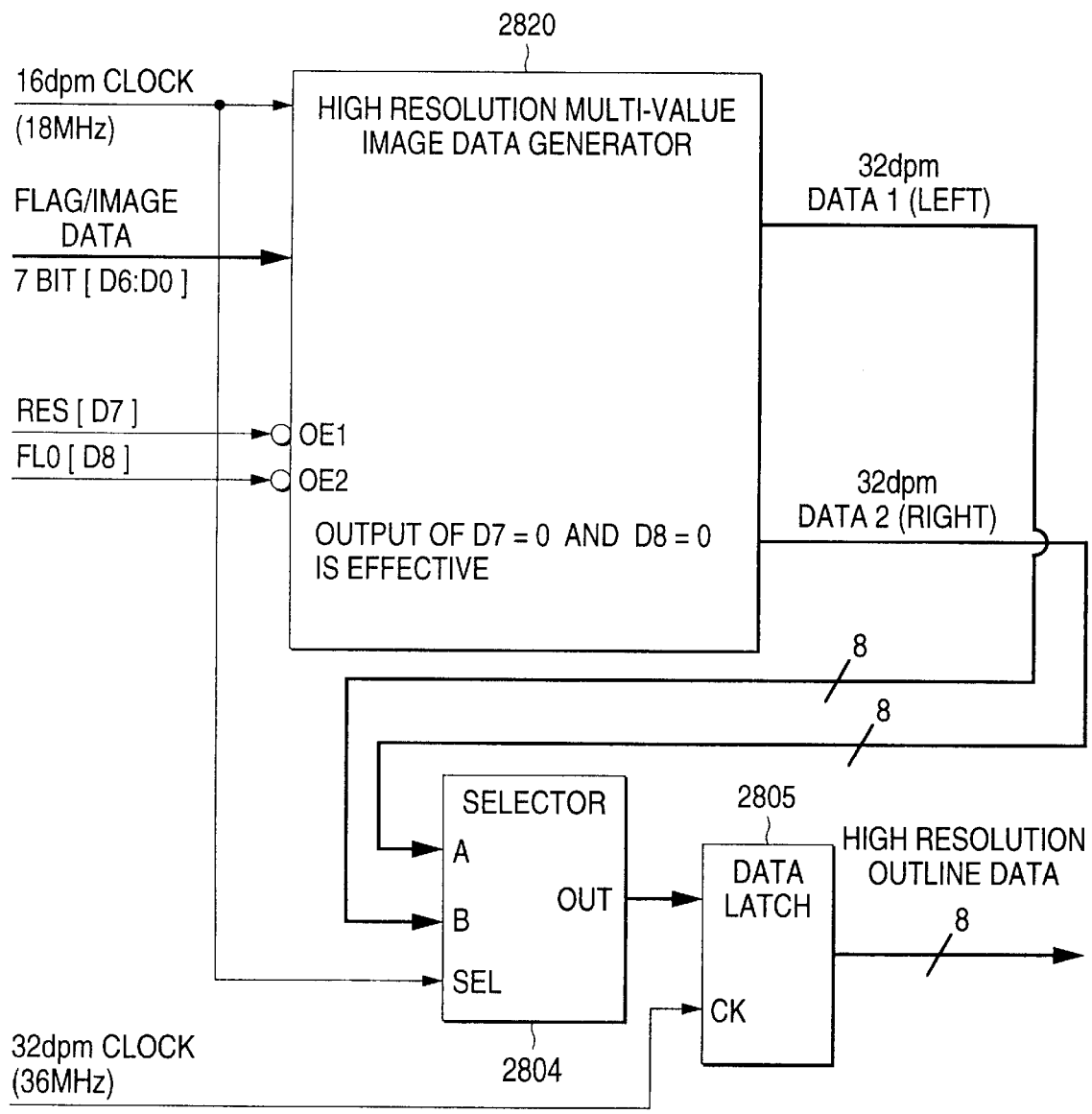
FIG. 45 is a block diagram showing the fourth example of the resolution converter 2028 in the seventh embodiment.
Figure 46:
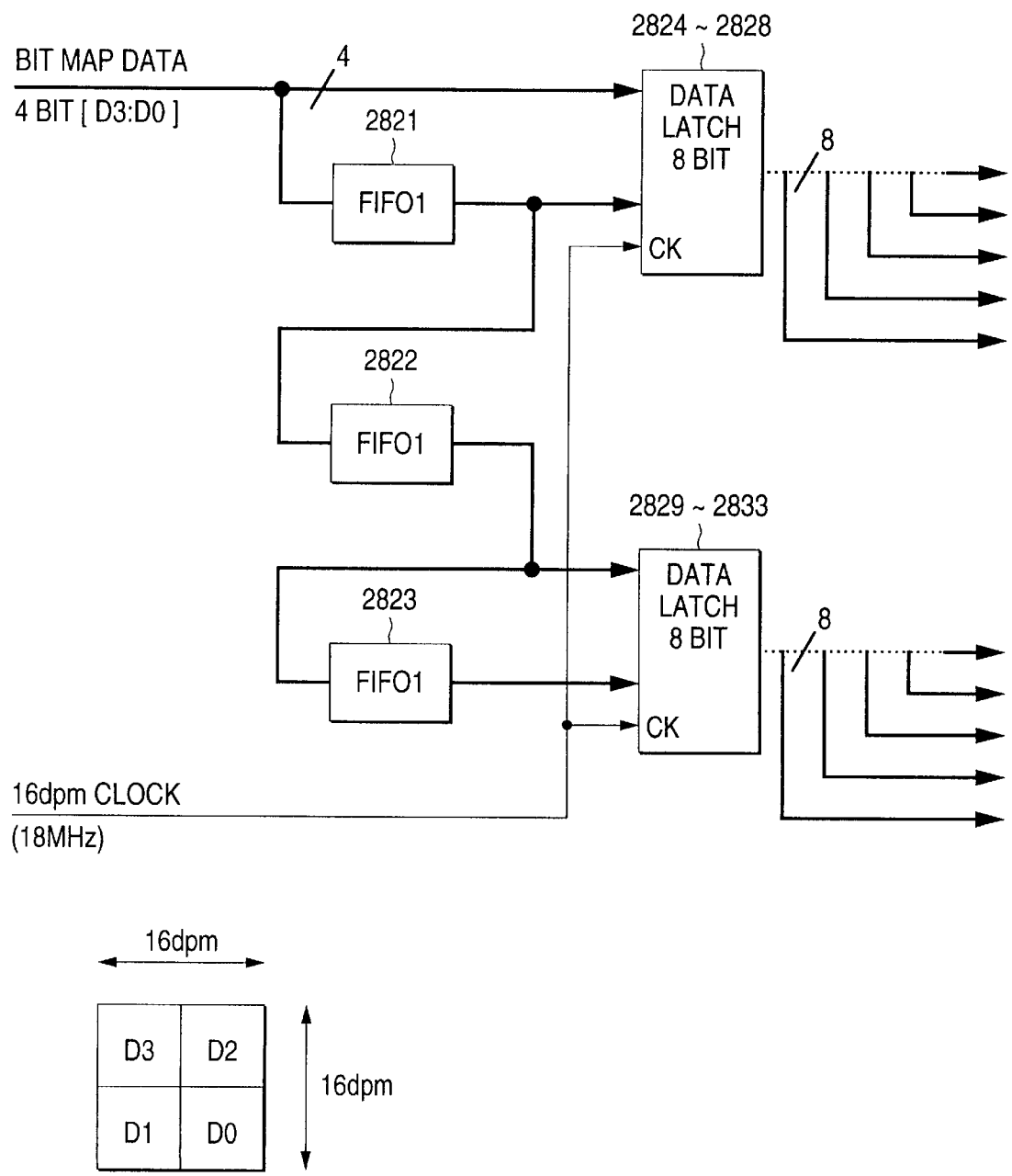
FIG. 46 is a block diagram showing an arrangement of a portion of the high resolution multi-value image data generator 2820 of the resolution converter 2028 shown in FIG. 45.

The resolution converter 2028 shown in FIG. 45 is different from the resolution converter shown in FIG. 44 as follows. The resolution converter 2028 shown in FIG. 45 includes a high resolution multi-value image data generator 2820 and conducts the multi-value processing of bit map data as a previous processing of the resolution conversion. As shown in FIG. 46, the high resolution multi-value image data generator 2820 generates 4 lines of line data by 3 stages of FIFO memories 2821 to 2823. Further, the high resolution multi-value image data generator 2820 makes a data matrix of 4×5 pixels by 5 stages of latch circuits 2824 to 2828 and 2829 to 2833. Since one pixel of output data contains 4 (2×2) pixels of bit map data of 32 dpm, a bit map matrix of 8×10 pixels is made when the resolution is converted into 32 dpm.

Figure 47:
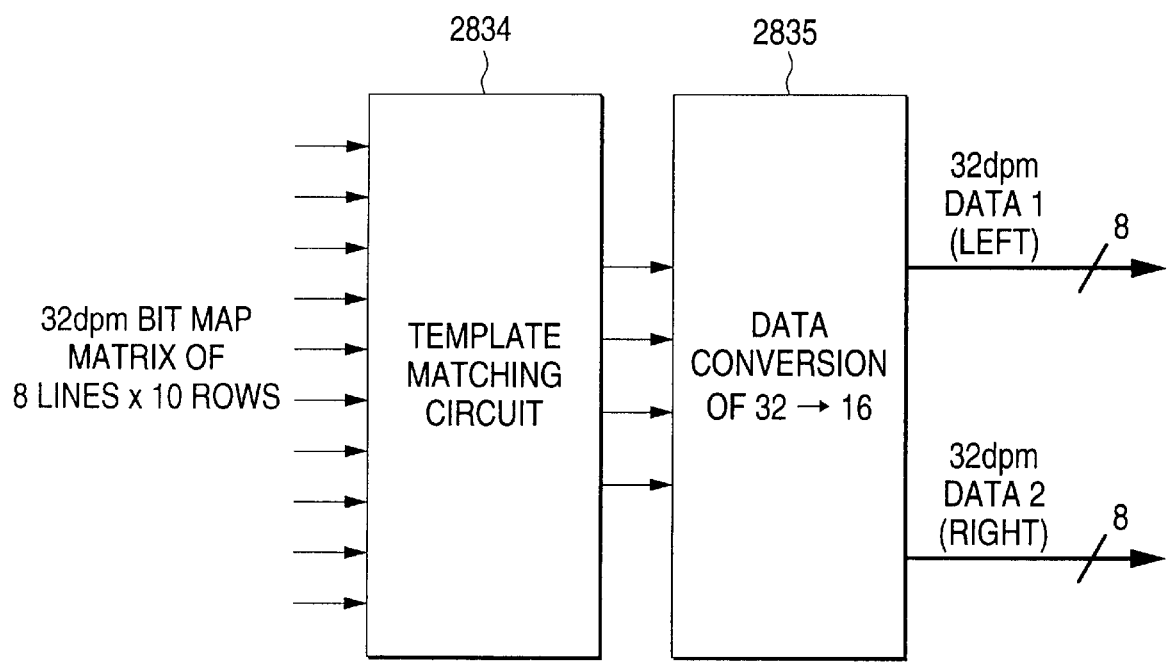
FIG. 47 is a block diagram showing an arrangement of another portion of the high resolution multi-value image data generator 2820.
Figure 47:
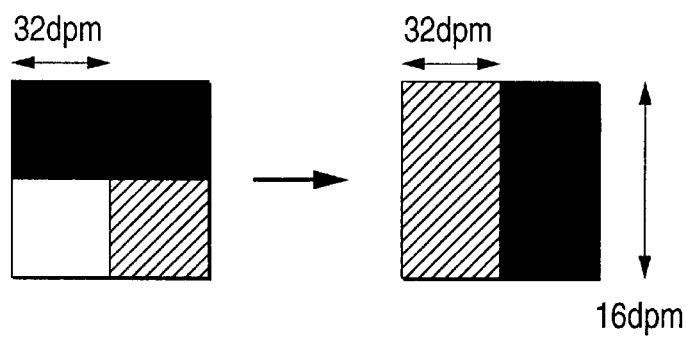

As shown in FIG. 47, the above data is subjected to smoothing processing by the template matching circuit 2834 so that the edge portions can be smoothed. Then the data is subjected to a resolution conversion by the 32-to-16 data conversion circuit 2835 so that the resolution in the subsidiary direction is converted, and one set of 32 dpm data is outputted. The successive processing is the same as the processing shown in FIG. 44.

As described above, according to this embodiment, in addition to the discriminating information flag FL1, the flag FL0 is added. Accordingly, in the case of half-tone data, it is possible to discriminate whether it is a high frequency screen or a low frequency screen. In the case of outline data, it is possible to discriminate whether it is a data set of gray scale+characteristic information or a bit map. Further, in the case of outline data of a bit map, when the flag RES is defined, it is possible to discriminate whether it is a bit map of the high resolution (for example, the high resolution bit map in the fourth embodiment) or a bit map of the standard resolution. Due to the foregoing, it is possible to process image data in which various types of pieces of information are mixed.

Eighth Embodiment

Next, the eighth embodiment of the invention will be explained below. In the fifth embodiment described above, after the high resolution bit map has been made into high resolution multi-value image data by the smoothing processing, the resolution is converted, and then the data is sent to the image output section 102. The reason is that the edges of an oblique line portion or a curved line portion can be smoothed when the bit map is made into multi-values. In this case, the bit map data is not limited to a bit map data of high resolution. Even when a bit map data of the standard resolution is made into multi-values, smoothing can be accomplished. However, since data is made into multi-values by pattern matching or filter processing, there is a possibility that the image quality is deteriorated when data is made into multi-values.

In this embodiment, in order to prevent the deterioration of image quality, as shown in FIG. 48, in the case of bit map mode (that is, in the case of FL0=0 and FL1=0), the characteristic flags CH0 and CH1 of 2 bits are added to the bit map. Contents expressed by the characteristic flags CH0 and CH1 are as follows. For example, "Chinese characters not less than 10 points", "Chinese characters smaller than 10 points", "Characters except for Chinese characters not less than 10 points", and "Characters except for Chinese characters smaller than 10 points" are defined, and 2 bit patterns of CH0=0 and CH1=0, CH0=1 and CH1=0, CH0=0 and CH1=1, and CH0=1 and CH1=1 are respectively allotted to each. Flag FNT showing whether or not the bit map concerned is "Minchotai (name of font) characters" is added to 1 bit lower than the characteristic flags CH0 and CH1.

When the processing is divided by adding information as described above, it becomes possible not to conduct smoothing by making a bit map data into multi-values with respect to a bit map data in which there is a possibility of block of characters such as "Chinese characters smaller than 10 points", "Characters except for Chinese characters smaller than 10 points" and further "Characters of Minchotai type".

With respect to a bit map data, the line density of which is relatively low, such as "Hiragana", "Katakana", "numerals" and "alphabet", block of characters seldom occurs even when the smoothing processing is conducted. In the case of "Minchotai characters", end portions of the characters tend to be remarkably deteriorated by the smoothing processing in which pattern matching is conducted. Accordingly, it is preferable that smoothing processing of making data into multi-values is not conducted on small "Minchotai characters" even if they are not Chinese characters.

Concerning the characteristic flags CH0 and CH1, the content shown by the flag FNT, and the allotment of the bit map pattern, the present invention is not limited to the above specific embodiment. As long as the discrimination can be made between the data having a possibility of deterioration of image quality caused by smoothing processing of making data into multi-values and the data having no possibility of deterioration of image quality caused by smoothing processing, other embodiments may be employed.

Ninth Embodiment

Next, the ninth embodiment of the invention will be explained below.

In general, when a digital copier is used for the image output section 102, parameters of the electrophotographic process are set while importance is attached to the quality of a half-tone image. On the other hand, when a binary printer of black and white is used for the image output section 102, parameters of the electrophotographic process are set while importance is attached to the quality of a character/line image. Accordingly when image data is processed in which a half-tone image and a character/line image are mixed with each other, in order to provide an image of high quality, it is necessary to appropriately change over the setting of parameters in the process of electrophotography.

Figure 49:
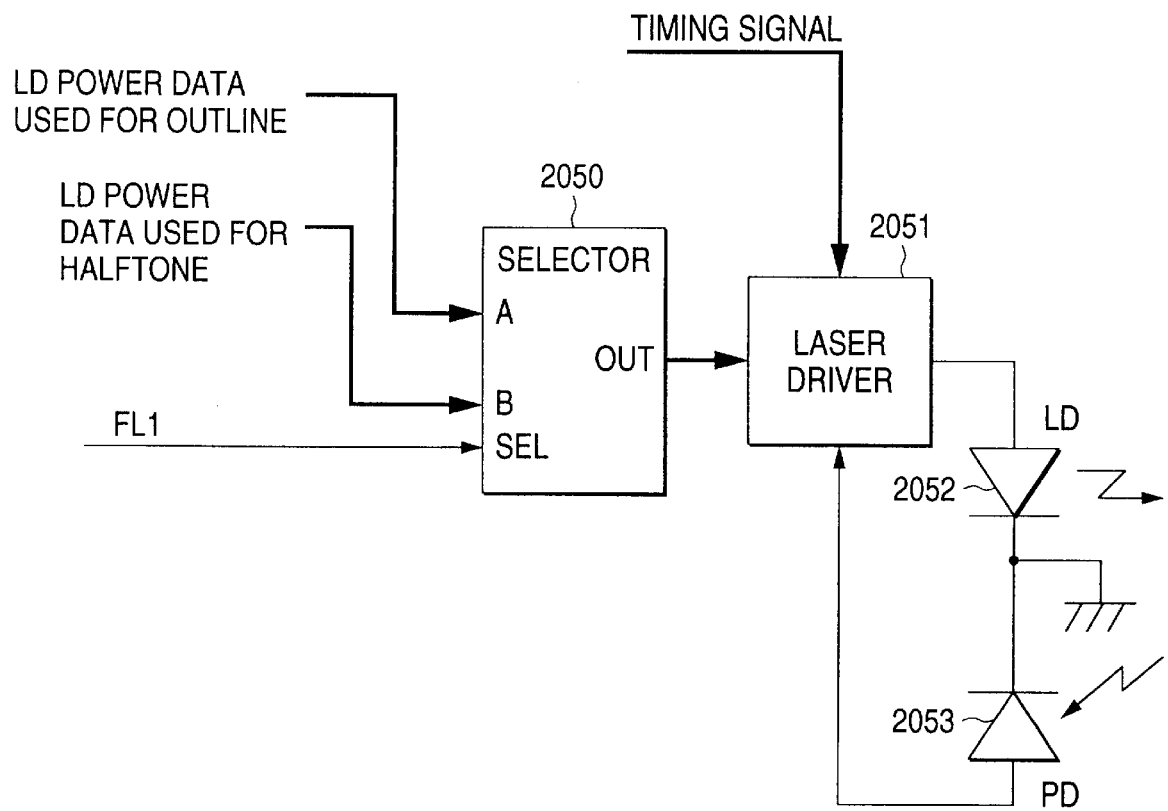
FIG. 49 is a block diagram showing an example of the arrangement of the primary portion of the ninth embodiment of the present invention.
Figure 52:
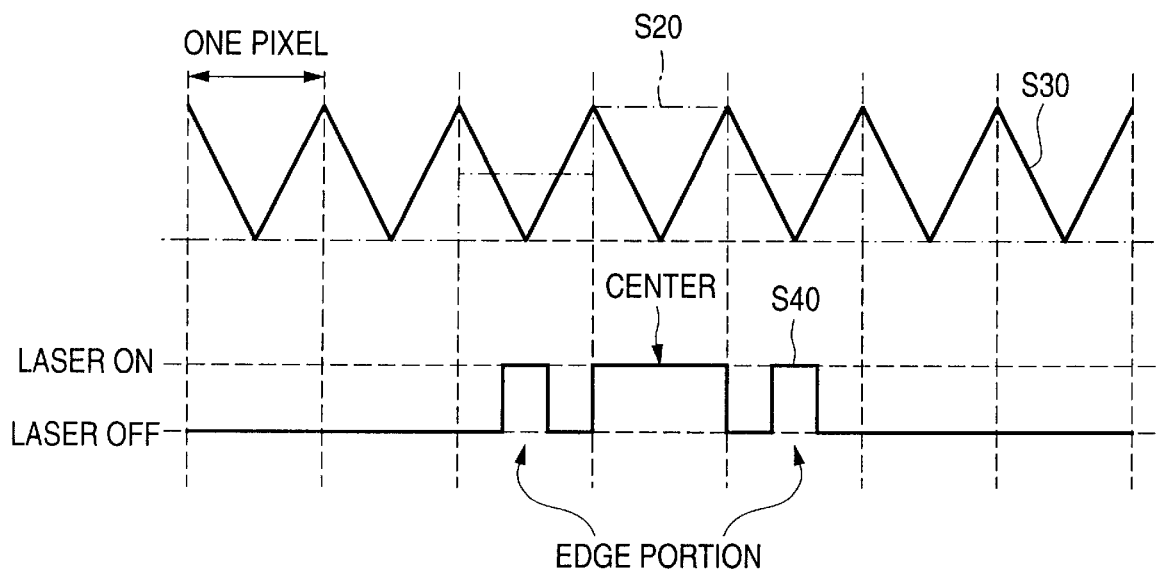
FIG. 52 is a wave-form diagram showing a wave-form of each portion of the circuit shown in FIG. 51.
Figure 53:
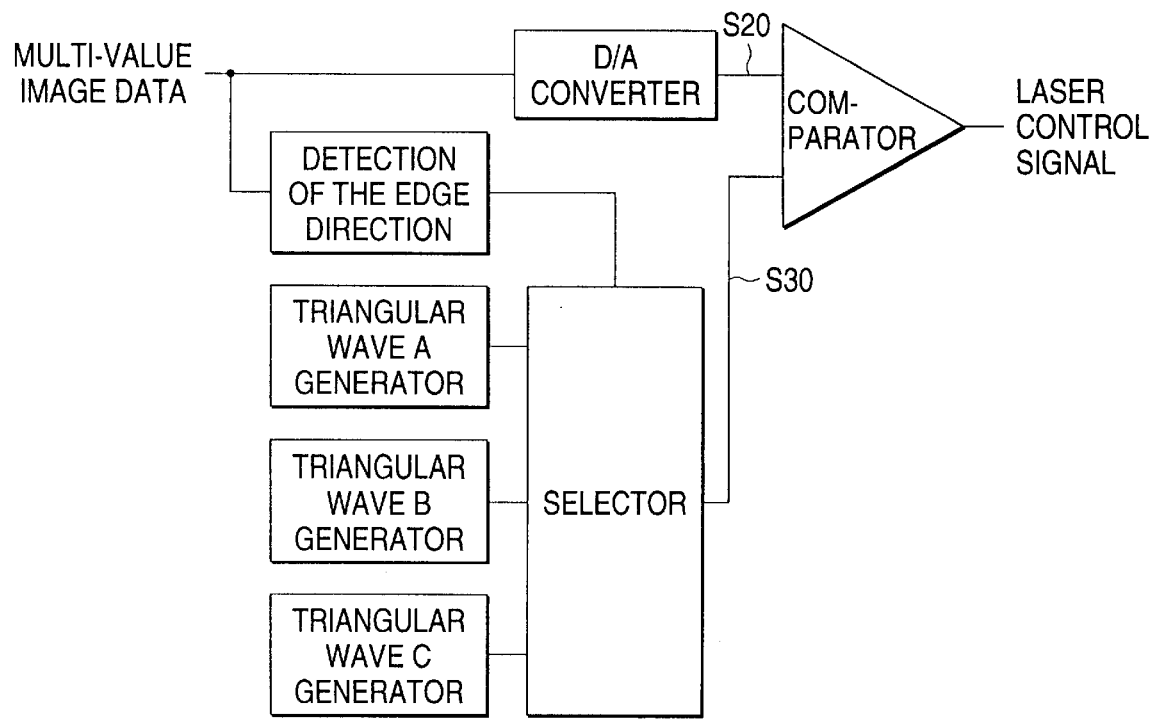
FIG. 53 is a block diagram showing another example of the laser control signal generating circuit of the conventional laser printer.

Accordingly, in this embodiment, the value of the flag FL1 of image data supplied to the image output section 102 is judged, and a quantity of light emitted by the laser in the image output section 102 is changed over in accordance with the result of judgment. From the technical viewpoint, it is not difficult to modulate a quantity of light emitted by a semiconductor laser at the frequency of several tens MHz. For example, a quantity of light emitted by a semiconductor laser can be modulated as follows. As shown in FIG. 49, two types of laser power setting data are supplied to the selector 2050, and a signal for setting a quantity of light to be sent to the laser drive circuit 2051 is changed over by the flag FL1 inputted into the selector 2050 as a selecting signal.

The following effects are provided by the present invention.

As described above, according to the invention, a sum of the output bits of the multi-value means and the characteristic information generating means is set at a value smaller than the bit number of half-tone density data. Accordingly, it is not necessary to provide an individual storage section for the characteristic information, and both are stored in the storage means. Especially when the sum of the output bits of the multi-value means and the characteristic information generating means is made to be the same as the bit number of half-tone density data, the storage area of the storage means is not wasted, and data can be effectively stored in the storage area.

Further, according to the invention, in addition to the effect mentioned above, even when an image output apparatus (printer) of low resolution, the resolution of which is not more than 2400 dpi, is used, it is possible to obtain the same printing quality as that of 2400 dpi, so that zigzag edges are not recognized by visual check when the process is digitized.

According to the invention, a sum of the output bits of the generating means is smaller than the bit number of the multi-value image data except for the contour information. Accordingly, it is not necessary to provide an exclusive storage means for the characteristic information, and both can be stored in the storage means. Especially when a sum of the output bits of the generating means is made to be the same as the bit number of the multi-value image data except for the contour information, the storage area of the storage means is not wasted, and data can be effectively stored in the storage area.

According to the present invention described, the characteristic information is extracted, and printing operation is controlled in accordance with the characteristic information. Accordingly, the occurrence of block of characters can be prevented, and even edges of small characters can be accurately detected.

According to the invention, in addition to the effects mentioned above, when the resolution of image data is converted in accordance with the resolution of the image forming apparatus provided in the next stage, projection is conducted while the pixel interval is shifted. As a result, for example, concerning the 2 bit line, the occurrence of a rupture of a fine line can be avoided in the reproduction of an image.

According to the invention, in addition to the effects of items mentioned above, the characteristic information of the target pixel and the multi-value image data are corrected in accordance with the characteristic information of the peripheral pixel and multi-value image data. Therefore, the occurrence of a rupture of a fine line and block of characters can be prevented.

According to the invention, the bit number of the high resolution data, which has been developed, is smaller than the bit number of the multi-value image data except for the contour information. Accordingly, it is not necessary to provide an exclusive storage means for storing the high resolution data, and both can be stored in the aforementioned storage means. When the bit number of the high resolution data is made to be the same as the bit number of the multi-value image data except for the contour information, the storage area of the storage means is not wasted, and data can be effectively stored by the storage means. Since the contour information of a character/line image is held as high resolution data, in which the resolution is highly enhanced, the smoothing and the sharpening property of the contour of the character/line image can be enhanced.

According to the invention, when a predetermined bit (flag) included in (or added to) the image data is referred to, it is judged whether it is high resolution data or standard resolution data. Therefore, it is possible to process image data in which the high resolution data and the standard resolution data are mixed with each other.

According to the invention, when a predetermined bit (flag) included in (or added to) the image data is referred to, the characteristic of an original image data that has been inputted is recognized. Accordingly, the processing can be changed over so as to select the most appropriate processing suitable for the characteristic of the original image such as the type of font and the size of characters.

According to the invention, before a resolution conversion is conducted in accordance with the resolution of the image forming apparatus provided in the next stage, the contour information is subjected to the smoothing processing. Accordingly, zigzag edges of characters can be reduced.

According to the invention, it is possible to change a quantity of exposure light in the image forming process between the case of contour information of a character line image and the case of multi-value image data except for the contour information concerned. Therefore, the contour of the character line image can be more sharply reproduced.

What is claimed is:

1. An image processing apparatus for processing both image data expressing a character line image and half-tone density data, comprising:

multi-value means for converting image data expressing a character line image into multi-value image data;

characteristic information generating means for generating characteristic information indicating a direction of an edge of image data expressing the character line image;

storing means for storing a set of information containing the multi-value image data outputted from the multi-value means and the characteristic information outputted from the characteristic information generating means, the storing means also storing half-tone density data and sending the stored contents to an image output means; and flag adding means for adding a flag to the half-tone density data stored in the storing means and also for adding a flag to the multi-value image data outputted from the multi-value means, so that the data can be discriminated, wherein a bit number of the multi-value image data expressing the character line image is made to be smaller than a bit number of the half-tone density data, and a bit number of the characteristic information is set at a value at most equal to a difference between the bit number of the half-tone density data and the multi-value image data expressing the character line image.

2. The image processing apparatus as claimed by claim 1, wherein the inequality L≧K is satisfied, where L is a bit number of multi-value image data expressing a character line image (L>1), M×N is an output resolution per one inch of the image output means (M, N>1), and K is a value computed by the following expression $$K=[log_2\{(2400 \times 2400/(M \times N)\}].$$

3. An image processing apparatus into which image data to be formed into an image is inputted and the image data is converted into multi-value image data and then the multi-value image data is outputted, the image processing apparatus, comprising:

extracting means for extracting contour information of a character line image from the inputted image data;

generating means for generating characteristic information to indicate a direction of an edge of the contour information extracted by the extracting means and also generating multi-value image data in which the contour information is made into multi-values;

storing means for storing a set of characteristic information of the contour information generated by the generating means and multi-value image data, the storing means storing multi-value image data except for the contour information, the storing means sending stored contents to an image output means; and flag adding means for adding a flag to the multi-value image data of the contour information stored in the storing means and also for adding a flag to the multi-value image data except for the contour information so that the data can be discriminated, wherein a bit number of the multi-value image data of the contour information is made to be smaller than a bit number of the multi-value image data except for the contour information, so that a bit number of the characteristic information is set at a value at most equal to a difference between the bit number of the multi-value image data except for the contour information and the bit number of the multi-value image data of the contour information.

4. The image processing apparatus as claimed by claim 3, wherein the generating means generates bit map data of high resolution in the contour portion of the character line image in accordance with the contour information, and the resolution is converted at a position shifted by 1/n (n is a natural number) of one pixel of the bit map data of high resolution so as to generate the multi-value image data.

5. The image processing apparatus as claimed by claim 3, wherein the generating means corrects the generated characteristic information or the multi-value image data in accordance with the characteristic information of a peripheral pixel or the multi-value image data.

6. An image processing apparatus into which image data to be formed into an image is inputted and the image data is converted into multi-value image data and outputted, the image processing apparatus comprising:

extracting means for extracting a contour information of a character line image from the inputted image data;

developing means for enhancing a resolution of the contour information extracted by the extracting means to be high and also for developing the contour information as data of high resolution;

storing means for storing the high resolution data of the contour information developed by the developing means and multi-value image data except for the contour information and also for sending the stored contents to an image output means; and flag adding means for adding a flag to the high resolution data of the contour information stored in the storing means and also for adding a flag to the multi-value image data except for the contour information so as to discriminate the data, wherein a bit number of the high resolution data of the contour information is set at a value smaller than a bit number of the multi-value image data except for the contour information for all image types.

7. The image processing apparatus as claimed by claim 6, wherein a predetermined bit is referred with respect to the image data recognized to be contour information according to the flag value, and it is discriminated whether the contour information is the high resolution data, the resolution of which has been enhanced by the developing means, or the contour information is the standard resolution data, the resolution of which has not been enhanced by the developing means.

8. The image processing apparatus as claimed by claim 6, wherein a predetermined bit is referred to with respect to the image data recognized to be contour information according to the flag value, and the characteristic of the inputted original image data is recognized.

9. An image processing apparatus into which image data to be formed into an image is inputted and the image data is converted into multi-value image data and outputted, the image processing apparatus comprising:

first extracting means for extracting contour information of a character line image from the inputted image data;

smoothing means for smoothing image data of the contour information extracted by the first extracting means;

a second extracting means for extracting a second contour information from the image data of the contour information on which the smoothing processing has been conducted;

generating means for generating the multi-value image data in which a characteristic information indicating an edge direction of a second contour information extracted by the second extracting means and the second contour information are subjected to a resolution conversion;

storing means for storing a set of the characteristic information of the second contour information generated by the generating means and the multi-value image data of the second contour information and also for storing the multi-value image data except for the second contour information and for sending the stored contents to an image output means; and flag adding means for adding a flag to the multi-value image data of the second contour information stored in the storing means and also for adding a flag to the multi-value image data except for the contour information so as to discriminate the data, wherein a bit number of the multi-value image data of the second contour information is made to be smaller than a bit number of the multi-value image data except for the second contour information so that a bit number of the characteristic information is set at a value at most equal to a difference between the bit number of the multi-value image data except for the second contour information and the bit number of the multi-value image data of the second contour information.

10. An image processing apparatus for processing both image data expressing a character line image and half-tone density data, comprising:

multi-value means for converting image data expressing a character line image into multi-value image data;

characteristic information generating means for generating characteristic information indicating a direction of an edge of image data expressing the character line image;

storing means for storing a set of information containing the multi-value image data outputted from the multi-value means and the characteristic information outputted from the characteristic information generating means, the storing means also storing half-tone density data and sending the stored contents to an image output means; and flag adding means for adding a flag to the half-tone density data stored in the storing means and also for adding a flag to the multi-value image data outputted from the multi-value means, so that the data can be discriminated, wherein the bit number of the multi-value image data expressing the character line image is made to be smaller than a bit number of the half-tone density data, and a bit number of the characteristic information is set at a value at most equal to a difference between the bit number of the half-tone density data and the bit number of the multi-value image data expressing the character line image, and wherein said image forming apparatus constitutes an electrophotographic printer having a light emitting element capable of forming an image corresponding to image data outputted from said image processing apparatus, in which a quantity of light emitted by the light emitting element is determined based on a flag value.

11. The image processing apparatus as claimed by claim 10, wherein the inequality $L \geq K$ is satisfied, where L is a bit number of multi-value image data expressing a character line image (L>1), M×N is an output resolution per one inch of the image output means (M, N>1), and K is a value computed by the following expression $$K=[log_2\{(2400 \times 2400/(M \times N)\}].$$

12. An image processing apparatus into which image data to be formed into an image is inputted and the image data is converted into multi-value image data and then the multi-value image data is outputted, the image processing apparatus, comprising:

extracting means for extracting a contour information of a character line image from the inputted image data;

generating means for generating characteristic information to indicate a direction of an edge of a contour information extracted by the extracting means and also generating multi-value image data in which the contour information is made into multi-values;

storing means for storing a set of characteristic information of the contour information generated by the generating means and multi-value image data of the contour information, the storing means storing multi-value image data except for the contour information, the storing means sending the stored contents to an image output means; and flag adding means for adding a flag to the multi-value image data of the contour information stored in the storing means and also for adding a flag to the multi-value image data except for the contour information so that the data can be discriminated, wherein a bit number of the multi-value image data of the contour information is made to be smaller than a bit number of the multi-value image data except for the contour information, so that a bit number of the characteristic information is set at a value at most equal to a difference between the bit number of the multi-value image data except for the contour information and the bit number of the multi-value image data of the contour information, and wherein said image forming apparatus constitutes an electrophotographic printer having a light emitting element capable of forming an image corresponding to image data outputted from said image processing apparatus, in which a quantity of light emitted by the light emitting element is determined based on a flag value.

13. The image processing apparatus as claimed by claim 12, wherein the generating means generates bit map data of high resolution in the contour portion of the character line image in accordance with the contour information, and the resolution is converted at a position shifted by 1/n (n is a natural number) of one pixel of the bit map data of high resolution so as to generate the multi-value image data.

14. The image processing apparatus as claimed by claim 12, wherein the generating means corrects the generated characteristic information or the multi-value image data in accordance with the characteristic information of a peripheral pixel or the multi-value image data.

15. An image processing apparatus into which image data to be formed into an image is inputted and the image data is converted into multi-value image data and outputted, the image processing apparatus comprising:

extracting means for extracting a contour information of a character line image from the inputted image data;

developing means for enhancing a resolution of the contour information extracted by the extracting means to be high and also for developing the contour information as a data of high resolution;

storing means for storing the high resolution data of the contour information developed by the developing means and multi-value image data except for the contour information and also for sending the stored contents to an image output means; and flag adding means for adding a flag to the high resolution data of the contour information stored in the storing means and also for adding a flag to the multi-value image data except for the contour information so as to discriminate the data, wherein a bit number of the high resolution data of the contour information is set at a value smaller than a bit number of the multi-value image data except for the contour information for all image types;

wherein said image forming apparatus constitutes an electrophotographic printer having a light emitting element capable of forming an image corresponding to image data outputted from said image processing apparatus, in which a quantity of light emitted by the light emitting element is determined based on a flag value.

16. The image processing apparatus as claimed by claim 15, wherein a predetermined bit is referred with respect to the image data recognized to be contour information according to the flag value, and it is discriminated whether the contour information is the high resolution data, the resolution of which has been enhanced by the developing means, or the contour information is the standard resolution data, the resolution of which has not been enhanced by the developing means.

17. The image processing apparatus as claimed by claim 15, wherein a predetermined bit is referred to with respect to the image data recognized to be contour information according to the flag value, and the characteristic of the inputted original image data is recognized.

18. An image processing apparatus into which image data to be formed into an image is inputted and the image data is converted into multi-value image data and outputted, the image processing apparatus comprising:

first extracting means for extracting a contour information of a character line image from the inputted image data;

smoothing means for smoothing the image data of the contour information extracted by the first extracting means;

a second extracting means for extracting a second contour information from the image data of the contour information on which the smoothing processing has been conducted;

generating means for generating the multi-value image data in which a characteristic information indicating an edge direction of the second contour information extracted by the second extracting means and the second contour information are subjected to a resolution conversion;

storing means for storing a set of the characteristic information of the second contour information generated by the generating means and the multi-value image data of the second contour information and also for storing the multi-value image data except for the second contour information and for sending the stored contents to an image output means; and flag adding means for adding a flag to the multi-value image data of the second contour information stored in the storing means and also for adding a flag to the multi-value image data except for the contour information so as to discriminate the data, wherein a bit number of the multi-value image data of the second contour information is made to be smaller than a bit number of the multi-value image data except for the second contour information so that the bit number of the characteristic information is set at a value at most equal to a difference between a bit number of the multi-value image data except for the second contour information and the bit number of the multi-value image data of the second contour information, wherein said image forming apparatus constitutes an electrophotographic printer having a light emitting element capable of forming an image corresponding to image data outputted from said image processing apparatus, in which a quantity of light emitted by the light emitting element is determined based on a flag value.

* * * * *